United States Patent [19]
Tagawa

[11] Patent Number: 5,357,266
[45] Date of Patent: Oct. 18, 1994

[54] DISPLAY-INTEGRATED TYPE TABLET DEVICE

[76] Inventor: Takao Tagawa, 2074-11, Mise-cho, Kashihara, Japan

[21] Appl. No.: 849,733

[22] Filed: Mar. 11, 1992

[30] Foreign Application Priority Data

| Mar. 12, 1991 | [JP] | Japan | 3-046751 |
| Mar. 18, 1991 | [JP] | Japan | 3-052393 |
| Apr. 9, 1991 | [JP] | Japan | 3-075415 |
| Feb. 4, 1992 | [JP] | Japan | 4-019064 |

[51] Int. Cl.$^5$ .............................................. G09G 3/02
[52] U.S. Cl. .................................. 345/173; 345/104
[58] Field of Search ............... 340/712, 706, 784, 765, 340/707; 178/18, 19; 345/173, 174, 179, 104

[56] References Cited

U.S. PATENT DOCUMENTS

| 4,631,356 | 12/1986 | Taguchi et al. | 340/784 |
| 4,639,720 | 1/1987 | Rympalski et al. | 340/712 |
| 4,841,290 | 6/1989 | Nakano et al. | 340/712 |
| 4,890,096 | 12/1989 | Taguchi et al. | 340/712 |
| 4,947,156 | 8/1990 | Sato | 340/712 |
| 4,992,630 | 2/1991 | Mletzke | 178/18 |
| 5,162,782 | 11/1992 | Yoshioka | 178/18 |

FOREIGN PATENT DOCUMENTS

| 0375328 | 6/1990 | European Pat. Off. . |
| 54-41448 | 12/1979 | Japan . |
| 58-208877 | 12/1983 | Japan . |
| 63-293626 | 11/1988 | Japan . |

OTHER PUBLICATIONS

IBM Technical Disclosure Bulletin, vol. 23, No. 1, Jun. 1980 pp. 278–281 E. Walker "Unified Read/Write Panel".

IEEE Transactions on Consumer Electronics, vol. CE-33, No. 3, Oct. 1987, pp. 367–373, M. Nakano et al., "A New LCD With An Input Function Using Conventional Electrodes for Both Display and Input".

"An LCD With Input Function Using Electrodes for Display The Development of 12S×160 Pixel LCD".

*Primary Examiner*—Ulysses Weldon
*Assistant Examiner*—Xiao M. Wu

[57] ABSTRACT

A switching circuit 7 switchedly selects the side of a detection control circuit 6 for the coordinate detection period in compliance with control of a control circuit 10. Then according to each signal from the detection control circuit 6, a segment drive circuit 3 generates a segment electrode scan signal to scan segment electrodes X of a liquid crystal panel 1 in turn. Subsequently, a common drive circuit 2 generates a common electrode scan signal to scan common electrodes Y in turn. An x-coordinate detection circuit 8 and a y-coordinate detection circuit 9 detects the x- and y-coordinates of the tip of an electronic pen 11 on the basis of an induced voltage developed to a tip electrode of the electronic pen 11. During the display period, the side of a display control circuit 4 is switchedly selected, displaying an image onto the liquid crystal panel 1. Thus, there is provided a display-integrated type tablet device into which display function has been integrated, in order to make the image easy-to-view and the device itself more compact, less costly.

18 Claims, 30 Drawing Sheets

```
           Y1 O O O O O O O O O O O O O
           Y2 × O × O × O × O × O × O ×
           Y3 O × O × O × O × O × O × O
O Displayed Y4 O × O × O × O × O × O × O
  pixel    Y5 × O × O × O × O × O × O ×
           Y6 × × × × × × × × × × × × ×
× Non-     Y7 O O O O O O O O O O O O O
  displayed Y8 O O O O O O O O O O O O O
  pixel       X1 X2 X3 X4 X5 X6 X7 X8 X9 X10 X11 X12 X13
```

DISPLAY-INTEGRATED TYPE TABLET DEVICE

BACKGROUND OF THE INVENTION

1. Field of the Invention

The present invention relates to display-integrated type tablet devices into which display function is integrated for use in personal computers, word processors and the like.

2. Description of the Prior Art

Conventionally, there have been display-integrated type tablet devices in which a display and a tablet are stacked on each other into an integral construction. FIG. 35 schematically illustrates the construction of an electrostatic induction tablet and its driver section to be used for such display-integrated type tablet devices.

An electrostatic induction tablet 101 is formed by securing two glass substrates, one on which column electrodes $X_1, X_2, \ldots, X_m$ (hereinafter, an arbitrary column electrode is represented as X) are arranged in parallel and the other on which row electrodes $Y_1, Y_2, \ldots, Y_n$ (hereinafter, an arbitrary row electrode is represented as Y) are arranged in parallel, with a spacer (e.g. transparent adhesive) interposed therebetween in such a way that the two groups of electrodes cross each other at right angles and are opposed to each other. Each row electrode Y is connected to a row electrode shift register 102 while each column electrode X is connected to a column electrode shift register 103.

For this construction, the above-mentioned column electrodes X and row electrodes Y are formed approximately transparent by using indium tip oxide (ITO) or the like.

The row electrode shift register 102 and the column electrode shift register 103 are both connected to a timing generation circuit 104. Further, to the timing generation circuit 104 are connected an x-coordinate detection circuit 107 and a y-coordinate detection circuit 108. The x-coordinate detection circuit 107 detects the x-coordinate of the tip of an electronic pen 105 according to both a signal from the timing generation circuit 104 and a signal fed from the electronic pen 105 via an operational amplifier 106, so that it produces an x-coordinate signal representing the x-coordinate. Likewise, the y-coordinate detection circuit 108 puts out a y-coordinate signal representing the y-coordinate of the tip of the electronic pen 105.

The electrostatic induction tablet 101 constructed as above has a light transmittance of approximately 85%. Accordingly, even if the electrostatic induction tablet 101 is stack on an LCD (liquid crystal display), the display screen of the LCD can be viewed through the electrostatic induction tablet 101. This being the case, it is possible to feed any coordinates on the LCD with the electrostatic induction tablet 101 and the electronic pen 105 in such a display-integrated type tablet device constructed by stacking the electrostatic induction tablet 101 on the LCD as described above.

The electrostatic induction tablet 101 constructed as above and its driver section operate in the following way.

First, shift data and a clock signal are transmitted from the timing generation circuit 104 to the column electrode shift register 103. Then scan pulses of a column electrode scan signal such as shown in FIG. 36 are applied in turn from the column electrode shift register 103 to each column electrode X. Next, in similar manner, scan pulses of a row electrode scan signal such as shown in FIG. 36 are applied from the row electrode shift register 102 to each row electrode Y. When this is done, the electronic pen 105 is made close to the surface of the electrostatic induction tablet 101.

As a result, since the tip electrode of the electronic pen 105 (not shown) is coupled with both column electrodes X and row electrodes Y by their respective floating capacities, there develops an induced voltage as shown in FIG. 37(a) at the tip electrode of the electronic pen 105. When this occurs, the tip electrode mentioned above has the operational amplifier 106 connected thereto, wherein the input-side impedance of the tip electrode of the electronic pen 105 is set higher than that on the lead side.

On the basis of the induced voltage thus developed to the tip electrode, tip coordinates of the electronic pen 105 are detected in the manner as described below.

An induced voltage signal of such a waveform as shown in FIG. 37(a) fed from the electronic pen 105 is transformed into a signal of such a waveform as shown in FIG. 37(b) through a low-pass filter and the amplifier, and fed into the x-coordinate detection circuit 107 or the y-coordinate detection circuit 108.

The x-coordinate detection circuit 107 measures the time interval (Ts in FIG. 37(b)) from when the column electrode $X_1$ has a pulse of the scan signal as shown in FIG. 36 applied thereto from the column electrode shift register 103 to start the scanning of the column electrodes X to when the peak of waveform in the signal from the electronic pen 105 is fed, in accordance with the clock signal from the timing generation circuit 104 and the signal from the electronic pen 105. The x-coordinate detection circuit 107 then generates an x-coordinate signal representing the x-coordinate of the electronic pen 105 depending on the measuring result.

Similarly, the y-coordinate detection circuit 108 measures the time interval from when the scanning of the row electrodes Y is started to when the peak of waveform in the signal from the electronic pen 105 is fed. Then, the y-coordinate detection circuit 108 produces a y-coordinate signal representing the y-coordinate of the tip of the electronic pen 105 depending on the measuring result.

The measurement of time Ts is implemented by counting the number of pulses of the clock signal applied to the row electrode shift register 102 or the column electrode shift register 103.

Besides, it is also possible to calculate the tip coordinates of the electronic pen 105 more accurately in the way as described below. The x-coordinate detection circuit 107 normalizes the peak value of each step in such stepped waveform of the signal from the electronic pen 105 as shown in FIG. 37(a) by maximum peak value. After that, the interval between the x-coordinate of a column electrode $X_{m1}$ to which a scan signal is applied while the peak value is presented (i.e. x-coordinate of the column electrode $X_{m1}$ closest to the tip of the electronic pen 105, which can be determined from time Ts pertinent to the maximum peak value) and the x-coordinate of a column electrode $X_{m2}$ to which a scan signal is applied while the second highest peak value is presented (i.e. x-coordinate of the column electrode $X_{m2}$ second closest to the tip of the electronic pen 105) is divided according to the ratio of the aforementioned maximum peak value to the second highest peak value. In this way, the x-coordinate of the tip of the electronic pen 105 positioned between the column electrode $X_{m1}$ and the column electrode $X_{m2}$ is determined.

In the same manner, the y-coordinate detection circuit 108 determines the y-coordinate of the tip of the electronic pen 105 positioned between a row electrode $Y_{n1}$ closest to the tip of the electronic pen 105 and a row electrode $Y_{n2}$ second closest thereto, according to the ratio of the maximum peak value to the second highest peak value in the signal from the electronic pen 105.

This way of determination allows the tip coordinates of the electronic pen 105 to be calculated with high accuracy even when the pitch of the column electrodes X or that of the row electrodes Y is rather coarse. In addition, the reason why the peak value of each step of the stepped waveform in a signal from the electronic pen 105 is normalized by maximum peak value is to prevent any error from occurring even when the tip of the electronic pen 105 is out of contact with the surface of the electrostatic induction tablet 101.

As described above, the electrostatic induction tablet 101 is capable of determining the tip coordinates of the electronic pen 105 with high accuracy, in spite of its simple construction, thus lending itself to a variety of applications in small-size computers and the like.

The above-described electrostatic induction tablet 101 and an LCD are stacked together to construct a display-integrated type tablet device which is adapted to display pixels on the LCD corresponding to the tip coordinates of the electronic pen 105 on the electrostatic induction tablet 101. This display-integrated type tablet device presents characters and graphics inputted with the pen on the display screen of the LCD by tracing them on the surface of the electrostatic induction tablet 101 by the tip of the electronic pen 105, thus allowing characters and graphics to be fed with a feeling as if it were writing on paper with a ballpoint pen or some other writing instrument.

However, the above-described display-integrated type tablet device has suffered from some problems as shown below.

A first problem is that it is difficult to view the display screen of the LCD in tracing the surface of the electrostatic induction tablet 101 with the electronic pen 105 while viewing the surface of the display screen of the LCD. More specifically, as described above, column electrodes X and row electrodes Y of the electrostatic induction tablet 101 are formed approximately transparent on transparent substrates of glass, plastic, or the like using tin oxide, indium oxide, or the like. To a disadvantage, light transmittance of electrodes formed as above is approximately 85%, rather low as compared to that of substrates with some mist involved. Also, the electrodes are arranged regularly into a lattice, thereby making the electrodes $X_1, X_2, \ldots, X_m, Y_1, Y_2, \ldots, Y_n$ unexpectedly noticeable. This phenomenon would be remarkable especially in simplified display-integrated type tablet devices having no back light.

Another problem is that the area where the surface of the LCD's display screen is covered with the electrodes $X_1, X_2, \ldots, X_m, Y_1, Y_2, \ldots, Y_n$ of the electrostatic induction tablet 101 is relatively large. This makes the LCD's display screen darker and the resulting contrast lower.

Owing to the fact that the LCD and the electrostatic induction tablet 101 are provided separately from each other, there is yet another problem that when integrally assembling the LCD and the electrostatic induction tablet 101 by stacking them on each other, the LCD and the electrostatic induction tablet 101 may be out of position for their correspondence.

In such a case, there occurs some shift between a point on the LCD fed with the pen (i.e. a point specified by the tip of the electronic pen 105) and the point of a pixel displayed on the LCD's display screen by the entry with the pen. This makes it impossible to input characters and graphics with a feeling as if it were writing on paper with a ballpoint pen or some other writing instrument, disadvantageously.

Furthermore, since the LCD and the electrostatic induction tablet 101 each independently constructed are stacked together into one assembly, the resulting display-integrated type tablet device becomes large and heavyweight. Therefore, considerable obstacles will result in offering more compact small-sized computers and word processors that demanders desire. Also, it will account for increase in cost.

SUMMARY OF THE INVENTION

Therefore, a first object of the present invention is to provide a display-integrated type tablet device which has a display screen easy to view for feeding any point on the display screen with an electronic pen and which can be easily made more compact and less costly.

Further, a second object of the present invention is to provide a display-integrated type tablet device capable of simultaneously detecting the x- and y-coordinates of the tip of the electronic pen in achieving the above-mentioned first object.

Yet further, a third object of the present invention is to provide a display-integrated type tablet device capable of preventing polarity inversion of an induced voltage signal fed from the electronic pen in achieving the above-mentioned first object.

In order to achieve the aforementioned objects, a first display-integrated type tablet device according to the present invention comprises: a liquid crystal panel which has a plurality of segment electrodes arranged in parallel and a plurality of common electrodes arranged in parallel and which is driven by a duty-type drive method; an electronic pen having at its tip an electrode of certain high input impedance coupled with the segment electrodes and the common electrodes of the liquid crystal panel by floating capacity; a display control circuit for producing a display control signal and display data for displaying an image onto a pixel matrix constructed by crossing regions between the plurality of segment electrodes and the plurality of common electrodes of the liquid crystal panel; a detection control circuit for producing a scan control signal for scanning the segment electrodes and the common electrodes of the liquid crystal panel; a switching circuit for switchedly selecting a side of the display control circuit for a display period to produce the display control signal and display data from the display control circuit while switchedly selecting a side of the detection control circuit for a coordinate detection period to produce the scan control signal from the detection control circuit; a common drive circuit for generating a common electrode drive signal during the display period to select in turn among the common electrodes according to the display control signal from the switching circuit while generating a common electrode scan signal during the coordinate detection period to scan the common electrodes in turn without displaying the image onto the pixel matrix according to the scan control signal from the switching circuit; a segment drive circuit for generating a segment electrode drive signal during the display period to display pixels relative to the common electrodes selected by the common electrode drive signal according to the display control signal and display data from the switching circuit while generating a segment electrode scan signal during the coordinate detection period to scan the segment electrodes in turn without displaying the image onto the pixel matrix according to the scan control signal from the switching circuit; and a coordinate detection circuit for receiving an input of induced voltage developed to the electrode of the electronic pen according to each scan signal fed from the common drive circuit and the segment drive circuit to the common electrodes and the segment electrodes and for, during the coordinate detection period, detecting the coordinate of the tip of the electronic pen by a predetermined procedure on the basis of the induced voltage derived from the electronic pen to produce an x-coordinate signal and a y-coordinate signal, wherein the display period and the coordinate detection period is appropriately set by the control circuit, so that during the set display period the image is displayed onto the pixel matrix of the liquid crystal panel while during the coordinate detection period a point of the tip of the electronic pen on the liquid crystal panel is detected without displaying the image onto the pixel matrix.

A second display-integrated type tablet device according to the present invention is as described in the first one of the invention, wherein the common drive circuit and the segment drive circuit generate the common electrode scan signal and the segment electrode scan signal during the coordinate detection period such that a voltage applied to the liquid crystal of the pixels is lower than a threshold value of the liquid crystal display voltage.

A third display-integrated type tablet device according to the present invention is as described in the first or second one of the invention, wherein at least one drive circuit of the common drive circuit and the segment drive circuit generates such a scan signal during the coordinate detection period that scan pulses are simultaneously fed to a specified number of electrodes in the liquid crystal panel.

A fourth display-integrated type tablet device according to the present invention is as described in any one of the first to third ones of the invention, wherein either one drive circuit of the common drive circuit or the segment drive circuit, whichever feeds a scan signal to one group of electrodes farther from the electronic pen, generates a scan signal having a peak value higher than that of a scan signal generated by the other drive circuit during the coordinate detection period.

A fifth display-integrated type tablet device according to the present invention is as described in the third one of the invention, wherein either one drive circuit of the common drive circuit or the segment drive circuit, whichever feeds a scan signal to one group of electrodes farther from the electronic pen, generates such a scan signal during the coordinate detection period that scan pulses are simultaneously fed to a specified number of electrodes more than the number of electrodes to which scan pulses are simultaneously fed by the other drive circuit.

A sixth display-integrated type tablet device according to the present invention is as described in any one of the first to third ones of the invention, wherein the coordinate detection circuit has an amplifier, and wherein for detecting the coordinate of the tip of the electronic pen on the basis of an induced voltage caused to the electrode of the electronic pen by a scan signal fed to one of the two electrode groups, the common electrodes and the segment electrodes, whichever farther from the electronic pen, the coordinate of the tip of the electronic pen is determined after the induced voltage has been amplified at a first amplification factor while for detecting the coordinates of the tip of the electronic pen on the basis of an induced voltage caused to the electrode of the electronic pen by a scan signal fed to the other group of electrodes, the coordinate of the tip of the electronic pen is determined after the induced voltage has been amplified at a second amplification factor smaller than the first amplification factor.

A seventh display-integrated type tablet device according to the present invention is as described in any one of the first to sixth ones of the invention, further comprising: a display a.c. conversion signal generating section for generating a display a.c. conversion signal for setting a time point at which the voltage applied to the liquid crystal of each pixel in the pixel matrix is inverted during the display period; and a detection a.c. conversion signal generating section for setting a time point at which a voltage is applied to the liquid crystal of each pixel during the coordinate detection period and further generating a detection a.c. conversion signal for inverting the direction in which the voltage is applied at a time point other than during the common electrode scan period and the segment electrode scan period, wherein during the display period the common drive circuit and the segment drive circuit generate such a common electrode drive signal and a segment electrode drive signal, respectively, that the direction in which a voltage is applied to the liquid crystal of each pixel is inverted according to the display a.c. conversion signal while during the coordinate detection period they generate such a common electrode scan signal and a segment electrode scan signal that the direction in which a voltage is applied to the liquid crystal of each pixel is inverted according to the display a.c. conversion signal.

An eighth display-integrated type tablet device according to the present invention is as described in any one of the first to sixth ones of the invention, further comprising: a display a.c. conversion signal generating section for generating a display a.c. conversion signal for setting a time point at which the voltage applied to the liquid crystal of each pixel in the pixel matrix is inverted during the display period, wherein during the display period the common drive circuit and the segment drive circuit generate such a common electrode drive signal and a segment electrode drive signal, respectively, that the direction in which a voltage is applied to the liquid crystal of each pixel is inverted according to the display a.c. conversion signal while during the coordinate detection period they generate such a common electrode scan signal and a segment electrode scan signal, respectively, that the average value of voltage applied to the liquid crystal of each pixel is made zero without inverting the relation whether the scan voltage level is higher or lower than the relevant reference voltage level.

A ninth display-integrated type tablet device according to the present invention is as described in the eighth one of the invention, wherein the common drive circuit and the segment drive circuit generates the common electrode scan signal and the segment electrode scan signal, respectively, equal in their reference voltage value during the coordinate detection period.

A tenth display-integrated type tablet device according to the present invention is as described in the ninth one of the invention, wherein the common drive circuit and the segment drive circuit generate the common electrode scan signal and the segment electrode scan signal, respectively, equal in peak values of their scan pulses during the coordinate detection period.

An eleventh display-integrated type tablet device according to the present invention is as described in any one of the eighth to tenth ones of the invention, wherein at least one drive circuit of the common drive circuit and the segment drive circuit generates such a common electrode drive signal or a segment electrode drive signal that the average value of voltage applied to the liquid crystal of each pixel is made zero without inverting the relation whether the scan voltage level is higher or lower than the relevant reference voltage level by setting an interval, which does not contribute to coordinate detection, into a waveform of the scan signal and inserting a signal having a specified waveform into the interval during the coordinate detection period.

A twelfth display-integrated type tablet device according to the present invention is as described in any one of the eighth to eleventh ones of the invention, wherein either one drive circuit of the common drive circuit or the segment drive circuit generates such a common electrode drive signal or a segment electrode drive signal during the coordinate detection period that the average value of voltage applied to the liquid crystal of each pixel is made zero without inverting the relation whether the scan voltage level is higher or lower than the relevant reference voltage level, by making either one value of pulse width or peak value of a scan pulse inserted into the scan signal different from the either one value of pulse width or peak value of a scan pulse inserted into a scan signal generated by the other drive circuit of the common drive circuit or the segment drive circuit.

A thirteenth display-integrated type tablet device according to the present invention is as described in the twelfth one of the invention, wherein either one drive circuit of the common drive circuit or the segment drive circuit, whichever applies a scan signal to one group of the electrodes farther from the electronic pen, generates a scan signal into which a scan pulse having a peak value higher than that of a scan pulse inserted into a scan signal generated by the other drive circuit is inserted during the coordinate detection period, and wherein during the coordinate detection period the other drive circuit generates a scan signal into which a scan pulse having a pulse width greater than that of a scan pulse inserted into the scan signal generated by the one drive circuit is inserted.

A fourteenth display-integrated type tablet device according to the present invention is as described in any one of the first to thirteenth ones of the invention, wherein at least one drive circuit of the common drive circuit and the segment drive circuit generates during the coordinate detection period a scan signal in which a high-frequency wave has been inserted into the scan period in the scan signal, and wherein the coordinate detection circuit, having a filter for separating a high-frequency component of an induced voltage derived from the electronic pen, separates the high-frequency component of an induced voltage developed to the electrode of the electronic pen according to the scan signal, generated by the one drive circuit, into which the high-frequency wave has been inserted and thereby detects coordinates of the tip of the electronic pen by a predetermined procedure according to the separated high-frequency component.

A fifteenth display-integrated type tablet device according to the present invention is as described in the fourteenth one of the invention, wherein the common drive circuit generates during the coordinate detection period a common electrode scan signal in which a first high-frequency wave having a specified frequency has been inserted into the scan period, the segment drive circuit generates during the coordinate detection period a segment electrode scan signal in which a second high-frequency wave having a specified frequency different from the first high-frequency wave has been inserted into the scan period, and wherein the coordinate detection circuit has both a first filter for separating the first high-frequency component of an induced voltage developed to the electrode of the electronic pen according to the common electrode scan signal and the segment electrode scan signal and a second filter for separating the second high-frequency component thereof, and detects the y-coordinate of the tip of the electronic pen by a predetermined procedure according to the first high-frequency component separated by the first filter while it detects the x-coordinate of the tip of the electronic pen by a predetermined procedure according to the second high-frequency component separated by the second filter.

A sixteenth display-integrated type tablet device according to the present invention is as described in the fifteenth one of the invention, wherein the frequencies of the first and the second high-frequency waves are not any odd multiple of each other.

And, a seventeenth display-integrated type tablet device according to the present invention is as described in any one of the first to eighth, the eleventh, and the fourteenth ones of the invention, wherein the common drive circuit generates during the display period a common electrode drive signal in which a high-frequency wave has been superimposed on a select pulse of the common electrode drive signal while the coordinate detection circuit, having a filter for separating a high-frequency component of an induced voltage derived from the electronic pen, separates during the display period the high-frequency component of the induced voltage developed to the electrode of the electronic pen with the common electrode drive signal in which the high-frequency wave has been superimposed on the select pulse fed from the common drive circuit by the filter, and detects the y-coordinate of the tip of the electronic pen by a predetermined procedure according to the separated high-frequency component.

In the first display-integrated type tablet device of the invention, in compliance with control of the control circuit, the display control circuit side is switchedly selected by the switching circuit, turning into a display period. Then a display control signal and display data from the display control circuit are output from the switching circuit. Subsequently, a common electrode drive signal for selecting in turn among the common electrodes of the liquid crystal panel is generated by the common drive circuit according to the display control signal from the switching circuit. Meanwhile, a segment electrode drive signal for displaying the pixels relevant to the common electrodes selected by the common electrode drive signal is generated by the segment drive circuit according to the display control signal and display data from the switching circuit.

Thus, during the display period, pixels of the rows selected in turn out of the pixel matrix of the liquid crystal panel according to the generated common electrode drive signal and the segment electrode drive signal are displayed in a duty-type display method in accordance with the display data.

Also, in compliance with control of the control circuit, the detection control circuit side is switchedly selected by the switching circuit, turning into a coordinate detection period. Then a detection control signal from the detection control circuit is produced from the switching circuit. Subsequently, according to the detection control signal from the switching circuit, a segment electrode scan signal for scanning the electrodes in turn is generated by the segment drive circuit without displaying an image onto the pixel matrix of the liquid crystal panel, and fed to the segment electrodes. As a result, according to the segment electrode scan signal fed to the segment electrodes, an induced voltage is developed to the electrode of the electronic pen. Thus, when the induced voltage developed to the electrode of the electronic pen is fed to the coordinate detection circuit, the x-coordinate of the tip of the electronic pen is detected by the coordinate detection circuit by a predetermined procedure on the basis of the induced voltage derived from the electronic pen, so that an x-coordinate signal is produced.

Meanwhile, according to the detection control signal from the switching circuit, a common electrode scan signal for scanning in turn the electrodes without displaying an image onto the pixel matrix of the liquid crystal panel is generated, and fed to the electrodes. As a result, according to the common electrode scan signal fed to the common electrodes, an induced voltage is developed to the electrode of the electronic pen and fed to the coordinate detection circuit. Then on the basis of the induced voltage derived from the electronic pen, the y-coordinate of the tip of the electronic pen is detected by the coordinate detection circuit by a predetermined procedure, so that a y-coordinate signal is produced.

Thus, in the coordinate detection period, the liquid crystal panel operates as an electrostatic induction tablet, allowing the position of the tip of the electronic pen to be detected using the liquid crystal panel.

In the second display-integrated type tablet device of the invention, during the coordinate detection period, the common electrode scan signal and the segment electrode scan signal is generated by the common drive circuit and the segment drive circuit such that the voltage applied to the liquid crystal of each pixel of the liquid crystal panel is lower than the threshold value of the liquid crystal display voltage.

Thus, during the coordinate detection period, the electrodes are scanned without an image being displayed onto the pixel matrix.

In the third display-integrated type tablet device of the invention, during the coordinate detection period, such a scan signal is generated by at least one drive circuit of the common drive circuit and the segment drive circuit that scan pulses are simultaneously applied to a specified number of electrodes in the liquid crystal panel. As a result, the specified number of electrodes are simultaneously scanned according to the generated scan signal, thus a high induced voltage is developed to the electronic pen. Then coordinates of the tip of the electronic pen are detected by the coordinate detection circuit on the basis of the high induced voltage derived from the electronic pen.

Thus, during the coordinate detection period, when the coordinates of the tip of the electronic pen are detected using the liquid crystal panel of a high-density pixel matrix having a small floating capacity to couple the electrodes of the liquid crystal panel and the electrode of the electronic pen, the tip coordinates are detected accurately on the basis of the high induced voltage developed to the electrode of the electronic pen according to the scan pulses simultaneously applied to the specified number of electrodes.

In the fourth display-integrated type tablet device of the invention, during the coordinate detection period, by either one drive circuit of the common drive circuit or the segment drive circuit, whichever feeds a scan signal to one group of the electrodes farther from the electronic pen, there is generated a scan signal having a peak value higher than that of a scan signal generated by the other drive circuit. Accordingly, the level of the induced voltage developed to the electrode of the electronic pen according to the scan signal fed to one group of the electrodes farther from the electronic pen is set higher.

Thus, during the coordinate detection period, when the group of electrodes farther from the electronic pen are scanned, the induced voltage is prevented from lowering, thereby allowing the x- and y-coordinates of the tip of the electronic pen to be detected with great stability.

In the fifth display-integrated type tablet device of the invention, during the coordinate detection period, by either one drive circuit of the common drive circuit or the segment drive circuit, whichever feeds a scan signal to one group of electrodes farther from the electronic pen, there is generated such a scan signal that scan pulses are simultaneously fed to a specified number of electrodes greater than that of electrodes to which scan pulses are simultaneously fed by the other drive circuit. Accordingly, the level of the induced voltage developed to the electrode of electronic pen according to the scan signal fed to the group of electrodes farther from the electronic pen is set higher.

Thus, during the coordinate detection period, when the group of electrodes farther from the electronic pen are scanned, the induced voltage is prevented from lowering, thereby allowing the x- and y-coordinates of the tip of the electronic pen to be detected with great stability.

In the sixth display-integrated type tablet device of the invention, for detecting the coordinates of the tip of the electronic pen on the basis of an induced voltage caused to the electrode of the electronic pen by a scan signal fed to one of the two electrode groups, the common electrodes and the segment electrodes, whichever farther from the electronic pen, the coordinates of the tip of the electronic pen are determined after the induced voltage has been amplified at a first amplification factor.

On the other hand, for detecting the coordinates of the tip of the electronic pen on the basis of an induced voltage caused to the electrode of the electronic pen by a scan signal fed to the other group of electrodes, the coordinates of the tip of the electronic pen are determined after the induced voltage has been amplified at a second amplification factor smaller than the first amplification factor.

Thus, during the coordinate detection period, the accuracy of coordinate detection in scanning the electrodes farther from the electronic pen for detection can be prevented from lowering, and the x- and y-coordinates of the tip of the electronic pen can be detected with high reliability.

In the seventh display-integrated type tablet device of the invention, during the display period, by the display a.c. conversion signal generating section there is generated a display a.c. conversion signal for setting a time point at which the direction in which a voltage is applied to the liquid crystal of each pixel in the pixel matrix is inverted. Then according to the generated display a.c. conversion signal, by the common drive circuit and the segment drive circuit there are generated such a common electrode drive signal and a segment electrode drive signal that the direction in which a voltage is applied to the liquid crystal of each pixel is inverted.

Thus, during the display period, when an image is displayed onto the pixel matrix of the liquid crystal panel in a duty-type display method according to the generated common electrode drive signal and segment electrode drive signal, the direction in which a voltage is applied to each pixel is inverted, whereby the liquid crystal is prevented from any reduction in service life due to electrolysis.

On the other hand, during the coordinate detection period, by the detection a.c. conversion signal generating section there is generated a detection a.c. conversion signal for setting a time point at which the direction in which a voltage is applied to the liquid crystal of each pixel is inverted, and for inverting the direction in which the voltage is applied at a time point other than during the common electrode scan period and the segment electrode scan period. Then according to the generated detection a.c. conversion signal, by the common drive circuit and the segment drive circuit there are generated such a common electrode scan signal and a segment electrode scan signal that the direction in which a voltage is applied to the liquid crystal of each pixel is inverted.

Thus, during the coordinate detection period, when the common electrodes and the segment electrodes are scanned according to the generated common electrode scan signal and segment electrode scan signal, the direction in which a voltage is applied to each pixel is inverted at a time point other than during the common electrode scan period and the segment electrode scan period, whereby the liquid crystal is prevented from any reduction in service life.

In the eighth display-integrated type tablet device of the invention, during the display period, by the common drive circuit and the segment drive circuit there are generated such a common electrode drive signal and a segment electrode drive signal that the direction in which a voltage is applied to the liquid crystal of each pixel is inverted according to the display a.c. conversion signal generated by the display a.c. conversion signal generating section.

Thus, when an image is displayed onto the pixel matrix of the liquid crystal panel in a duty-type display method, the direction in which a voltage is applied to each pixel is inverted, thereby preventing the liquid crystal from any reduction in service life due to electrolysis.

On the other hand, during the coordinate detection period, by the common drive circuit and the segment drive circuit there are generated such a common electrode scan signal and a segment electrode scan signal, respectively, that the average value of voltage applied to the liquid crystal of each pixel is made zero without inverting the relation whether the scan voltage level is higher or lower than the relevant reference voltage level.

Thus, when the electrodes of the liquid crystal panel are scanned, the average value of voltage applied to each pixel is made zero, thereby preventing the liquid crystal from any reduction in service life.

In the ninth display-integrated type tablet device of the invention, during the coordinate detection period, by the common drive circuit and the segment drive circuit there are generated a common electrode scan signal and a segment electrode scan signal, respectively, equal in their reference voltages.

Thus, by rendering both the scan signals equal in reference voltage, the average value of voltage applied to each pixel is made zero.

In the tenth display-integrated type tablet device of the invention, during the coordinate detection period, by the common drive circuit and the segment drive circuit there are generated such a common electrode scan signal and a segment electrode scan signal, respectively, that not only their reference voltages but also their peak values of scan pulses are equal.

Thus, by rendering the two scan signals equal to each other both in reference voltage and in peak value of scan pulses, the average value of voltage applied to each pixel is made zero.

In the eleventh display-integrated type tablet device of the invention, during the coordinate detection period, by at least one drive circuit of the common drive circuit and the segment drive circuit, an interval that does not contribute to coordinate detection is provided in a scan signal. Then there is generated a scan signal which has a specified waveform inserted into the interval that does not contribute to coordinate detection.

Thus, by adding a signal of a specified waveform to the one of the common electrode scan signal and the common electrode scan signal so as to correct any deviation from zero of the average value of voltage applied to each pixel, the average value of voltage applied to each pixel is made zero without inverting the relation in each scan signal whether the scan voltage level is higher or lower than the relevant reference voltage level.

In the twelfth display-integrated type tablet device of the invention, during the coordinate detection period, by either one drive circuit of the common drive circuit or the segment drive circuit, either one value of pulse width or peak value of a scan pulse inserted into the scan signal is set to a value different from the one value of pulse width or peak value of a scan pulse inserted into a scan signal generated by the other drive circuit.

Thus, by controlling the pulse width or peak value of the scan pulse of the either one of the common electrode scan signal or the segment electrode scan signal, the average value of voltage applied to each pixel is made zero without inverting the relation in each scan signal whether the scan voltage level is higher or lower than the relevant reference voltage level.

In the thirteenth display-integrated type tablet device of the invention, during the coordinate detection period, by one drive circuit of the common drive circuit and the segment drive circuit, whichever feeds a scan signal to one group of electrodes farther from the electronic pen, there is generated a scan signal into which a scan pulse has been inserted that has a peak value higher than that of the scan pulse inserted into the scan signal generated by the other drive circuit. Also, by the other drive circuit there is generated a scan signal into which a scan pulse has been inserted that has a pulse width greater than that of the scan pulse inserted into the scan signal generated by the one drive circuit.

Thus, by enlarging the pulse width of the scan pulse of the scan signal fed to one group of electrodes closer to the electronic pen instead of heightening the peak value of the scan pulse of the scan signal fed to one group of electrodes farther from the electronic pen, the average value of voltage applied to each pixel is made zero without inverting the relation in each scan signal whether the scan voltage level is higher or lower than the reference voltage level.

In the fourteenth display-integrated type tablet device of the invention, during the coordinate detection period, by at least one drive circuit of the common drive circuit and the segment drive circuit there is generated a scan signal in which a high-frequency wave has been inserted into the scan period in the scan signal. Then, when an induced voltage developed to the electrode of the electronic pen according to the generated scan signal into which the high-frequency wave has been inserted is fed to the coordinate detection circuit, the high-frequency component of the induced voltage from the electronic pen is separated by the filter of the coordinate detection circuit. Subsequently according to the separated high-frequency component of the induced voltage from the electronic pen, coordinates of the tip of the electronic pen are detected by a predetermined procedure.

Thus, during the coordinate detection period, any external noise, if superimposed on the induced voltage from the electronic pen, would positively be removed by the coordinate detection circuit, allowing the tip coordinates to be detected accurately.

In the fifteenth display-integrated type tablet device of the invention, during the coordinate detection period, by the common drive circuit there is generated a common electrode scan signal in which a first high-frequency wave having a specified frequency has been inserted into the scan period. Also, by the segment drive circuit there is generated a segment electrode scan signal in which a second high-frequency wave having a specified frequency different from the first high-frequency wave has been inserted into the scan period.

When an induced voltage developed to the electrode of the electronic pen according to the common electrode scan signal and the segment electrode scan signal generated as described above is fed to the coordinate detection circuit, the first high-frequency component of the induced voltage is separated by a first filter while the second high-frequency component is separated by a second filter. Then the y-coordinate of the tip of the electronic pen is detected by a predetermined procedure according to the separated fist high-frequency component while the x-coordinate is detected according to the second high-frequency component.

Thus, even when the scanning of the common electrode and that of the segment electrode are simultaneously carried out during the coordinate detection period, the x- and y-coordinates of the tip of the electronic pen are accurately detected on the basis of the induced voltage on which the first and second high-frequency waves from the electronic pen have been superimposed.

In the sixteenth display-integrated type tablet device of the invention, when some distortion occurs in the waveform of the first high-frequency wave contained in the common electrode scan signal or in that of the second high-frequency wave contained in the segment electrode scan signal, a harmonic wave that is an odd multiple of the frequency of the high-frequency wave is involved in the scan signal. However, since the frequency of the first high-frequency wave and that of the second high-frequency wave are not any odd multiple of each other, the first high-frequency component and the second high-frequency component will positively be separated by the first and the second filters of the coordinate detection circuit.

Thus, it is ensured that the coordinates of the tip of the electronic pen are detected correctly at all times.

In the seventeenth display-integrated type tablet device of the invention, during the display period, by the common drive circuit there is generated a common electrode drive signal in which a high-frequency wave has been superimposed on a select pulse in the common electrode drive signal. Then, when an induced voltage developed to the electrode of the electronic pen according to the common electrode drive signal in which the high-frequency wave has been superimposed on the select pulse is put in the coordinate detection circuit, the high-frequency component of the induced voltage from the electronic pen is separated by the filter of the coordinate detection circuit. Subsequently according to the separated high-frequency component of the induced voltage from the electronic pen, the y-coordinate of the tip of the electronic pen is detected by a predetermined procedure.

Thus, during the display period, an image is displayed onto the pixel matrix of the liquid crystal panel while the y-coordinate of the tip of the electronic pen is detected with the high-frequency wave from the electronic pen. In this way, when the liquid crystal panel of a high-density pixel matrix is put into display, the coordinate detection period is shortened by eliminating the y-coordinate detection period, whereby a sufficient length of display period is ensured.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described in detail below in conjunction with the embodiments as illustrated in the accompanying drawings.

EXAMPLE 1

Figure 1:
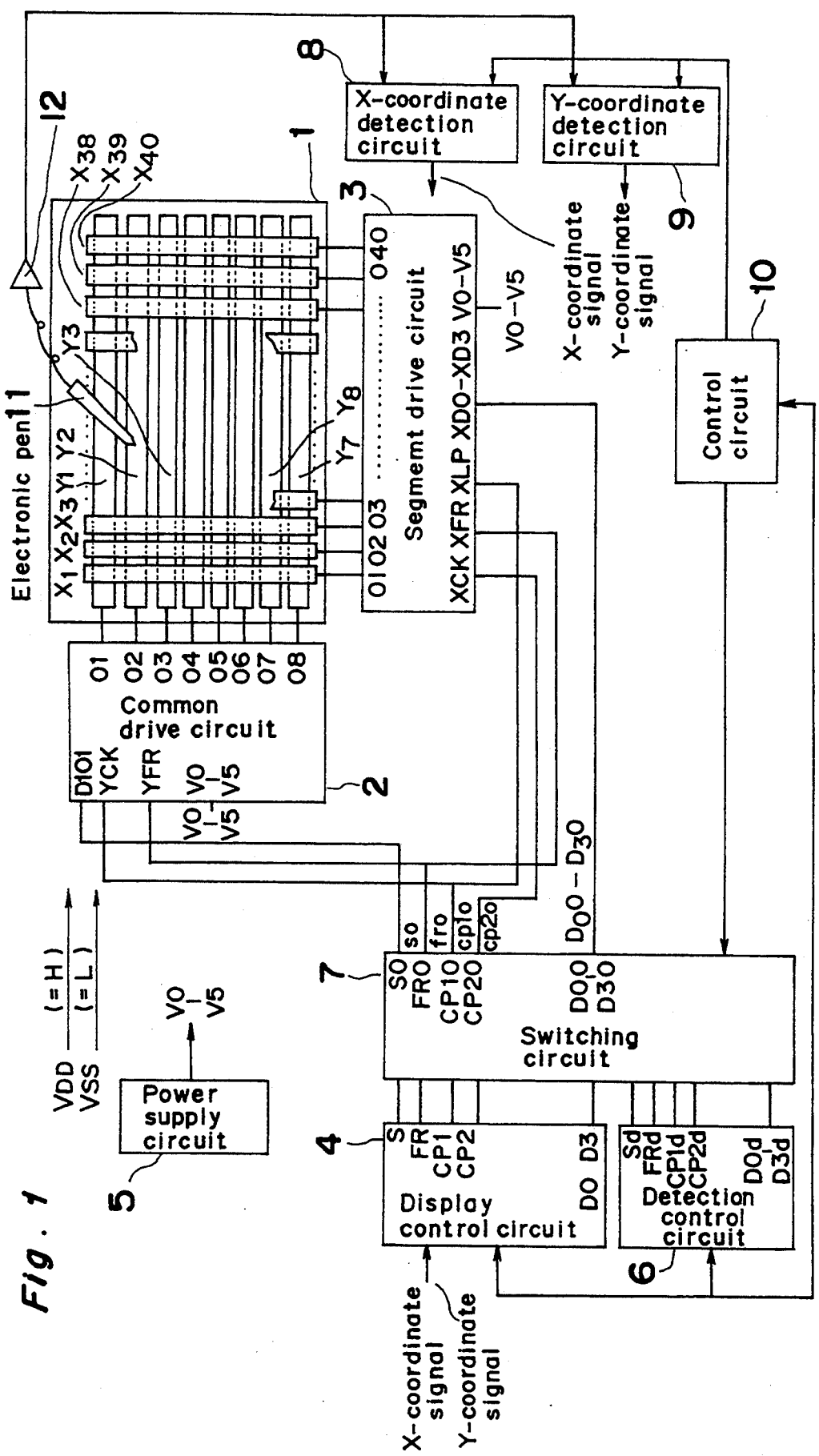
FIG. 1 is a block diagram of an embodiment of the display-integrated type tablet device according to Example 1 of the present invention.

FIG. 1 is a block diagram of a display-integrated type tablet device presented as Example 1 of the invention. This display-integrated type tablet device, designed to achieve the first object as stated before, is a tablet device into which the display function is integrated by using the electrodes and drive circuit of the liquid crystal panel in a duty-type LCD (liquid crystal display) also as the electrodes and drive circuit of the electrostatic induction tablet.

Before describing the display-integrated type tablet device according to the present embodiments, the duty-type LCD is first described in brief.

Figure 30:
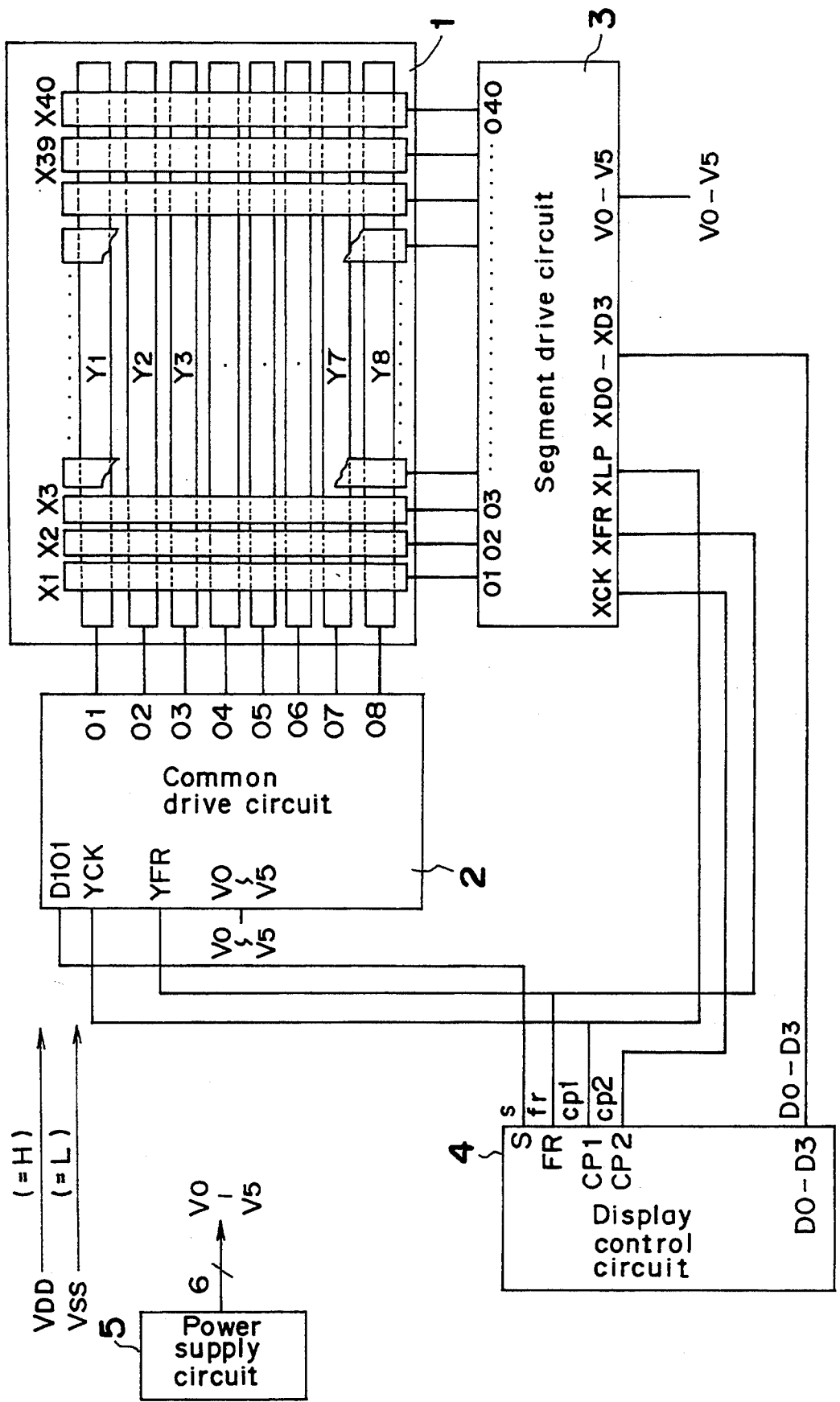
FIG. 30 is a block diagram of a duty-type LCD.

FIG. 30 is a block diagram of a common duty-type LCD. A liquid crystal panel 1 is so constructed that a transparent substrate on which a plurality of common electrodes $Y_1, Y_2, \ldots, Y_8$ (hereinafter, an arbitrary common electrode is represented as Y) are arranged in parallel and another transparent substrate on which a plurality of segment electrodes $X_1, X_2, \ldots, X_{40}$ (hereinafter, an arbitrary segment electrode is represented as X) are arranged in parallel are disposed at a specified interval with a spacer or the like interposed therebetween in such a way that both groups of electrodes, the common electrodes Y and the segment electrodes X are opposed to each other and crossed at right angles. Further, between the two transparent substrates there is liquid crystal filled up.

This arrangement enables pixels to be provided at regions where the common electrodes Y and the segment electrodes X cross each other. In more detail, the liquid crystal panel 1 has pixels of 40 dots×8 dots arranged in a matrix form while it is driven by a duty-type drive method.

The common electrodes $Y_1, Y_2, \ldots, Y_8$ are connected to their corresponding output terminals 01, 02, ..., 08 of a common drive circuit 2. A select pulse of a common electrode drive signal fed from the output terminals 01, 02, ..., 08 of the common drive circuit 2 makes a common electrode Y active, thereby selecting a row of the pixel matrix. On the other hand, the segment electrodes $X_1, X_2, \ldots, X_{40}$ are connected to their corresponding output terminals 01, 02, ..., 040 of a segment drive circuit 3. A segment electrode drive signal that depends on display data is fed from the output terminals 01, 02, ..., 040 of the segment drive circuit 3 to the segment electrodes $X_1, X_2, \ldots, X_{40}$.

Then pixels in the rows of the pixel matrix selected by the common electrode drive signal derived from the common drive circuit 2 are displayed by the segment electrode drive signal derived from the segment drive circuit 3 in accordance with the display data.

The above-mentioned common drive circuit 2 and segment drive circuit 3 are connected to a display control circuit 4, as described below.

A shift data output terminal S of the display control circuit 4 is connected to a shift data input terminal DIO1 of the common drive circuit 2. An a.c. conversion signal output terminal FR of the display control circuit 4 is connected both to an a.c. conversion signal input terminal YFR of the common drive circuit 2 and to an a.c. conversion signal input terminal XFR of the segment drive circuit 3. A clock output terminal CP1 of the display control circuit 4 is connected both to a clock input terminal YCK of the common drive circuit 2 and to a latch pulse input terminal XLP of the segment drive circuit 3. A clock output terminal CP2 of the display control circuit 4 is connected to a clock input terminal XCK of the segment drive circuit 3. And, display data output terminals D0 to D3 of the display control circuit 4 are connected to display data input terminals XD0 to XD3 of the segment drive circuit 3.

A power supply circuit 5 supplies the common drive circuit 2 and the segment drive circuit 3 with plural levels of bias power supplies $V_0$ to $V_5$ used to generate a drive signal for drive the liquid crystal panel 1 in the common drive circuit 2 and the segment drive circuit 3. In the case of this LCD, the bias power supplies $V_0$ to $V_5$ are set as follows:

$V_0=0.0$ V, $V_1=1.7$ V, $V_2=3.4$ V, $V_3=23.5$ V, $V_4=25.2$ V, and $V_5=26.9$ V.

Figure 31:
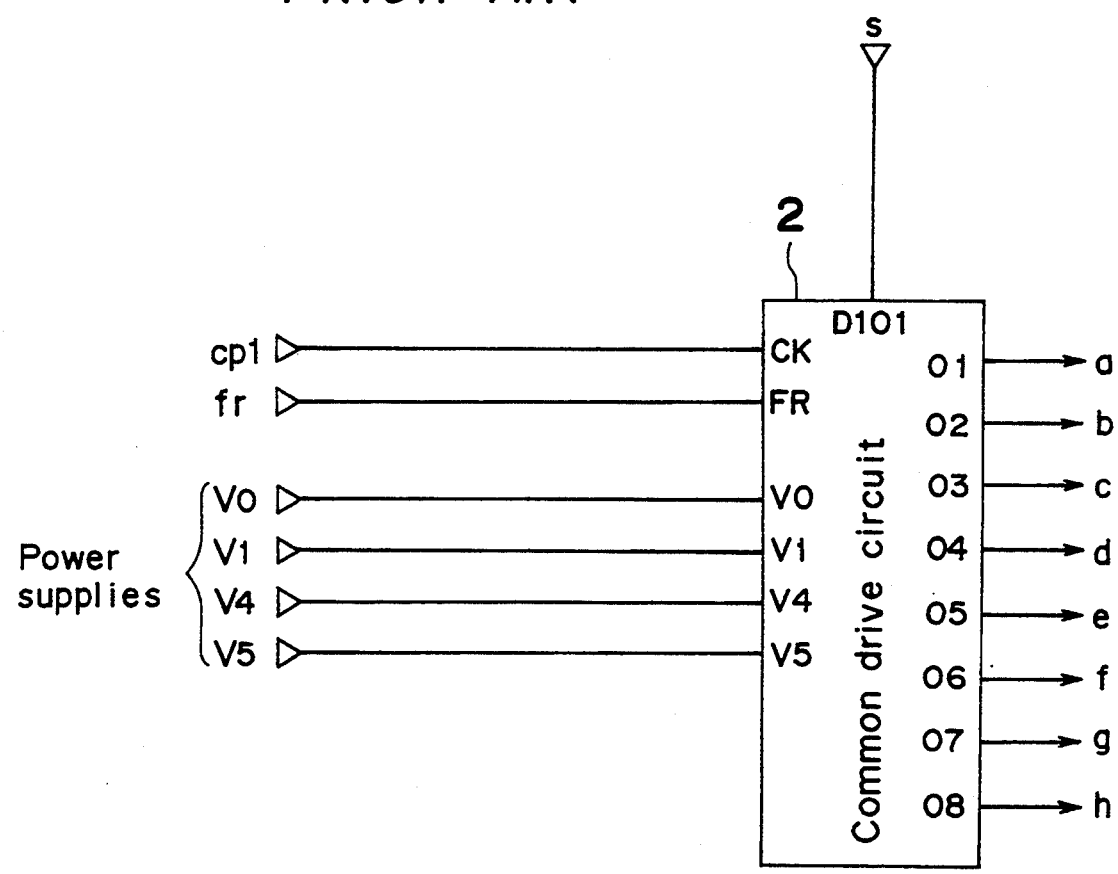
FIG. 31 is a detailed view of terminals of the common drive circuit as shown in FIG. 30.

FIG. 31 is a view showing terminal part of the common drive circuit 2. Common electrode drive signals a, b, ..., h are produced from the output terminals 01, 02, ..., 08 and fed to their corresponding common electrodes $Y_1, Y_2, \ldots, Y_8$ of the liquid crystal panel 1. Also, to the input terminals V0, V1, V4, and V5 are fed bias power supplies $V_0, V_1, V_4$, and $V_5$ derived from the power supply circuit 5, and according to these bias power supplies $V_0, V_1, V_4$, and $V_5$, the aforementioned common electrode drive signals a, b, ..., h are generated in a manner as detailed later.

The duty-type LCD constructed as described above works in the following manner.

Figure 32:
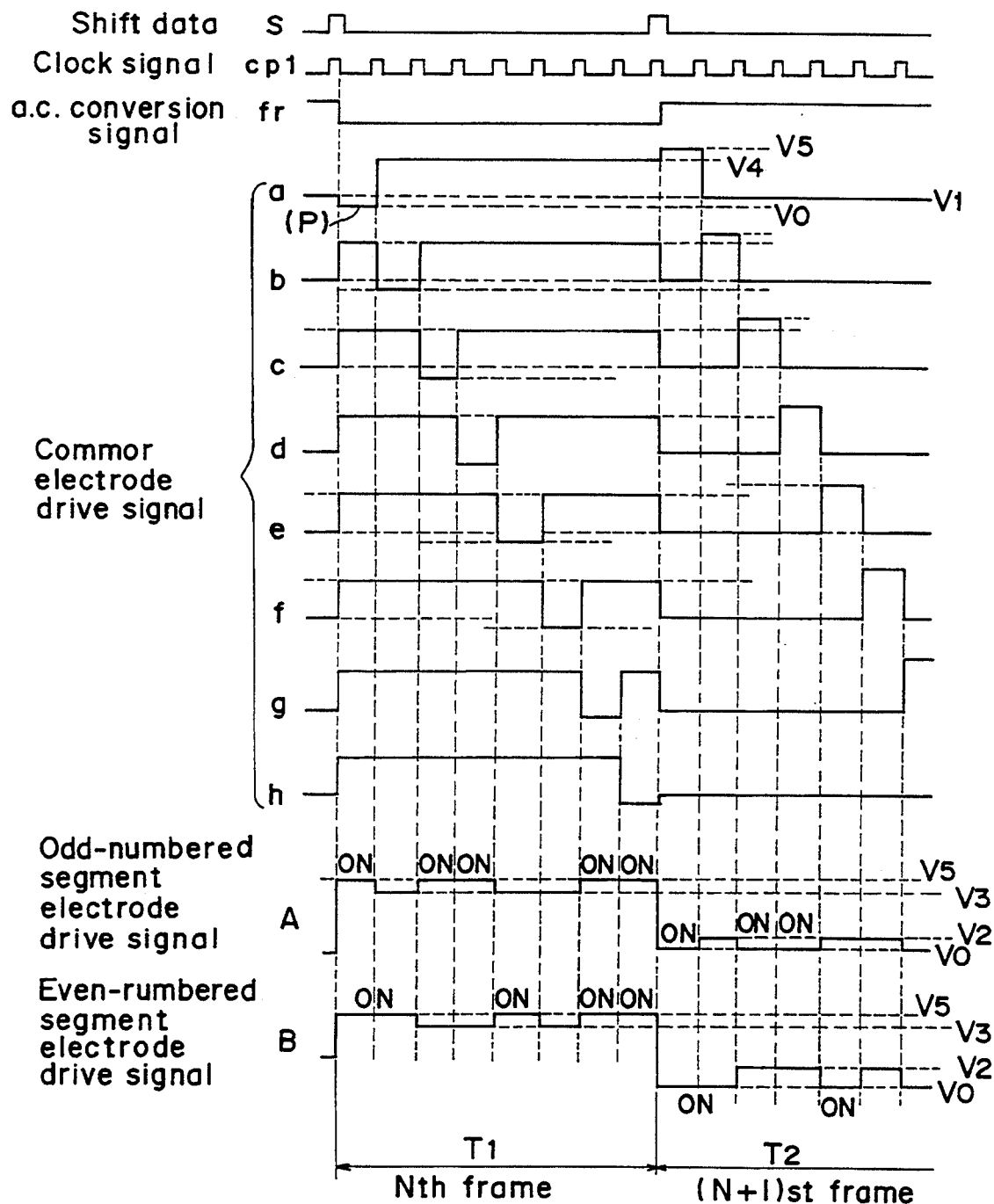
FIG. 32 is a timing chart of the common electrode drive signal and the segment electrode drive signal in the duty-type LCD as shown in FIG. 30.

FIG. 32 is a timing chart of the common electrode drive signals a to h and the segment electrode drive signal. The operation of the duty-type LCD is now described according to FIG. 32 with reference to FIGS. 30 and 31.

When a clock signal cp1 generated from a clock output terminal CP1 of the display control circuit 4 is fed to the clock input terminal YCK, pulses of shift data s generated from the shift data output terminal S of the display control circuit 4 are entrapped into a shift register (not shown) through the shift data input terminal DIO1 in synchronization with the input clock signal cp1. Then corresponding select pulses of the common electrode drive signals a to h are generated one by one from the output terminals 01 to 08 corresponding to the pulse position of the shift data s that has been shifted by the register. In this operation, the common electrode drive signals a to h are generated according to the bias power supplies $V_0$ to $V_5$ supplied from the power supply circuit 5.

On the other hand, when a clock signal cp2 generated from the clock output terminal CP2 of the display control circuit 4 is fed to the clock input terminal XCK, the segment drive circuit 3 shifts a specified position of the segment electrodes X in synchronization with the input clock signal cp2. Then display data $D_0$ to $D_3$, which have been generated from the display data output terminals D0 to D3 of the display control circuit 4 and fed to the display data input terminals XD0 to XD3 of the segment drive circuit 3, are entrapped at bits corresponding to shift positions in the register one by one. This operation is repeated ten times so that the display data for one row of the pixel matrix (40 pixels) are entrapped into the register.

Thereafter, the display data $D_0$ to $D_3$ thus entrapped are latched in synchronization with the clock signal cp1 fed to the latch pulse input terminal XLP. Then a segment electrode drive signal corresponding to the latched display data $D_0$ to $D_3$ is transferred from the output terminals 01 to 040 to corresponding segment electrodes X. The segment electrode drive signal in this case is generated in correspondence to the display data $D_0$ to $D_3$ depending on the bias power supplies $V_0$ to $V_5$ supplied from the power supply circuit 5.

As a consequence of this, pixels relevant to the common electrodes that have become active as a result of being selected by a select pulse (p) of the common electrode drive signal a to be generated from the common drive circuit 2 are displayed by the segment electrode drive signal to be generated from the segment drive circuit 3 in correspondence to the display data.

Thereafter, when the common electrodes $Y_2, Y_3, \ldots, Y_8$ are selected one by one in accordance with select pulses of the common electrode drive signals b to h from the common drive circuit 2 so that one frame image is displayed, the next pulse of the shift data s is entrapped through the shift data input terminal DIO1 of the common drive circuit 2 repeatedly. Subsequently, the above-mentioned operation is repeated by the common drive circuit 2, the segment drive circuit 3, and the display control circuit 4, so that an image for the next frame is displayed.

After this on, the above-described operation will be repeated until the entire image is displayed onto the liquid crystal panel 1.

In consequence, the Nth-frame image is displayed during a period $T_1$ in FIG. 32 and successively the (N+1)st-frame image is displayed during a period $T_2$. While this is done, the number of frames per device time to be displayed is in many cases set to approximately 72 frames/sec so as not to cause any flicker.

In general, if a voltage fixed in its applying direction was continuously applied to the liquid crystal at regions in the liquid crystal panel 1 where the common electrodes $Y_1, Y_2, \ldots, Y_8$ and the segment electrodes $X_1, X_2, \ldots, X_{40}$ cross each other, there would develop electrolysis in the liquid crystal, causing the service life of the liquid crystal to be reduced. Accordingly, to prevent this, the direction in which a voltage is applied to the liquid crystal is changed over for each frame depending on the level of the a.c. conversion signal fr that is to be generated from the a.c. conversion signal output terminal FR of the display control circuit 4 and fed to the a.c. conversion signal input terminal YFR of the common drive circuit 2 and to the a.c. conversion signal input terminal XFR of the segment drive circuit 3.

The operation just mentioned is detailed below taking an actual case thereof.

Figures 33, 34:
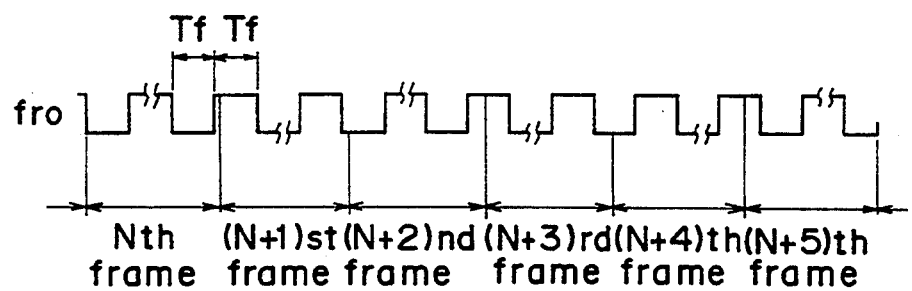
FIG. 33 is an explanatory view of an displayed image according to the common electrode drive signal and the segment electrode drive signal as shown in FIG. 32.
FIG. 34 is an explanatory view of the level inversion cycle of an a.c. conversion signal in the duty-type LCD as shown in FIG. 30.

For instance, assume that a segment electrode drive signal A applied to an odd-numbered segment electrode X and a segment electrode drive signal B applied to an even-numbered segment electrode X has such waveforms as shown in FIG. 32. In this case, it is assumed that the Nth-frame image and the (N+1)st-frame image are identical. As a result of this, the pixels of the liquid crystal panel 1 are as shown in FIG. 33 in the resulting display. In the figure, o designates a displayed pixel while x does a non-displayed pixel.

The above-described inversion of the voltage applied to the liquid crystal is carried out in the following way depending on the level of the a.c. conversion signal fr.

As shown in FIG. 32, in the case where the a.c. conversion signal fr is at an "L" level (i.e. in the case of time $T_1$), select pulse voltage of the common electrode drive signals a to h for making an arbitrary common electrode Y active to thereby select display rows in the pixel matrix of the liquid crystal panel 1 (hereinafter, referred to simply as select voltage) is set to "$V_0$." On the other hand, voltage of the common electrode drive signals a to h for making an arbitrary common electrode Y inactive (hereinafter, referred to as non-select voltage) is "$V_4$." In contrast to this, when the a.c. conversion signal fr is at an "H" level (i.e. in the case of time $T_2$), the select voltage is set to "$V_5$" while the non-select is set to "$V_1$."

Meanwhile, in the case where the a.c. conversion signal fr is at an "L" level (i.e. in the case of time $T_1$), voltage of the segment electrode drive signals A and B for displaying displayed pixels of the selected display rows in the pixel matrix of the liquid crystal panel 1 (i.e. ON voltage in FIG. 32) is set to "$V_5$." On the other hand, voltage of the segment electrode drive signals A and B for keeping the non-displayed pixels of the display rows from being displayed (i.e. OFF voltage in FIG. 32) is set to "$V_3$."

In contrast to this, in the case where the a.c. conversion signal fr is at an "H" level (i.e. in the case of time $T_2$), the ON voltage to the displayed pixels is set to "$V_0$." On the other hand, the OFF voltage to the non-displayed pixels is set to "$V_2$."

Switching between the select voltages "$V_0$" and "$V_5$" and between the non-select voltages "$V_4$" and "$V_1$" performed by the common drive circuit 2, and switching between the applied voltages "$V_5$" and "$V_0$" to display pixels and between the applied voltages "$V_3$" and "$V_2$" to non-displayed pixels, are effected by selecting among the bias power supplies $V_0$ to $V_5$ derived from the power supply circuit 5 with an analog switch that operates in synchronization with change in the level of the a.c. conversion signal fr.

As stated above, in synchronization with change in the level of the a.c. conversion signal fr between "L" and "H," the select voltage of the common electrode drive signals a to h is switched between "$V_0$" and "$V_5$" while the applied voltage to the displayed pixels of the segment electrode drive signals A and B is switched between "$V_5$" and "$V_0$." Thus, the potential difference between the common electrode Y and the segment electrode X at a displayed pixel is ($V_5 - V_0$) irrespective of the level of the a.c. conversion signal fr.

In contrast to this, the potential difference between the common electrode Y and the segment electrode X at a non-displayed pixel becomes either one of ($V_3 - V_0$), ($V_4 - V_3$), and ($V_5 - V_4$) when the a.c. conversion signal fr is at an "L" level. The result in each case is lower than the potential difference between the common electrode Y and the segment electrode X at a displayed pixel.

Therefore, by setting the values of the bias power supplies $V_0$ to $V_5$ so that the value of the potential difference ($V_5 - V_0$) becomes higher than the threshold value of the liquid crystal display voltage and that both the values of the potential difference ($V_5 - V_1$) and the potential difference ($V_4 - V_0$) become lower than the threshold value, it is possible to put the liquid crystal panel 1 into display irrespectively of the level of the a.c. conversion signal fr.

Further, in the above operation, the direction in which a voltage is applied between the common electrode Y and the segment electrode X is inverted in response to level inversion of the a.c. conversion signal fr, thus preventing reduction in the service life of the liquid crystal.

In the above description, it is arranged that the level of the a.c. conversion signal is inverted for each frame to thereby invert the direction in which a voltage is applied to the common electrode drive signal and the segment electrode drive signal. However, when the number of pixels of the liquid crystal panel 1 is large, for example, such that it is a high-density liquid crystal panel of 640 pixels×400 pixels, the direction of voltage between common electrodes Y and segment electrodes X is frequently inverted (e.g. each time 13 rows of common electrodes Y have been selected). In this arrangement, since the total number of common electrodes Y is 400, the switching period of frames and the level inversion period of the a.c. conversion signal fr are not at all synchronous with each other, as shown in FIG. 34.

Accordingly, points at which the direction in which voltage is applied is inverted for a one-field image are dispersed at random, offering an effect that there will be no nonuniformity in bright value due to inversion of the direction in which voltage is applied to pixels.

Embodiment 1

The following describes the display-integrated type tablet device according to the present embodiment.

Figure 35:
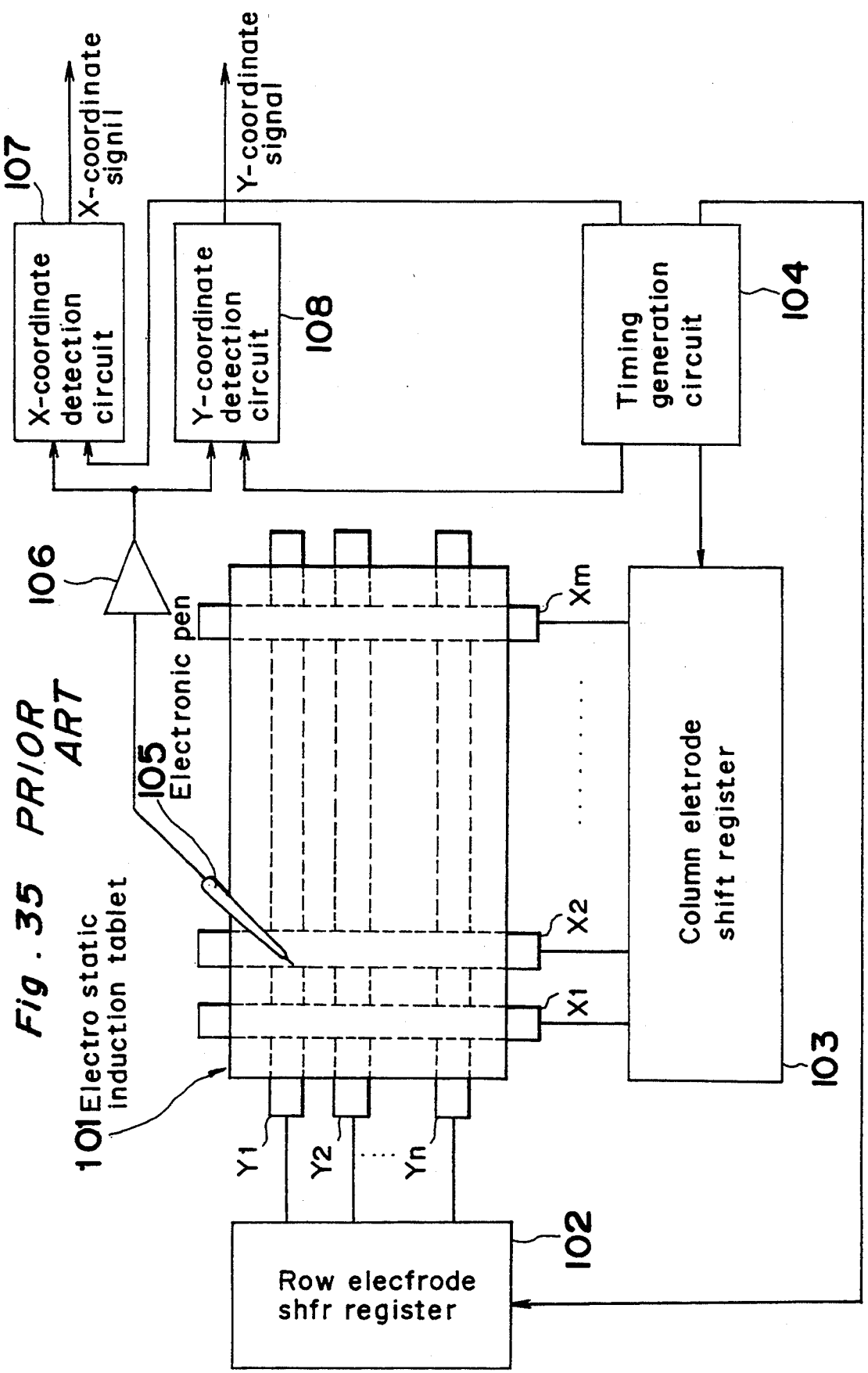
FIG. 35 is a block diagram of an electrostatic induction tablet and its driver section.
Figure 36:
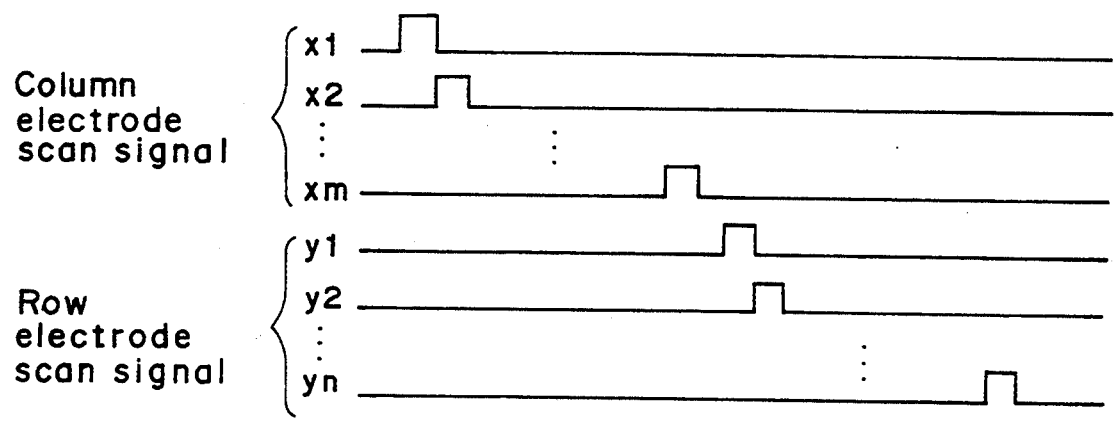
FIG. 36 is a view showing an example of a row electrode scan signal and a column electrode scan signal generated by the driver section as shown in FIG. 35.

As shown in FIG. 35, in the electrostatic induction tablet 101 described above, there are electrodes arranged in the vertical direction and those arranged in the horizontal direction so as to be opposed to each other with small intervals. Also, as shown in FIG. 30, in the liquid crystal panel of the duty-type LCD there are electrodes arranged in the vertical direction and those arranged in the horizontal direction so as to be opposed to each other with small intervals.

Taking advantage of this arrangement, in the present embodiment, a display-integrated type tablet device into which display function is integrated is constructed by using the common/segment electrodes and their common/segment electrode drive circuits in the liquid crystal panel of the duty-type LCD also as column/row electrodes and their column/row electrode drive circuits of the electrostatic induction tablet.

As shown in FIG. 1, the display-integrated type tablet device of the present embodiment is comprised of a detection control circuit 6, a switching circuit 7, an x-coordinate detection circuit 8, a y-coordinate detection circuit 9, a control circuit 10, and an electronic pen 11 in addition to the duty-type LCD of FIG. 30. The liquid crystal panel 1 in this case serves also as an electrostatic induction tablet.

Hereinafter, the liquid crystal panel 1 into which the electrostatic induction tablet function is integrated is referred to simply as a liquid crystal panel.

The detection control circuit 6 operates in approximately the same manner as the timing generation circuit 104 in the electrostatic induction tablet 101 as shown in FIG. 35 does. The switching circuit 7 selectively switches from the shift data s, a.c. conversion signal fr, clock signal cp1, and clock signal cp2 derived from the display control circuit 4 to the shift data sd, a.c. conversion signal frd, clock signal cp1d, and clock signal cp2d derived from the detection control circuit 6, and vice versa, whereby it produces a shift data so, a.c. conversion signal fro, clock signal cp1o, and clock signal cp2o as outputs to the common drive circuit 2 and the segment drive circuit 3.

Then, in the liquid crystal panel 1, with those signals from the display control circuit 4 selected by the switching circuit 7, an image is displayed on a pixel matrix in the manner as described above according to both the common electrode drive signals a to h from the segment drive circuit 2 and the common electrode drive signals A and B from the segment drive circuit 3.

On the other hand, with those signals from the detection control circuit 6 selected by the switching circuit 7, the segment electrodes X and the common electrodes Y of the liquid crystal panel 1 are scanned in the manner as described above to thereby detect the position of the tip of the electronic pen 11 according to common electrode scan signals $Y_1, Y_2, \ldots, Y_8$ (hereinafter, an arbitrary common electrode scan signal is represented as y) from the common drive circuit 2, the signals being produced in a way as described later, and to segment electrode scan signals $x_1, x_2, \ldots, x_{40}$ (hereinafter, an arbitrary segment electrode scan signal is represented as x) from the segment drive circuit 3.

The x-coordinate detection circuit 8 and the y-coordinate detection circuit 9 operate in approximately the same manner as the x-coordinate detection circuit 107 and the y-coordinate detection circuit 108 in the drive section of the electrostatic induction tablet 101 as shown in FIG. 35 does. In more detail, the circuits 8 and 9 detect tip coordinates of the electronic pen 11 on the basis of an induced voltage developed to the tip electrode of the electronic pen 11 (not shown) and the shift data s, clock signal cp1, and clock signal cp2 produced from the detection control circuit 6 to thereby generate the segment electrode scan signal x and the common electrode scan signal y.

To carry out the detection, at the tip electrode of the electronic pen 11 there is provided a resistor having a high resistance value such as a probe of an oscilloscope, or otherwise, if high precision is required, an operational amplifier 12 is connected thereto, so that the impedance as viewed from the tip electrode side of the electronic pen 11 is set higher to thereby heighten the induced voltage to be developed to the tip electrode, and that the impedance as viewed from the leads is lowered to thereby prevent any external noise from being caught with the leads.

From the tip electrode of the electronic pen 11, an induced voltage is being generated even while an image is displayed onto the pixel matrix of the liquid crystal panel 1. However, the x-coordinate detection circuit 8 and the y-coordinate detection circuit 9 will operate only while the segment electrodes X and the common electrodes Y are scanned with those signals from the detection control circuit 6 selected by the switching circuit 7, whereby the tip coordinates of the electronic pen 11 are detected.

The display-integrated type tablet device constructed as described above operates in the following manner, so that an image is displayed to the pixel matrix and that tip coordinates of the electronic pen 11 are detected.

Figure 2:
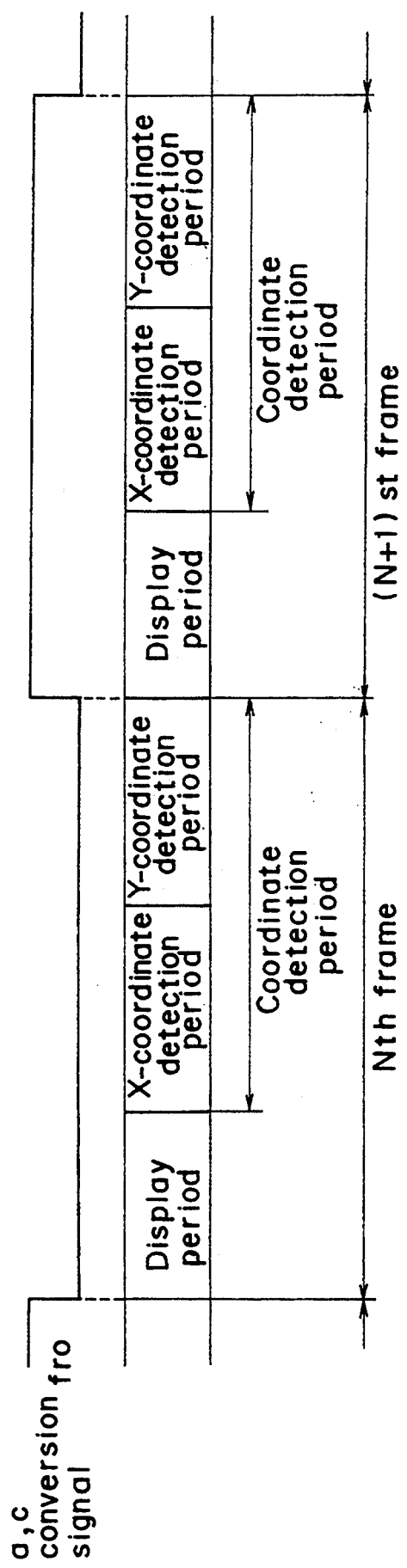
FIG. 2 is a timing chart of the display period and the coordinate detection period.

FIG. 2 is a timing chart of a display period, during which an image is displayed onto the pixel matrix of the liquid crystal panel 1, and a coordinate detection period, during which the segment electrodes X and the common electrodes Y of the liquid crystal panel 1 are scanned and the tip position of the electronic pen 11 is thereby detected. In this display-integrated type tablet device, a one-frame period is composed of a display period and a coordinate detection period. The coordinate detection period is composed of an x-coordinate detection period and a y-coordinate detection period.

This composition allows both the display of an image onto the pixel matrix of the liquid crystal panel 1 and the detection of tip coordinates of the electronic pen 11 by the electrostatic induction tablet, or the liquid crystal panel 1, to be carried out without impairing each other's performance.

Although FIG. 2 depicts for convenience's sake coordinate detection periods quite longer than they are, the display period length/coordinate detection period length ratio is actually more than "5." The switching between the display period and the coordinate detection period is effected by changing over the switching circuit 7 between the display control circuit 4 side and the detection control circuit 6 side in compliance with control of the control circuit 10.

Also in FIG. 2, although it is assumed for simplicity that the display period, the x-coordinate detection period, and the y-coordinate detection period are successively carried out, yet actually there is provided an idle time between the display period and the x-coordinate detection period as well as the x-coordinate detection period and the y-coordinate detection period.

The reason that there is provided an idle time between display period and coordinate detection period (i.e. x-coordinate detection period) is as follows.

That is, as described above, to prevent the liquid crystal of the liquid crystal panel 1 from deterioration due to electrolysis, the direction in which a voltage is applied to the liquid crystal at places where the segment electrodes X and the common electrodes Y cross each other is switched over collectively at a certain cycle according to a. c. conversion signal. When this is effected, a high voltage of spike shape is induced the tip electrode of the electronic pen 11.

The value of this induced voltage is one order of magnitude or more greater than that of the voltage induced to the tip electrode of the electronic pen 11 due to each scan signal. Still more, since the timing at which the direction in which a voltage is applied to the liquid crystal is switched is asynchronous with the frame cycle, the change in the direction of applying a voltage may occur at a moment within the display period immediately before the coordinate detection period. In such a case, a high spike-shaped induced voltage is caused to the electronic pen 11, and transferred to the operational amplifier 12 as it is.

However, since the induced voltage applied to the operational amplifier 12 is excessively high, the average level of induced voltage become also high; therefore, when the x-coordinate detection period immediately succeeds and the induced voltage caused by the segment electrode scan signal x is fed to the operational amplifier 12, the induced voltage might not be amplified correctly. As a result, there may arise a problem that the coordinate detection signal might not be binary-digitized correctly.

Thus, to avoid such a problem, there is provided an idle time without making the coordinate detection period succeed immediately after the display period has terminated.

Furthermore, the shift register of the segment drive circuit 3, immediately after the display period, holds the state as it was when the segment electrode drive signal was applied to the segment electrodes X for displaying the last line during the display period. Accordingly, immediately before the coordinate detection period succeeds, it is necessary to execute a precoordinate-detection processing for clearing the contents of the shift register. This is another reason for providing the idle time between display period and coordinate detection period.

On the other hand, the reason for providing an idle time between the x-coordinate detection period and the y-coordinate detection period is to prevent an induced voltage developed to the tip electrode of the electronic pen 11 during the x-coordinate detection period and another during the y-coordinate detection period from interfering with each other.

Assume that, for example, the scanning start position for the x-coordinate detection period is on the left side, the scanning start position for the y-coordinate detection period is on the upper side, and that the position of the tip of the electronic pen 11 is at the rightmost and uppermost point. In this case, immediately after the induced voltage caused by the segment electrode scan signal x is developed to the tip electrode of the electronic pen 11, an induced voltage caused by the common electrode scan signal y is developed.

However, since the resultant induced voltage is an analog signal, the two voltage signals would superimpose on each other, making it difficult to distinguish them. Accordingly, it would be impossible to correctly detect the coordinates of the tip of the electronic pen 11 by the x-coordinate detection circuit 8 and the y-coordinate detection circuit 9, with the result of an incorrect detection of the coordinate values.

Such misdetection of the coordinates of the tip of the electronic pen 11 can be prevented by providing an idle time between x-coordinate detection period and y-coordinate detection period.

During the display period, the switching circuit 7 selects the shift data s, a.c. conversion signal fr, clock signal cp1, and clock signal cp2 from the display control circuit 4 in compliance with control of the control circuit 10, and then transmits them out as shift data so, a.c. conversion signal fro, clock signal cp1o, and clock signal cp2o.

Then the common drive circuit 2 and the segment drive circuit 3 operate as described in FIG. 30, generating common electrode drive signals a to h and segment electrode drive signals A and B such as shown in FIG. 32. As a result, pixels of the pixel matrix of the liquid crystal panel 1 are displayed as shown in FIG. 33.

Below described is the operation of each circuit during the coordinate detection period, which characterizes the present embodiment.

Figure 3:
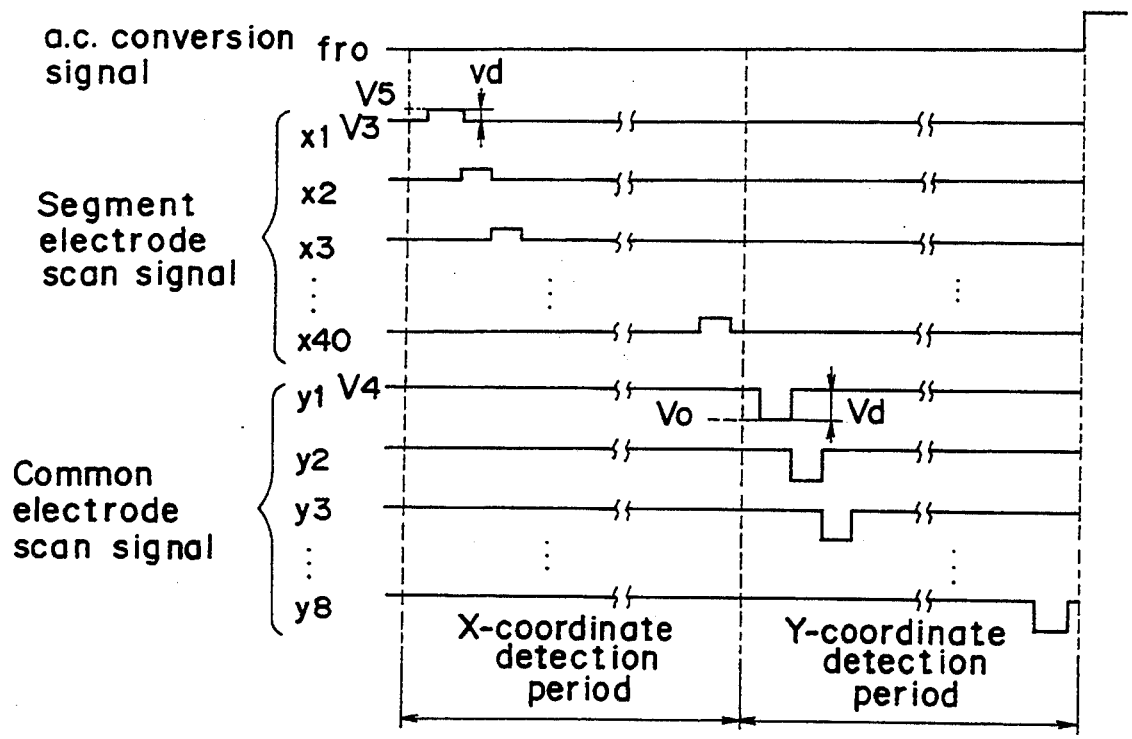
FIG. 3 is a view showing an example of the segment electrode scan signal produced during the x-coordinate detection period and the common electrode scan signal produced during the y-coordinate detection period in FIG. 2.

FIG. 3 shows a segment electrode scan signal x generated from the segment drive circuit 3 during the x-coordinate detection period and a common electrode scan signal y generated from the common drive circuit 2 during the y-coordinate detection period. The generation of the segment electrode scan signal x from the segment drive circuit 3 and the common electrode scan signal y from the common drive circuit 2 during the coordinate detection period is enabled by operating the segment drive circuit 3 and the common drive circuit 2 so as to perform the same function as that of the common drive circuit 2 during the display period.

For the above arrangement, however, the analog switch is adapted to select among the bias power supplies $V_0$ to $V_5$ in response to level inversion of the a.c. conversion signal fro, thereby generating such a segment electrode scan signal and a common electrode scan signal that an induced voltage that can positively be sensed by the x-coordinate detection circuit 8 or the y-coordinate detection circuit 9 is developed to the tip electrode of the electronic pen 11 and that the liquid crystal is not displayed.

In this way, scan pulses of the segment electrode scan signal x are fired in turn from the segment drive circuit 3 to their corresponding segment electrodes X, and subsequently scan pulses of the common electrode scan signal y are fired in turn from the common drive circuit 2 to their corresponding common electrodes Y. Then, as described above, to the tip electrode of the electronic pen 11 there is developed an induced voltage. An induced voltage signal from the electronic pen 11 is amplified by the operational amplifier 12 and thereafter fed to the x-coordinate detection circuit 8 and the y-coordinate detection circuit 9.

Then the x-coordinate detection circuit 8 takes as effective only the induced voltage signal that has been fed from the operational amplifier 12 during the x-coordinate detection period, while the y-coordinate detection circuit 9 takes as effective only the induced voltage signal that has been fed during the y-coordinate detection period, and the circuits 8 and 9 operate in the same manner as the x-coordinate detection circuit 107 and the y-coordinate detection circuit 108 in FIG. 35 do, thereby detecting tip coordinates of the electronic pen 11. The x-coordinate detection circuit 8 produces an x-coordinate signal representing the x-coordinate of the tip of the electronic pen 11 while the y-coordinate detection circuit 9 produces a y-coordinate signal.

The x-coordinate signal and the y-coordinate signal thus produced are transferred to various processing sections, where they are subjected to various types of processing.

For example, at addresses in the image memory (not shown) that accord with on the x-coordinate and the y-coordinate, image data representing the position of pen input is written in. Then during the display period, the written image data is read out as display data $D_0$ to $D_3$ representing the position of the pen input, and in accordance with the read display data $D_0$ to $D_3$ representing the position of the pen input, pixels of the position of the pen input in the liquid crystal panel 1 are displayed. As a consequence of this, by tracing on the liquid crystal panel 1 with the tip of the electronic pen 11, into which electrostatic induction tablet function has been integrated, characters and graphics can be inputted and displayed with a feeling as if they were writing on paper with some writing instrument.

The transfer of the x-coordinate signal and the y-coordinate signal from the x-coordinate detection circuit 8 and the y-coordinate detection circuit 9 to the above-mentioned various processing sections needs only to be carried out by the time the coordinate detection period of the next frame comes in, and more appropriately during the display period of the next frame. Therefore, display of the pixels for the position of pen input in the liquid crystal panel 1 in accordance with the x-coordinate signal and the y-coordinate signal obtained during the coordinate detection period of the Nth frame will be effected during the display period of the (N+2)nd frame.

Next, problems resulting from the arrangement that the electrostatic induction tablet function has been integrated into the liquid crystal panel 1, and countermeasures therefor are described below in more detail.

First, for the coordinate detection period, there is a restriction on peak value Vd of scan pulses of the segment electrode scan signal x generated from the segment drive circuit 3 and the common electrode scan signal y generated from the common drive circuit 2 (see FIG. 3). That is, to prevent the image quality of an image displayed onto the pixel matrix of the liquid crystal panel 1 during the display period from deteriorating, the voltage applied to the liquid crystal of each pixel during the coordinate detection period should not be in excess of the threshold value of the liquid crystal display voltage. Accordingly, the value of peak value Vd of scan pulses should be set so that the voltage between the common electrodes Y and the common electrodes Y will be lower than the threshold value of the liquid crystal display voltage.

The threshold value of the liquid crystal display voltage mentioned here is one different from the threshold value of the liquid crystal display voltage for the display period as mentioned with reference to FIG. 32. In other words, the ratio of the coordinate detection period occupied in a one-frame period is preferably as low as possible. Thus it is required to perform the scanning of the common electrodes Y and the segment electrodes X during the coordinate detection period at high speed. This accounts for the fact that the threshold value of the liquid crystal display voltage for the coordinate detection period is the one for high-speed scanning, a value slightly higher than the threshold value of the liquid crystal display voltage for the display period.

The peak value Vd of scan pulses in the case of the present embodiment is set in the following way using the bias power supplies $V_0$ to $V_5$ supplied from the power supply circuit 5.

For instance, when the a.c. conversion signal fro is at an "L" level, the setting is as follows:—To scan a segment electrode $X_1$ of the liquid crystal panel 1, the scan pulse voltage of the segment electrode scan signal $x_1$ for the scanned segment electrode $X_1$ (hereinafter, referred to as scan voltage) is set to "$V_5$." Meanwhile, the voltage of the segment electrode scan signals $x_2$ to $x_{40}$ for the non-scanned segment electrodes $X_2$ to $X_{40}$ (hereinafter, referred to as non-scan voltage) is set to "$V_3$." Also, the voltage of all the common electrode scan signals y is set to "$V_4$."

Then the potential difference between the scan segment electrode $X_1$ and all the common electrodes Y becomes $(V_5-V_4)$. Meanwhile, the potential difference between the non-scanned segment electrodes $X_2$ to $X_{40}$ and all the common electrodes Y becomes $(V_4-V_3)$.

Accordingly, with the values of the bias power supplies $V_0$ to $V_5$ being set to the same ones as described for FIG. 32, voltages applied to scanned pixels and non-scanned pixels would be the same potentials as those applied to displayed pixels during the display period. As a matter of course, the resulting voltages are lower than the threshold value of the liquid crystal display voltage for the coordinate detection period, with no displays.

The same is thoroughly the case also when the other segment electrodes $X_2$ to $X_{40}$ are scanned, where the voltages applied to scanned pixels and non-scanned pixels are lower than the threshold value of the liquid crystal display voltage, with no displays.

To scan the common electrode $Y_1$, in turn, the scan voltage is set to "$V_0$" while the non-scan voltage is set to "$V_4$." Also, the voltage of the segment electrode scan signals x are set to "$V_3$." Then the resulting voltage applied to scanned pixels is $(V_3-V_0)$ and the voltage applied to non-scanned pixels is $(V_4-V_3)$.

In consequence, the voltages applied to both scanned pixels and non-scanned pixels are lower than the threshold value of the liquid crystal display voltage for the coordinate detection period, with no displays. The same is thoroughly the case also when the other common electrodes $Y_2$ to $Y_8$ are scanned, where neither scanned pixels nor non-scanned pixels are displayed.

In contrast to this, when the a.c. conversion signal fro is inverted to an "H" level as shown in FIG. 2, the peak value vd of scan pulses is set as follows.

To scan the segment electrodes X, the scan voltage is set to "$V_0$" while the non-scan voltage is set to "$V_2$." Also, the voltage of the common electrode scan signal y is set to "$V_1$." Then the resulting voltage applied to scanned pixels is $(V_1-V_0)$ while the voltage applied to non-scanned pixels is $(V_2-V_1)$.

In consequence, the voltages applied to scanned pixels and non-scanned pixels are lower than the threshold value of the liquid crystal display voltage for the coordinate detection period, with no displays.

To scan the common electrodes Y, in turn, the scan voltage is set to "$V_5$" while the non-scan voltage is set to "$V_1$." Also, the voltage of the segment electrode scan signals x are set to "$V_2$." Then the resulting voltage applied to scanned pixels is $(V_5-V_2)$ and the voltage applied to non-scanned pixels is $(V_2-V_1)$.

In consequence, the voltages applied to scanned pixels and non-scanned pixels are lower than the threshold value of the liquid crystal display voltage for the coordinate detection period, with no displays.

With the above arrangement, during the coordinate detection period, the voltages applied to scanned pixels and non-scanned pixels are lower than the threshold value of the liquid crystal display voltage irrespectively of the level inversion of the a.c. conversion signal fro, with no displays. Also, since the direction in which a voltage is applied to scanned pixels and non-scanned pixels is inverted, service life of the liquid crystal is prevented from reduction also during the coordinate detection period.

Figure 4:
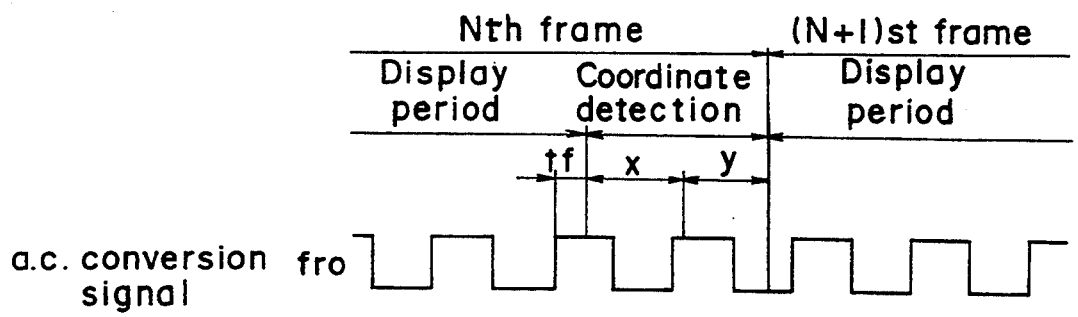
FIG. 4 is a view showing an example of the waveform of the a.c. conversion signal.

In the above description of generation of the segment electrode scan signals x and the common electrode scan signals y, the level inversion frequency of the a.c. conversion signal fro is assumed to be synchronous with the frame period. In actual case, however, the level inversion period of the a.c. conversion signal fro and the frame period are arranged to be asynchronous with each other as shown in FIG. 4, thereby randomizing points at which the direction in which the voltage is applied is inverted in a one-frame image. As a result, time $t_f$ from the last rise point of the a.c. conversion signal fro for the display period to the starting point of the coordinate detection period becomes random as shown in FIG. 4, and therefore points at which the level of the a.c. conversion signal fr is inverted during the coordinate detection period are also randomized.

Figure 5:
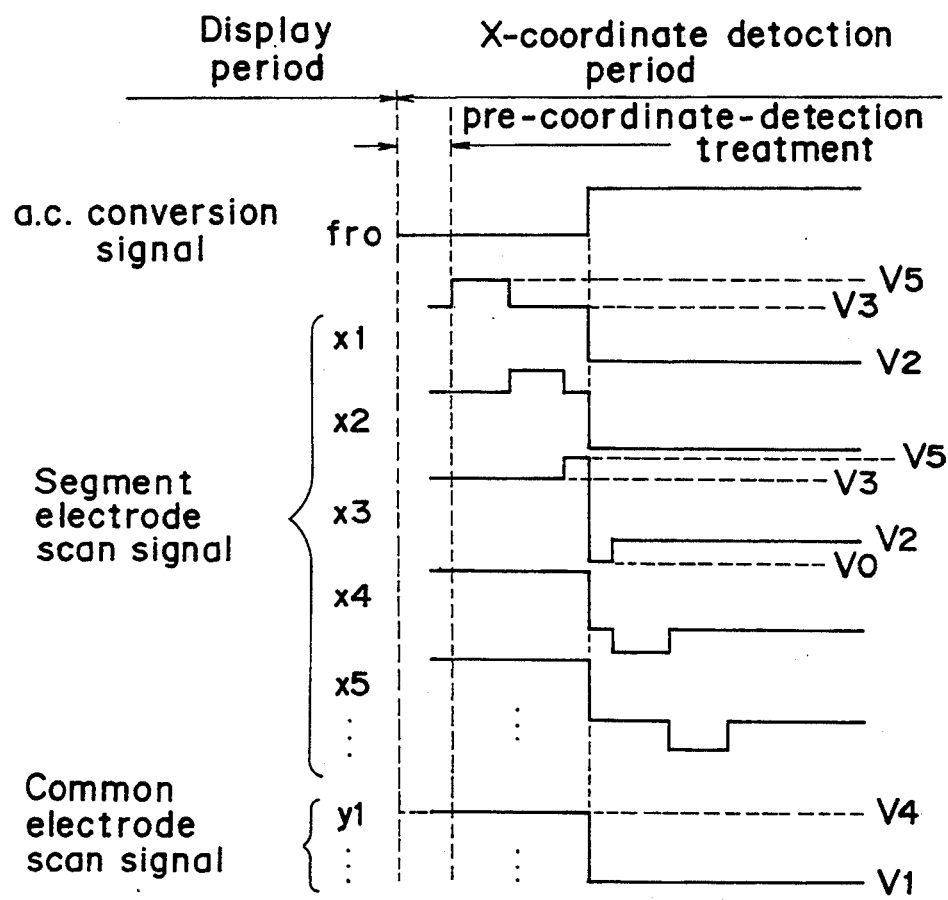
FIG. 5 is an explanatory view of change in waveform of the scan signal at the time point when the level of the a.c. conversion signal is inverted.

FIG. 5 is a detailed view of the waveform of a scan signal in the vicinity of a time point at which the level of the a.c. conversion signal fro is inverted at an arbitrary time point during the coordinate detection period, as described above.

When the display period is succeeded by an x-coordinate detection period, pre-treatment for coordinate detection is performed in compliance with control of the control circuit 10 (see FIG. 1), thereby clearing the contents of the shift register, which shifts shift data so of the common drive circuit 2, and the latch circuit, which latches display data of the segment drive circuit 3. Thereafter, the process of detecting the x-coordinate is started. For this process, it is assumed that the a.c. conversion signal fro is at an "L" level at first and then inverted to an "H" level during the coordinate detection period.

As understood from FIG. 5, when the a.c. conversion signal fro is at an "L" level, the scan voltage of the segment electrode scan signal x is "$V_5$" while the non-scan voltage is "$V_3$". Also, the voltage of the common electrode scan signal y is "$V_4$". When the level of the a.c. conversion signal fro is inverted to an "H" level, however, all of these voltages are lowered at a time: the scan voltage of the segment electrode scan signal x turns to "$V_0$," the non-scan voltage to "$V_2$," and the voltage of the common electrode scan signal y to "$V_1$." This gives a cause that to the tip electrode of the electronic pen 11 coupled with the segment electrodes X and the common electrodes Y by floating capacity there is developed an induced voltage several times as large as that of a normal induced voltage developed in scanning the segment electrodes X. As a result, the x-coordinate detection circuit 8 misdetects the x-coordinate of the tip of the electronic pen 11 owing to the induced voltage from the tip electrode of the electronic pen 11 due to level inversion of the a.c. conversion signal fro.

This occurs likewise also when the level of the a.c. conversion signal fro is inverted from "H" to "L." Accordingly, there may occur at random such misdetection of a coordinate of the tip of the electronic pen 11 due to the level inversion of the a.c. conversion signal fro. With the case standing as above, the liquid crystal panel 1 would not perform the function as a tablet.

Figure 6:
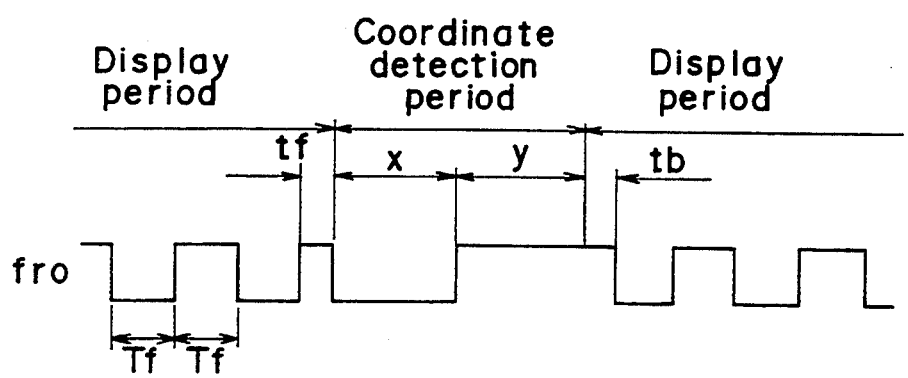
FIG. 6 is an explanatory view of the level inversion cycle of the a.c. conversion signal.

To solve the above-mentioned problem, in the present embodiment, a detection a.c. conversion signal fro for the coordinate detection period is set as being independent of a display a.c. conversion signal fro for the display period, as shown in FIG. 6. The detection a.c. conversion signal fro for the coordinate detection period is an a.c. conversion signal frd generated from the detection control circuit 6, in which, for example, its time point for level inversion is set to one other than the x-coordinate detection period or the y-coordinate detection period (for example, set to the boundary between the x-coordinate detection period and the y-coordinate detection period). In this case, combination of the level for the x-coordinate detection period and that for the y-coordinate detection period may be "H-L," "H-H," or "L-L" in addition to "L-H" shown in FIG. 6.

In addition, the display a.c. conversion signal fro for the display period is set to an a.c. conversion signal fr generated from the display control circuit 4.

As described above, in the present embodiment, into a period of the display a.c. conversion signal fro in the display period that depends on the a.c. conversion signal fr derived from the display control circuit 4 there is inserted a detection a.c. conversion signal fro for the coordinate detection period that depends on the a.c. conversion signal frd derived from the detection control circuit 6. This being the case, if the detection a.c. conversion signal fro was simply inserted into the display a.c. conversion signal fro, inversion of the direction in which a voltage is applied to the liquid crystal during the display period would be disturbed, undesirably.

Thus, as shown in FIG. 6, it is arranged that when the period switches to a coordinate detection period the moment a duration $t_f$ has elapsed with the display a.c. conversion signal fro held at an "H" level, the display a.c. conversion signal fro for the next-frame display period is firstly set to an "H" level, and its duration $t_b$ is $$t_b = T_f - t_f$$

where $T_f$ is the level inversion period of the a.c. conversion signal fro.

The above arrangement can be realized by an implementation that the number of shifting times of the shift register of the common drive circuit 2 (i.e. the number of scanning lines of the common electrodes Y) is counted during the display period, and each time the counting result reaches a value equivalent to the aforenoted $T_f$, the level of the display a.c. conversion signal fro is inverted. Otherwise, that can be done by setting the coordinate detection period to an integral multiple of the period of the display a.c. conversion signal fro ($2T_f$).

To another disadvantage, when the combination of levels of the detection a.c. conversion signal fro is at all times kept unchanged during the x-coordinate detection period and the y-coordinate detection period, as described above, the direction in which a voltage is applied to the liquid crystal is also kept unchanged during the x-coordinate detection period or during the y-coordinate detection period, undesirably. Thus, the level of the detection a.c. conversion signal fro is adapted to be inverted for each frame. This implementation allows the level of the detection a.c. conversion signal fro for the x-coordinate detection period or the y-coordinate detection period to be inverted for every subsequent frame.

The above arrangement can be realized by an implementation that the levels of the detection a.c. conversion signal fro for the x-coordinate detection period and that for the y-coordinate detection period in the preceding frame are stored in a memory, and the levels of the detection a.c. conversion signal fro for the x-coordinate detection period and that for the y-coordinate detection period in a current frame are made inverse to their counterparts stored in the memory.

In this case, however, polarity of the induced voltage developed to the tip electrode of the electronic pen 11 during the x-coordinate detection period or the y-coordinate detection period is inverted for each frame. Accordingly, with the case just as it is, it would be impossible for the x-coordinate detection circuit 8 and the y-coordinate detection circuit 9 to detect the coordinates with high reliability. Thus, it is arranged that the induced voltage sensed by the tip electrode of the electronic pen 11 is amplified and thereafter full-wave rectified before it is fed to the x-coordinate detection circuit 8. This enables the x- and y-coordinates of the tip of the electronic pen 11 to be reliably detected by the x-coordinate detection circuit 8 and y-coordinate detection circuit 9.

As described above, in the present embodiment, to the duty-type LCD comprised of the liquid crystal panel 1, common drive circuit 2, segment drive circuit 3, display control circuit 4, and power supply circuit 5 there are further added the detection control circuit 6, switching circuit 7, x-coordinate detection circuit 8, y-coordinate detection circuit 9, control circuit 10, and electronic pen 11. With this arrangement, each frame period is time-divided into a display period, during which an image is displayed onto the pixel matrix of the liquid crystal panel 1, and a coordinate detection period, during which the tip coordinates of the electronic pen 11 on the liquid crystal panel 1 are detected.

For the display period, the switching circuit 7 selects the side of the display control circuit 4 in compliance with control of the control circuit 10. According to the shift data so, a.c. conversion signal fro, clock signal cp1o, and clock signal cp2o generated from the switching circuit 7 in accordance with a signal derived from the selected display control circuit 4, the common drive circuit 2 and the segment drive circuit 3 will operate.

In this operation, common electrode drive signals a to h generated by the common drive circuit 2 are fed to the common electrodes $Y_1$ to $Y_8$ of the liquid crystal panel 1, whereby display rows of the pixel matrix of the liquid crystal panel 1 are selected one by one.

Meanwhile, segment electrode drive signals A and B generated by the segment drive circuit 3 according to display data $D_{0o}$ to $D_{3o}$ are fed to the segment electrodes $X_1$ to $X_{40}$ of the liquid crystal panel 1, so that pixels of the display columns in the pixel matrix that have been selected by the common drive circuit 2 are displayed in accordance with the display data.

Thus, the pixel matrix is put into display, as shown in FIG. 33.

For the detection period, on the other hand, the switching circuit 7 selects the side of the detection control circuit 6 in compliance with control of the control circuit 10. According to the shift data so, a.c. conversion signal fro, clock signal cp1o, and clock signal cp2o generated from the switching circuit 7 in accordance with a signal derived from the selected detection control circuit 6, the common drive circuit 2 and the segment drive circuit 3 will operate.

Segment electrode scan signals $x_1$ to $x_{40}$ generated by the segment drive circuit 3 in this way are applied to segment electrodes $X_1$ to $X_{40}$ of the liquid crystal panel 1, whereby the segment electrodes X are scanned one by one. Then an induced voltage is developed to the tip electrode of the electronic pen 11, on the basis of which induced voltage the x-coordinate of the tip of the electronic pen 11 is detected by the x-coordinate detection circuit 8, so that an x-coordinate signal is produced. Succeedingly, common electrode scan signals $y_1$ to $y_8$ generated by the common drive circuit 2 are applied one by one to the common electrodes $Y_1$ to $Y_8$ of the liquid crystal panel 1, whereby the common electrodes Y are scanned. Thereafter, on the basis of an induced voltage developed to the tip electrode of the electronic pen 11, the y-coordinate of the tip of the electronic pen 11 is detected by the y-coordinate detection circuit 9, so that a y-coordinate signal is produced.

For this operation, it is arranged that the levels of scan pulses of the segment electrode scan signals x and the common electrode scan signals y are set to such ones that the potential between the segment electrodes X and the common electrodes Y will be lower than the threshold value of the liquid crystal display voltage for the coordinate detection period. Accordingly, the pixel matrix of the liquid crystal panel 1 is not put into display during the coordinate detection period.

The x-coordinate signal and the y-coordinate signal generated in this way are converted into display data $D_0$ to $D_3$ by the display control circuit 4, and depending on display data $D_{00}$ to $D_{30}$ generated by the switching circuit 7 in accordance with the converted display data $D_0$ to $D_3$, the pixel for the tip position of the electronic pen 11 on the pixel matrix of the liquid crystal panel 1 is displayed.

As shown above, each frame period for the display of the pixel matrix of the liquid crystal panel 1 is time-divided into the display period and the coordinate detection period. The liquid crystal panel 1 is used as an image display section during the display period while the same is used as a tablet during the coordinate detection period, thereby providing a tablet device into which the display function has been integrated.

In consequence, according to the present embodiment, it is possible to solve the problems at a stroke such as reduction in brightness and contrast of the display screen in the display section due to a low light transmittance of the column/row electrodes of the tablet, reduction both in the regularity at which the electrodes of the tablet are arranged and in visibility of the display section due to some shift of corresponding points between the display section and the tablet section, and increase in both size and cost due to the stacking of the tablet and the display section. In other words, the display-integrated type tablet device of the present embodiment is easy to view the display screen for inputting any position on the display screen with the pen and moreover easy to make the device itself more compact and less costly.

Furthermore, it is also arranged in the present embodiment that the a.c. conversion signal fro, which inverts the direction in which a voltage is applied to the liquid crystal of the liquid crystal panel 1, is set during the coordinate detection period independently of the display period. Accordingly, the detection a.c. conversion signal fro for the coordinate detection period can be set so that the direction in which a voltage is applied to the liquid crystal will not be inverted during x-coordinate scan period or the y-coordinate scan period. As a result, it is possible to prevent misdetection of the position of the tip of the electronic pen 11 caused by some change in the voltage level of the common electrode scan signal y or the segment electrode scan signal x due to level inversion of the detection a.c. conversion signal fro.

In the above-described embodiment, the a.c. conversion signal fro, which inverts the direction in which a voltage is applied to the liquid crystal of the liquid crystal panel 1, is generated by the display control circuit 4 and the detection control circuit 6. However, the present invention is not limited to such an arrangement and, for example, the signal may also be generated by the common drive circuit 2 and the segment drive circuit 3, or the switching circuit 7.

Also, it is possible to provide a plurality of tip electrodes of the electronic pen 11, with an arrangement that induced voltages derived from the individual electrodes are differentially amplified by the operational amplifier 12. This arrangement will afford a higher accuracy of detecting the position of the tip of the electronic pen 11.

In the above-described embodiment, there are provided one set of the electronic pen 11, operational amplifier 12, x-coordinate detection circuit 8, and y-coordinate detection circuit 9. However, the present invention is not limited to this, and it may also be allowed that a plurality of sets of the electronic pen 11, operational amplifier 12, x-coordinate detection circuit 8, and y-coordinate detection circuit 9 are provided so as to allow input with a plurality of electronic pens independent of each other.

In such a case, an implementation that characters and graphics inputted with any of the electronic pens are individually displayed in different kinds of lines (e.g. solid, dotted, and heavy lines) or different colors will allow the characters and graphics represented with different electronic pens to be simply distinguished from each other.

In the above-described present embodiment, it may be further allowed that means for recognizing incoming characters and graphics is added to thereby recognize the characters and graphics inputted with the pen and to perform various types of processing using the recognition results. Otherwise, it is also allowed to additionally provide some instruction decision means to decide what is the content of a processing menu designated by the electronic pen out of various types of processing menus (so-called icon) displayed on the liquid crystal panel 1 and then to perform processing that depends on the decision result.

Among display-integrated type tablet devices now widely used there is one in which an electromagnetic induction type tablet is superimposed on the rear side of the liquid crystal panel. This electromagnetic induction type tablet is adapted to determine the coordinates of the tip of a detection pen by detecting an induced voltage that has been developed to the electrodes of the electromagnetic induction type tablet by the high-frequency magnetic field derived from the tip of the detection pen. As a result, misdetection of the coordinates is likely to occur owing to an effect of a small amount of magnetic field from external.

Owing to this, when on the rear face of the electromagnetic induction type tablet there is provided a PCB on which a CPU and IC memories are mounted, misdetection of the coordinates of the tip of the detection pen may take place due to the effect of an external magnetic field that is generated by a current flowing through the circuits on the PCB.

By contrast, in the present embodiment, the segment electrodes X and the common electrodes Y are free from such an effect of the external magnetic field. Accordingly, even if a CPU and IC memories are provided directly on the rear face of the liquid crystal panel 1 or if a PCB on which a CPU and IC memories are mounted is provided in almost close contact with the rear face of the liquid crystal panel 1, the detection of the coordinates of the tip of the electronic pen 11 can be carried out successfully.

Therefore, if the aforenoted recognition means, instruction decision means, or other processing means are provided by the CPU provided on the rear face of the liquid crystal panel 1 as described above, it is possible to offer an extremely thin, small-size computer in which inputs are given through a pen instead of through the key board.

Moreover, if polymer-dispersive type liquid crystal is employed as that used for the liquid crystal panel 1, it is possible to form a flexible, sheet-like tablet, enabling notebook-type computers to be offered.

Embodiment 2

During the coordinate detection period in the above-described embodiment, the segment electrodes X and the common electrodes Y are successively scanned one by one. In this connection, a high-density liquid crystal panel, when used, requires an increased number of electrodes, which in turn results in thinned electrodes correspondingly thereto. Then the floating capacity that couples the tip electrode of the electronic pen 11 with the electrodes X and Y is lessened, causing the induced voltage developed to the tip electrode of the electronic pen 11 to be extremely low. This can be a cause for misdetection of the position of the tip of the electronic pen 11.

In view of this problem, in the present embodiment, it is devised that the position of the tip of the electronic pen 11 can positively be detected even with a high-density liquid crystal panel, in a manner as described below.

Figure 7:
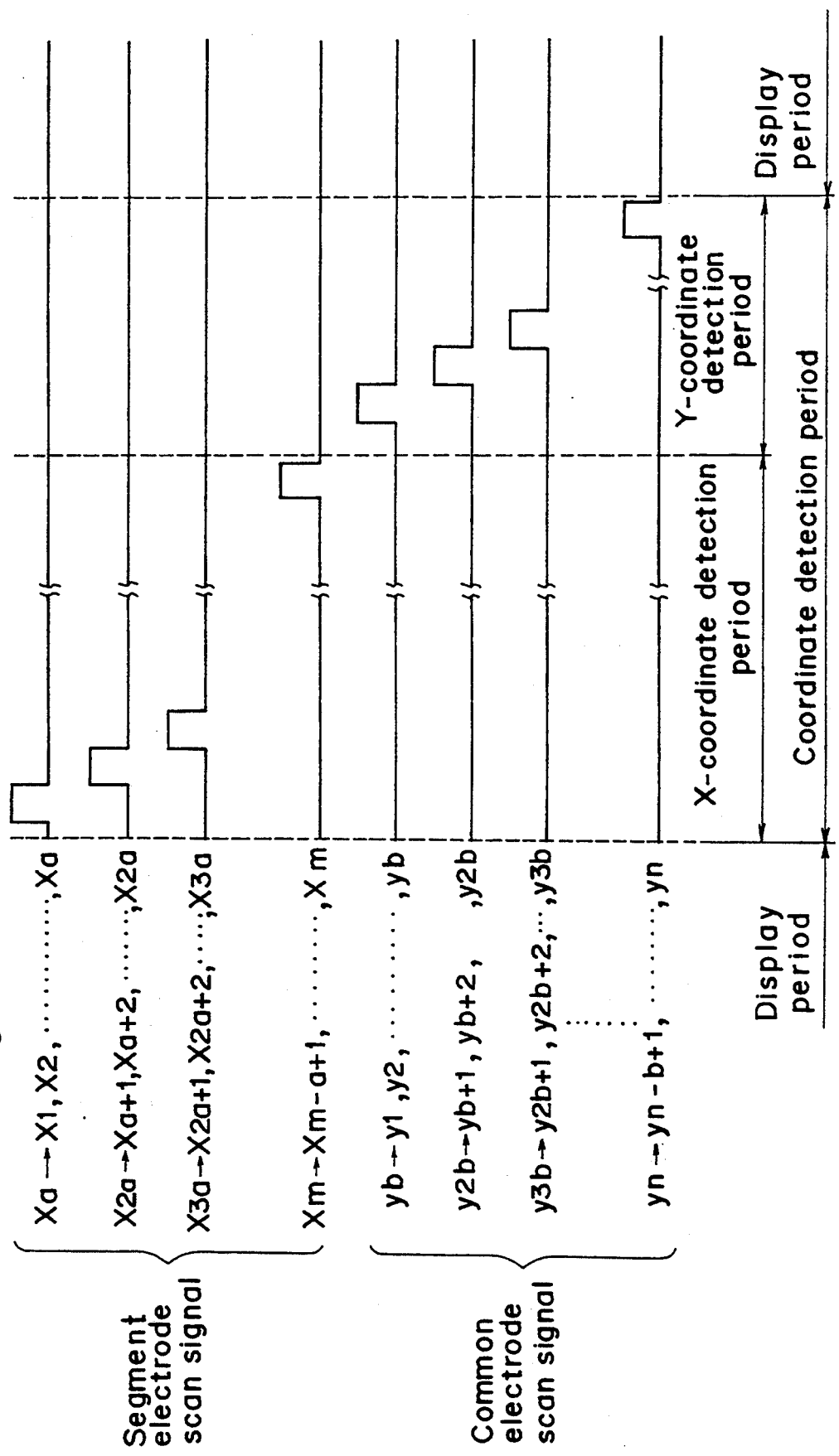
FIG. 7 is an explanatory view of a segment electrode scan signal and a common electrode scan signal in the case where a plurality of electrodes are scanned at one time.

FIG. 7 is a timing chart of the segment electrode scan signal x and the common electrode scan signal y for the coordinate detection period according to the present embodiment. The setting of level and timing for the segment electrode scan signal x and the common electrode scan signal y, the control of inversion of the voltage direction, and the like are as described in the foregoing embodiment. In the present embodiment, however, the segment electrode scan signal x or the common electrode scan signal y is applied to a plurality of segment electrodes X or a plurality of common electrodes Y, collectively.

More specifically, in FIG. 7, a segment electrode scan signal $x_a$ is applied to a strips of segment electrodes $X_1$, $X_2$, ..., $X_a$, collectively. Also, a segment electrode scan signal $x_{2a}$ is applied to a strips of segment electrodes $X_{a+1}$, $X_{a+2}$, ..., $X_{2a}$, collectively. Like this with the following a segment electrode scan signal $x_m$ is applied to a strips of segment electrodes $X_{m-a+1}, \ldots, X_m$, collectively.

On the other hand, a common electrode scan signal $Y_b$ is applied to b strips of me common electrodes $Y_1$, $Y_2, \ldots, Y_b$, collectively. Also, a common electrode scan signal $Y_{2b}$ is applied to b strips of common electrodes $Y_{b+1}, Y_{b+2}, \ldots, Y_{2b}$, collectively. Like this with the following a common electrode scan signal $y_n$ is applied to b strips of common electrodes $Y_{n-b+1}, \ldots, Y_n$, collectively.

To simultaneously apply a scan signal to a plurality of electrodes collectively, the following measure will do. That is, scan pulses of a scan signal generated according to shift data sd, clock signal cp1d, clock signal cp2d, data signals $D_0d$ to $D_3d$, and others are latched to a latch circuit for a duration that depends on each electrode.

By scanning a strips of segment electrodes X and b strips of common electrodes Y collectively, the induced voltage developed to the tip electrode of the electronic pen 11 can be set higher. According to the present embodiment, therefore, misdetection of the position of the tip of the electronic pen 11 can be prevented when the high-density liquid crystal panel is used as an electrostatic induction tablet into which the display function is integrated.

Further, by scanning a strips of segment electrodes X and b strips of common electrodes Y collectively, the following effect can be obtained. That is, even if a clock signal cp1d and a clock signal cp2d generated from the detection control circuit 6 are ones having the same periods as when the electrodes are scanned one by one, the scanning speed for the segment electrodes X is a times higher and that for the common electrodes Y is b times higher. Accordingly, it is possible to reduce the coordinate detection period to ensure a substantial length of the display period, ready for display with the high-density liquid crystal panel.

As is the case in the present embodiment, if a strips of segment electrodes X and b strips of common electrodes Y are collectively scanned, the resulting effective pitch of the segment electrodes X or the common electrodes Y is increased to approximately several millimeters in the devices for scanning. This might cause some reduction in accuracy of detecting the position of the tip of the electronic pen 11.

Figure 37:
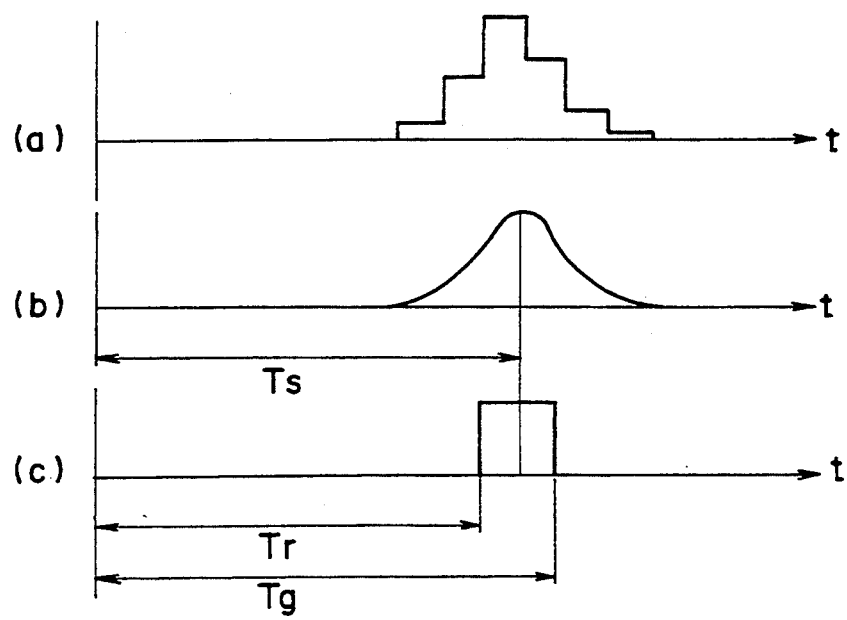
FIG. 37 is an explanatory view of the waveform of a signal produced from the electronic pen.

However, scanning several strips of electrodes collectively as involved here causes the waveform of the induced voltage developed to the tip electrode of the electronic pen 11 to be more similar to that in FIG. 37(a) (when the electrodes are scanned one by one, it will be similar to that in FIG. 37(b)). Therefore, as described with FIG. 37, the peak value of each step is normalized with the maximum peak value and, thereafter, the position of the tip of the electronic pen 11 is determined according to the ratio of the maximum peak value to the second highest peak value, thus allowing the position of the tip of the electronic pen 11 to be detected at a resolution of approx. 8 dots/mm regardless of the fact that the effective pitch of the electrodes in the devices for scanning becomes large.

In addition, it is also possible to detect the position of the tip of the electronic pen 11 according to time Ts from when scanning is started to when the peak of the waveform in FIG. 37(b) is detected, by shaping the resulting induced voltage having such a waveform as shown in FIG. 37(a) into that having another such as in FIG. 37(b) through a low-pass filter. In such a case, a comparator is provided to both the x-coordinate detection circuit 8 and y-coordinate detection circuit 9, where each comparator, as shown in FIG. 37(c), serves to binary-digitize a coordinate detection signal having such a waveform as shown in FIG. 37(b). Further, time Tr and time Tg that have elapsed from the start of scanning are counted, and the time Ts as shown in FIG. 37(b) is calculated by the following equation:

$$Ts = (Tr + Tg)/2$$

To accomplish the counting of the time Tr and Tg in this operation, it can be arranged that the time from the start of scanning to the leading edge or the trailing edge of a pulse in FIG. 37(c) is counted by a counter built in the x-coordinate detection circuit 8 or the y-coordinate detection circuit 9. In order to provide a higher counting precision in doing this, the count clock frequency of the counter is set to one higher than the frequencies of the clock signal cp1d (scan clocks for common electrodes Y) and the clock signal cp2d (scan clocks for segment electrodes X) both derived from the detection control circuit 6.

In the present embodiment, as described above, the segment electrode scan signal x or the common electrode scan signal y is applied to a plurality of segment electrodes X or a plurality of common electrodes Y, collectively. As a result, according to the present embodiment, the induced voltage developed to the tip electrode of the electronic pen 11 can be of high level and, therefore, even when a high-density liquid crystal panel is used as the electrostatic induction tablet into which display function has been integrated, the coordinates of the tip of the electronic pen 11 can be detected correctly. Moreover, the scanning speed for the segment electrodes or that for the common electrodes can be made higher.

Figure 8:
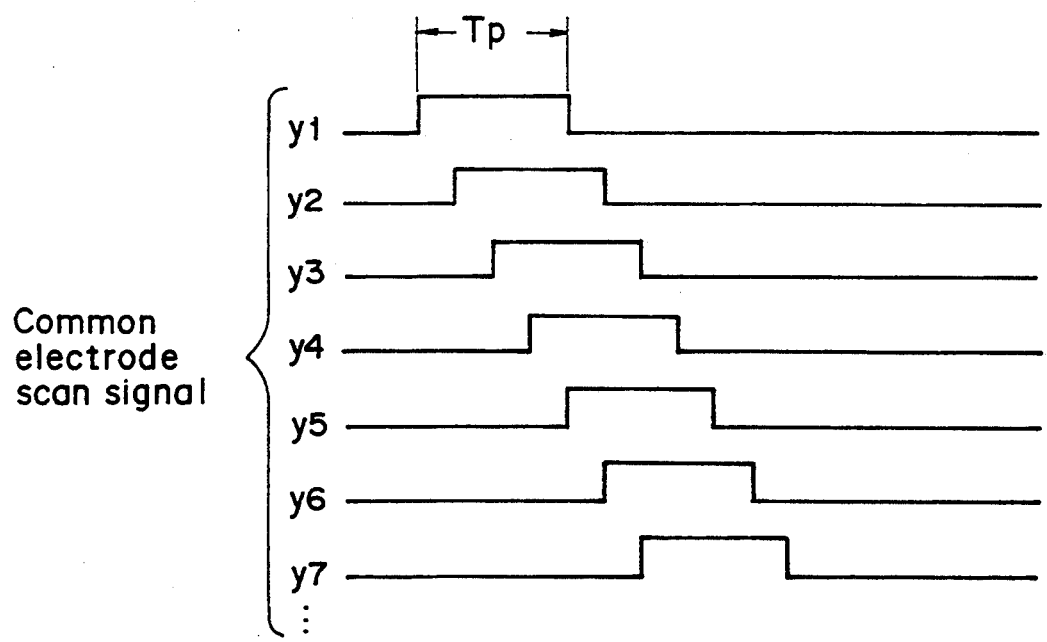
FIG. 8 is an explanatory view of a common electrode scan signal in the case where the scanning of electrodes is carried out in the device of one strip of electrode and yet the same effect is obtained as when a plurality of electrodes are scanned at one time.

FIG. 8 illustrates an embodiment in which electrodes are scanned one by one during the coordinate detection period with the result of the same scanning effect as when every several strips of electrodes are collectively scanned (common electrode scan signal y only represented). In this embodiment, as shown in FIG. 8, it is also arranged as in the foregoing embodiment that a common electrode scan signal y is applied to the common electrodes Y according to the clock signal cp1d from the detection control circuit 6. However, in the present embodiment, the scan pulse applying time Tp is set to one equivalent to a plurality of periods of the clock signal cp1o or clock signal cp2o. As a result of this, with a view at a certain time point, different scan pulses of the common electrode scan signal y are applied to a plurality of common electrodes Y, simultaneously. By such an arrangement, the induced voltage developed to the tip electrode of the electronic pen 11 is induced by the voltages of a larger number of common electrodes Y, thus allowing the induced voltage to be heightened with a better detection accuracy for the position of the tip of the electronic pen 11.

However, in the above case, the waveform of the induced voltage developed to the tip electrode of the electronic pen 11 approximates further to that of FIG. 37(b) and therefore, in the present embodiment, the position of the tip of the electronic pen 11 is better detected in accordance with the time Ts.

Such a method as described above will be useful especially when the common drive circuit 2 cannot serve to scan a plurality of electrodes as in the above embodiment owing to the fact that the latch circuit is not built therein. In addition, it does not matter if it is used for scanning the segment electrodes.

In Embodiment 2, as shown in FIGS. 7 and 8, the scan voltage of the common electrode scan signal y is set to one higher than the non-scan voltage, conversely to the case in Embodiment 1 as shown in FIG. 3. This only causes a change in the polarity of the induced voltage developed to the tip electrode of the electronic pen 11, which is of no significance.

Embodiment 3

The embodiment described below is adapted to prevent misdetection of the position of the tip of the electronic pen 11 by removing any noise that has been superimposed on an induced voltage developed to the tip electrode of the electronic pen 11.

Figure 9:
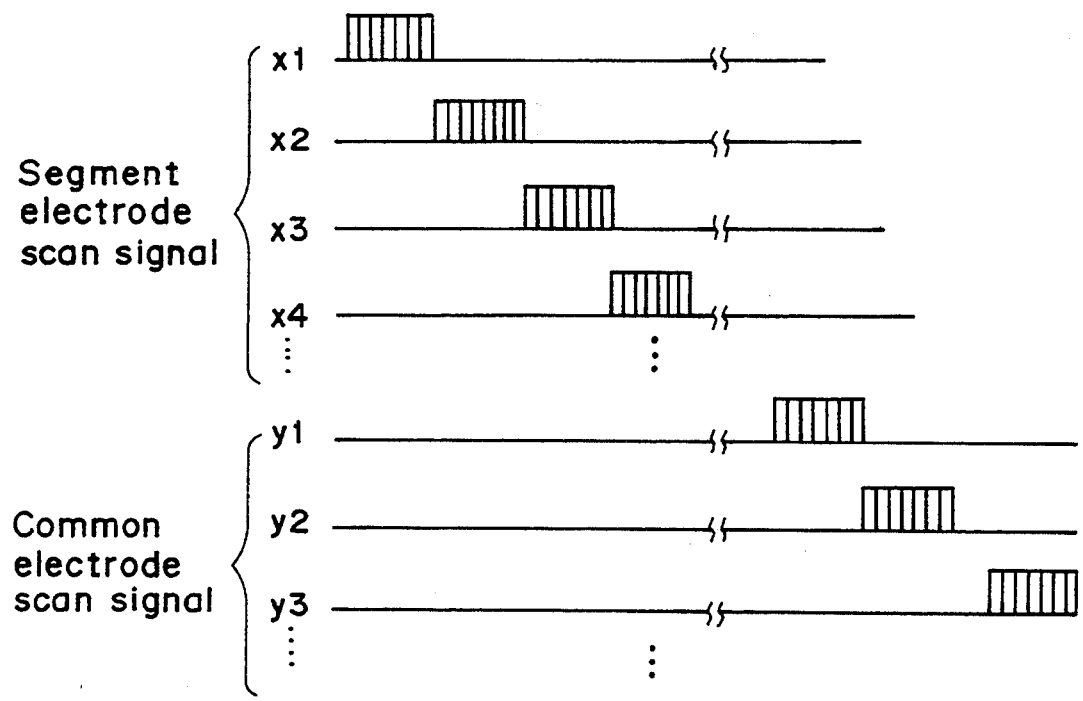
FIG. 9 is an explanatory view of a segment electrode scan signal and a common electrode scan signal in each of which a high-frequency rectangular wave has been inserted into the scan period.

In FIG. 9, to the portions of scan pulses (hereinafter, referred to as scan periods) of such segment electrode scan signals x or common electrode scan signals y as shown in FIG. 3 or FIG. 7 there are inserted rectangular waves of high frequency. Since an induced voltage is developed to the tip electrode of the electronic pen 11 by capacitive coupling between the segment electrodes X and common electrodes Y, the induced voltage developed to the tip electrode of the electronic pen 11 is set higher and moreover made to involve a high-frequency component by changing the scan periods of the segment electrode scan signals x and the common electrode scan signals y with high frequency.

The induced voltage thus developed to the tip electrode of the electronic pen 11 is passed through an amplifier that allows only the high-frequency component to pass therethrough and be amplified, and thereafter rectified to obtain a signal having such a waveform as shown in FIG. 37(b). A ceramic filter or the like will serve effectively as a filter used in this step for allowing only a specific frequency component to pass therethrough.

According to the method of applying scan signals in the foregoing embodiments as described before, there may occur misdetection of the position of the tip of the electronic pen 11 owing to electrostatic noise from external, noise due to frictional electrification between the electronic pen 11 and the tablet surface or others, and the like. According to such a method of applying scan signals as in the present embodiment, however, a frequency component that depends on the segment electrode scan signals x or the common electrode scan signals y is superimposed on signals derived from the electronic pen 11 and fed to the x-coordinate detection circuit 8 or the y-coordinate detection circuit 9, which allows only the signals necessary for coordinate detection to be amplified with high efficiency, and enables them to be separated from the noise.

In carrying out the present embodiment, it is necessary to select such frequencies that the frequency of the high-frequency wave inserted into the scan periods of the scan signals would not be generated from within the liquid crystal devices (e.g. 500 KHz).

Figure 10:
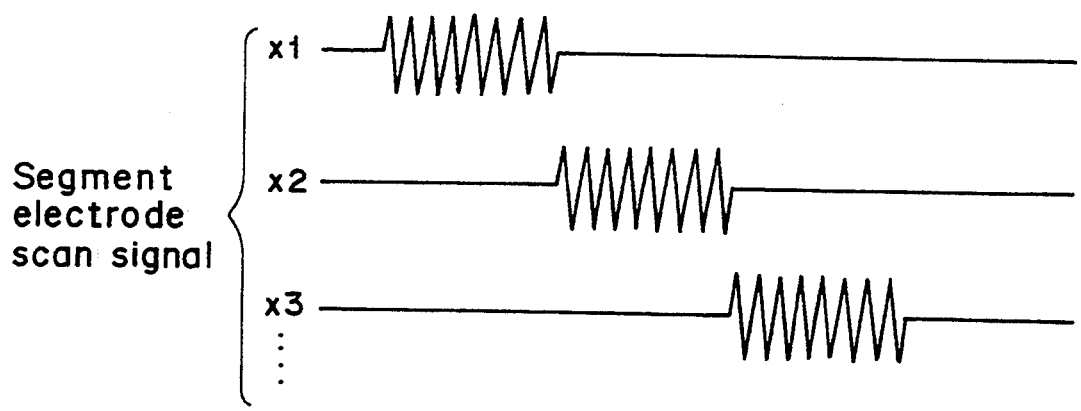
FIG. 10 is an explanatory view of a segment electrode scan signal in which a high-frequency sine wave has been inserted into the scan period.

In the above-mentioned embodiment, although the high-frequency rectangular wave is inserted into the scan periods of the electrode scan signals, it is not intended to limit to this. FIG. 10 shows a case where a high-frequency sine wave is inserted. According to this embodiment, since an a.c. wave is applied to the segment electrodes X or the common electrodes Y, there is provided an effect that any electrolysis of the liquid crystal can be prevented during the coordinate detection period, in addition to the effects of the above-mentioned embodiment.

Such a scan signal in which a sine wave of high frequency is inserted into the scan period can be obtained by an arrangement that a high-frequency power supply is provided independently of the power supply circuit 5 in FIG. 1, wherein the a.c. current derived from the high-frequency power supply is selected by an analog switch and fed to power input terminals of the common drive circuit 2 and the segment drive circuit 3.

Embodiment 4

In the above-described embodiments, scan pulses of the segment electrode scan signals x are applied one by one to the segment electrodes X during the x-coordinate detection period of the coordinate detection period while scan pulses of the common electrode scan signals y are applied one by one to the common electrodes Y during the y-coordinate detection period, thereby detecting the coordinates of the electronic pen 11. However, also during the display period, select pulses of the common electrode drive signals a to h are applied to the common electrodes Y successively one by one. Accordingly, it is possible to perform the y-coordinate detection operation as in the foregoing embodiments not during the y-coordinate detection period but during the display period.

In the present embodiment, as detailed below, the y-coordinate detecting operation is carried out during the display period.

As described above, select pulses of the common electrode drive signals a to h are applied to the common electrodes Y one by one during the display period. However, segment electrode drive signals having a voltage corresponding to the content of display data are applied collectively to the segment electrodes X, as described above. In the timing chart as shown in FIG. 32, for example, a segment electrode drive signal A is applied to the odd-numbered segment electrodes $X_1$, $X_3$, . . . collectively while a segment electrode drive signal B is applied to the even-numbered segment electrodes $X_2$, $X_4$, . . . collectively.

Accordingly, to the tip electrode of the electronic pen 11 there are developed simultaneously an induced voltage caused by the common electrode drive signals a to h as well as an induced voltage caused by the segment electrode drive signals A and B. In such a case, it is impossible to decide which drive signal the induced voltage developed to the tip electrode is caused by, thus impossible to detect the coordinate of the tip electrode of the electronic pen 11.

This being the case, in the present embodiment, the induced voltage caused solely by the common electrode drive signals a to h are separated and detected in the following manner.

Figure 11:
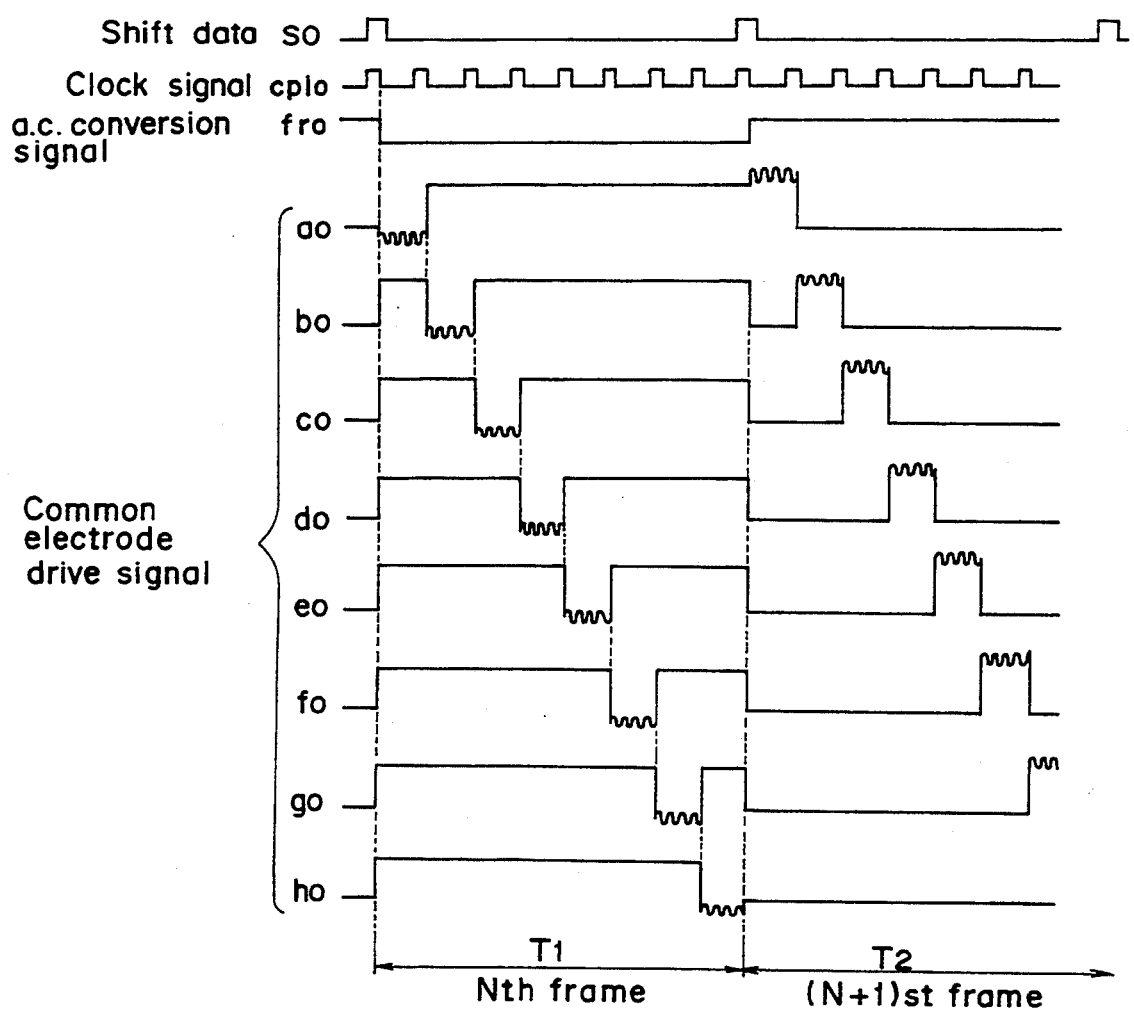
FIG. 11 is a view showing an example of a common electrode scan signal in the case where the scanning of electrodes is carried out during the display period.

FIG. 11 shows the waveform of the common electrode drive signals a to h in connection with the present embodiment. In the present embodiment, a high-frequency wave is superimposed on select pulses of the common electrode drive signals a to h. The voltage value of the high-frequency wave superimposed on the select pulses in the present embodiment is approximately 5 V. Such a high-frequency wave will hardly affect a liquid crystal display which is low in response speed.

An induced voltage signal developed to the tip electrode of the electronic pen 11 by both common electrode drive signals ao to ho, in which a high-frequency component is superimposed on select pulses as described above, and normal segment electrode drive signals A and B is passed through a filter so that its high-frequency component only is filtered out. Thus, the signal fed to the y-coordinate detection circuit 9 results in one in which only the induced voltage that depends on the common electrode drive signals ao to ho is separated.

In this way, according to the present embodiment, it is possible to detect the coordinates of the tip of the electronic pen 11 accurately during the display period.

To detect the x-coordinate of the tip of the electronic pen 11 in the present embodiment, the arrangement may be such that there is provided an x-coordinate detection period between one display period and another display period as shown in FIG. 2, during which x-coordinate detection period the x-coordinate is detected according to the segment electrode scan signals x in the same manner as in the foregoing embodiments. In this case, the y-coordinate detection period is eliminated and therefore the coordinate detection period can be shortened, ensuring a substantial length of the display period.

Further, it may also be arranged that an electrostatic induction tablet having only row electrodes X is stacked on the liquid crystal panel of the duty-type LCD in the present embodiment, wherein the x-coordinate of the tip of the electronic pen 11 is detected by the electrostatic induction tablet while the y-coordinate is detected by the liquid crystal panel.

In either case of the above-described embodiments where a high-frequency rectangular wave is inserted into the scan period of the segment electrode scan signal x or the common electrode scan signal y, or where a high-frequency sine wave is inserted into the scan period of the segment electrode scan signal x or the common electrode scan signal y, or where common electrode drive signals ao to ho in which a high-frequency wave is superimposed on select pulses are employed, phase of the high-frequency wave to be added to the pulses of signals applied to electrodes or a group of electrodes is changed for each electrode or for each group of electrodes, wherein the phase is detected to thereby detect the position of the tip of the electronic pen 11 with greater accuracy.

In addition, the frequency of the high-frequency wave added to the pulses may be adapted to be changed for each electrode or for each group of electrodes.

Embodiment 5

The following embodiment is one which can further enhance the effects of the foregoing embodiments.

The liquid crystal panel as describe above is so constructed, as shown in FIG. 1, that the common electrodes Y disposed on the lower side and the segment electrodes X disposed on the upper side cross each other at a specified interval. As a result, the common electrode Y and the segment electrode X constituting the same pixel results in different distances with respect to the tip electrode of the electronic pen 11. Accordingly, when scan pulses of the same peak value are applied to the common electrode Y and the segment electrode X, the induced voltage caused by the common electrode Y farther from the tip electrode of the electronic pen 11 results in a lower voltage. This is because the common electrode Y is shielded by the segment electrode X.

However, as described above, the peak value Vd of scan pulses of a scan signal cannot be set so freely because of a restriction due to the relation with the threshold value of the liquid crystal display voltage. Thus, disposed on the lower side is one group of electrodes, whichever scan pulses having the higher peak value Vd of the two, scan pulses of the segment electrode scan signals x and those of the common electrode scan signals y, are applied to.

This disposition allows the induced voltage caused by the segment electrode scan signal x and that caused by the common electrode scan signal y to be made approximately equal to each other.

In the present embodiment, it is arranged that the position of the common electrodes Y having the higher peak value Vd of scan pulses of the applied scan signals is below that of the segment electrodes X having the lower peak value Vd of scan pulses. The peak value Vd of scan pulses mentioned here is "$V_5-V_3$" for the segment electrode scan signal $x_1$, and "$V_2-V_0$" for the segment electrode scan signal $x_5$, referring to FIG. 5.

As a further embodiment in which the induced voltage caused by the segment electrode scan signal x and that caused by the common electrode scan signal y can be made approximately equal to each other, the following method is available.

That is, in an embodiment where the same scan signal is applied to a plurality of electrodes as shown in FIG. 7 or where a scan signal is applied to each electrode one by one to thereby produce the same effect as when the same scan signal is applied to a plurality of electrodes as shown in FIG. 8, the number of electrodes to which the same scan pulse (or scan pulse applied time Tp) is applied is set such that the number of one group of electrodes disposed on the lower side is larger than that of the other.

By this arrangement it is possible to heighten the induced voltage caused by a scan signal which is applied to the electrodes disposed on the lower side.

It may also be arranged without any problem that the two methods are used in combination, one that the peak value of scan pulses applied to the lower-side electrodes is set higher and the other that the number of electrodes to which the same scan signal is applied is set such that the number of one group of scanned electrodes disposed on the lower side is larger than the other.

Embodiment 6

In the above-described Embodiment 5, it is devised that the value of an induced voltage caused by a scan signal which is applied to the lower-side electrodes is set higher by a method that the peak value of scan pulses of the scan signal applied to the lower-side electrodes is set higher or another that the number of electrodes to which the same scan signal is applied is set such that the number of the electrodes disposed on the lower side is larger than the rest.

In contrast to this, the present embodiment is devised so that, even if the peak value of scan pulses of the segment electrode scan signals x and that of scan pulses of the common electrode scan signals y are equal to each other, the x- and y-coordinates of the tip of the electronic pen 11 can be detected with the same accuracy for each of them.

That is, in the present embodiment, instead of equalizing the peak value Vd of scan pulses of the segment electrode scan signals x and the peak value Vd of scan pulses of the common electrode scan signals y with each other, the amplification factor of the induced voltage caused by the scan signal for the lower-side electrodes (common electrodes Y in the present embodiment) is set larger than that of the induced voltage caused by the scan signal for the upper-side electrodes (segment electrodes X in the present embodiment).

More specifically, in the first place, an induced voltage signal caused by the segment electrode scan signal x and another induced voltage signal caused by the common electrode scan signal y are each amplified by the operational amplifier 12 at the same amplification factor. The amplification factor in this case is set to such a one that the induced voltage caused by the segment electrode scan signal x (a scan signal relevant to the electrodes disposed on the upper side) becomes a voltage (e.g. 2 V to 5 V) which is conveniently binary-digitized by a comparator built in the x-coordinate detection circuit 8 (setting of the factor in the present embodiment: 100). Whereas, the value of the induced voltage caused by the common electrode scan signal y (a scan signal relevant to the electrodes disposed on the lower side) after being subjected to amplification is not a one which is conveniently binary-digitized by a comparator built in the y-coordinate detection circuit 9 (e.g. a voltage below 0.5 V).

Thereafter, the induced voltage caused by the segment electrode scan signal x is binary-digitized by the comparator of the x-coordinate detection circuit 8.

At this point, the value of the induced voltage caused by the common electrode scan signal y is too low to binary-digitize, and therefore further amplified by an amplifier built in the y-coordinate detection circuit 9 (setting of the factor in the present embodiment: 100). In this amplification, if also the induced voltage signal caused by the segment electrode scan signal x were amplified by the aforementioned amplifier, an excessively large value of the fed induced voltage caused by the segment electrode scan signal x would result in an excessively large average level of the induced voltage so that the very induced voltage caused by the common electrode scan signal y could not be amplified properly. Thus, the arrangement is such that the induced voltage signal is fed to the built-in amplifier only during the y-coordinate detection period by means of an analog gate circuit or the like.

As an alternative arrangement of this, the amplification of the induced voltage may be carried out in the following manner. That is, there are provided an amplifier having an amplification factor of 100 and another having an amplification factor of 1000 to the x-coordinate detection circuit 8 and the y-coordinate detection circuit 9, respectively. There is further provided an analog gate circuit which is adapted to switch over the path along which the induced voltage signal derived from the electronic pen 11 is fed to the amplifier between one along which it passes through the amplifier having the amplification factor of 100 and the other along which it passes through the other amplifier having the amplification factor of 1000. With this arrangement, the above-mentioned path is switched to the side of the amplifier having the factor of 100 for the x-coordinate detection period while it is to the side of the amplifier having the factor of 1000 for the y-coordinate detection period.

Embodiment 7

In the foregoing embodiments as described above, for simplicity's sake, the coordinate detection period is provided after the display period of the Nth frame. However, the present invention is not limited thereto but allows the coordinate detection period to be inserted into the display period of the Nth frame.

In such a case, when on an intermediate point of the display period during which the image of the Nth frame is displayed the switching circuit 7 switchedly selects the side of the detection control circuit 6 to turn to the coordinate detection period, the display control circuit 4 stores the conditions of display data and various types of display control signals existing at the time point. Thereafter, when the switching circuit 7 switchedly selects the side of the display control circuit 4 to resume the display period of the aforementioned Nth frame, the display of the Nth frame may be resumed in accordance with the stored conditions of the signals.

Also, in the above case, the position into which the coordinate detection period is inserted in one display screen is not required to be identical at all times. For example, in the case of a 400 dots × 640 dots liquid crystal matrix, the coordinate detection period is inserted for every 321 lines. As a result, the frame period and the period of inserting the coordinate detection period are asynchronous with each other. Accordingly, the point at which the display period is switched over to the coordinate detection period will be moved at random in one display screen, thus minimizing the effect of the coordinate detection period to the display period.

Further, it is allowed that the number of times of inserting the coordinate detection period for each second is set larger than the frame frequency for each second.

EXAMPLE 2

To enhance the display efficiency by lengthening the display period of a one-frame period for display by liquid crystal, it is necessary to shorten the coordinate detection period as much as possible. In the display-integrated type tablet devices of the above-described Example 1, however, it is arranged as shown in FIG. 2 that the coordinate detection period is composed of an x-coordinate detection period and a y-coordinate detection period, where the x-coordinate is detected during one period and the y-coordinate is during another. This makes a limitation in shortening the coordinate detection period.

This being the case, in Example 2, the coordinate detection period is reduced to approximately ½ at a stroke by simultaneously carrying out the detection of the x-coordinate and that of the y-coordinate. That is, the display-integrated type tablet device in Example 2 is intended to achieve the second object of the present invention as stated above.

Embodiment 8

Figure 12:
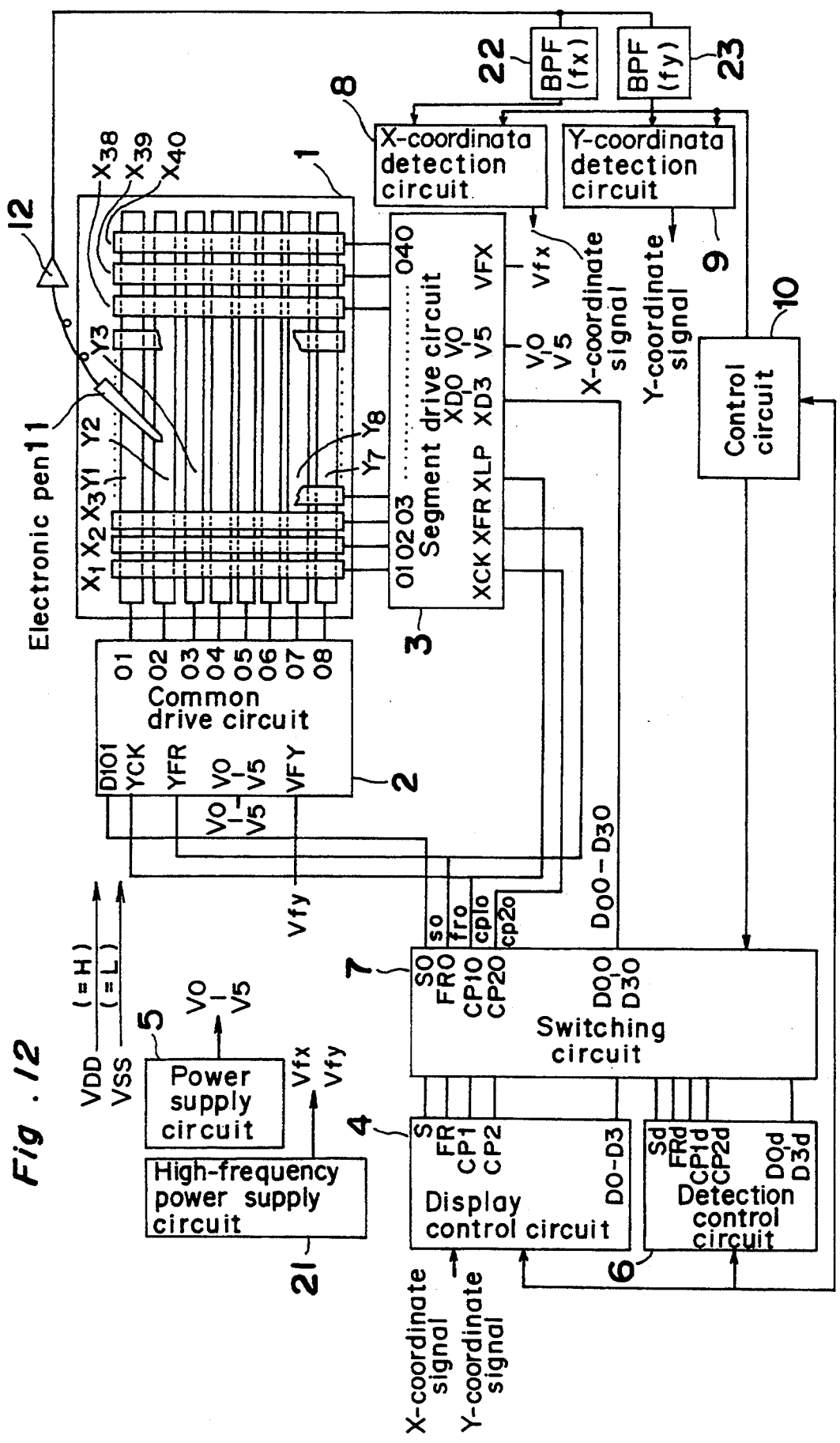
FIG. 12 is a block diagram of an embodiment of the display-integrated type tablet device according to Example 2 of the present invention.

FIG. 12 is a block diagram of a display-integrated type tablet device according to the present embodiment. This display-integrated type tablet device comprises in addition to the construction as shown in FIG. 1 in conjunction with Example 1: a high-frequency power supply circuit 21 for generating two high-frequency voltage signals Vfx and Vfy different in frequency from each other; a band-pass filter (hereinafter, abbreviated as BPF(fx)) 22 for allowing only the components equal in frequency to the high-frequency voltage signal Vfx out of induced voltage signals generated from the operational amplifier 12 to pass therethrough; and a BPF(fy) 23 for allowing only the components equal in frequency to the high-frequency voltage signal Vfy out of induced voltage signals generated from the operational amplifier 12 to pass therethrough.

In addition, in FIG. 12, like component parts are designated by like reference numerals in connection with FIG. 1.

The high-frequency voltage signals Vfx and Vfy may be either high-frequency pulse signals (hereinafter, referred to simply as pulse signals) or high-frequency sine-wave signals (hereinafter, referred to simply as sine waves).

Further, d.c. components may be additionally contained in these pulse signals or sine-wave signals. In this case, however, since any potential difference arising in the liquid crystal layer would cause deterioration of the liquid crystal, it is desirable that the high-frequency voltage signal Vfx and the high-frequency voltage signal Vfy are equal to each other in the voltage of their d.c. components.

The common drive circuit 2 has a high-frequency voltage signal input terminal VFY to which the high-frequency voltage signal Vfy derived from the high-frequency power supply circuit 21 is fed. Likewise, the segment drive circuit 3 has a high-frequency voltage signal input terminal VFX to which the high-frequency voltage signal Vfx derived from the high-frequency power supply circuit 21 is fed.

When the common drive circuit 2 and the segment drive circuit 3 shown in FIG. 1 without the above-mentioned high-frequency voltage signal input terminals VFY or VFX are used for those mentioned above as they are, an alternative arrangement may be such that the above-mentioned pulse signals are generated according to the d.c. bias power supplies $V_0$ to $V_5$ fed from the power supply circuit 5 without providing the high-frequency power supply circuit 21, as in the Embodiment 1.

Figure 13:
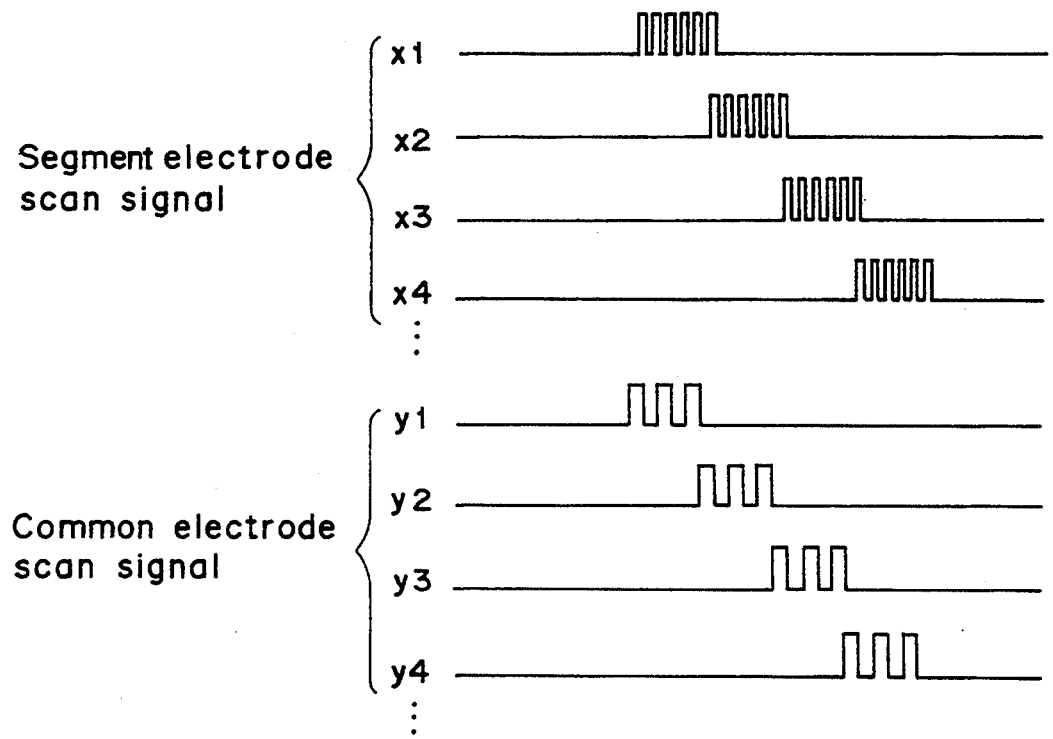
FIG. 13 is a timing chart of a segment electrode scan signal and a common electrode scan signal in the case where the detection of the x-coordinate and that of the y-coordinate are carried out simultaneously.

FIG. 13 is a timing chart of the coordinate detection period in the case where using the pulse signals as the high-frequency voltage signals Vfx and Vfy, the segment electrodes X and the common electrodes Y are simultaneously scanned with a segment electrode scan signal x in which the pulse signal Vfx is inserted into the scan period and a common electrode scan signal y in which the pulse signal Vfy is inserted into the scan period.

In this case, the pulse signal Vfx having a frequency of "fx" is used to scan the segment electrodes X while the pulse signal Vfy having a frequency of "fy" is used to scan the common electrodes Y, where the frequency "fx" of the pulse signal Vfx and the frequency "fy" of the pulse signal Vfy are set such that they can be separated by BPF(fx) 22 and BPF(fy) 23. Also, the frequencies "fx" and "fy" are set such that they are not any odd multiple of each other. This is to prevent the coordinate detection accuracy from being reduced owing to any odd-multiplied higher harmonic wave which would be involved if the waveform of the pulse signal Vfx or Vfy is distorted.

In the present embodiment, since the detection of the segment electrodes X and the common electrodes Y are carried out simultaneously as described above, there are developed to the tip electrode of the electronic pen 11 an value which has an induced voltage derived from the pulse signal Vfx and an induced voltage derived from the pulse signal Vfy superimposed one on another. The induced voltage signal from the electronic pen 11 is amplified by the operational amplifier 12 and thereafter fed to the BPF(fx) 22 and the BPF(fy) 23.

Then the BPF(fx) 22 allows only the component of frequency "fx" out of the input induced voltage signals to pass therethrough, transmitting it to the x-coordinate detection circuit 8. Meanwhile, the BPF(fy) 23 allows only the component of frequency "fy" out of the input induced voltage signals to pass therethrough, transmitting it to the y-coordinate detection circuit 9.

As a result of this, the x-coordinate detection circuit 8 receives only the induced voltage signal derived from the segment electrode scan signal x (in which the pulse signal Vfx is inserted into the scan period). Meanwhile, the y-coordinate detection circuit 9 receives only the induced voltage derived from the common electrode scan signal y (in which the pulse signal Vfy is inserted into the scan period).

Then the x-coordinate detection circuit 8 detects the x-coordinate of the position designated by the tip of the electronic pen 11 according to an input signal from the BPF(fx) 22 and a timing signal from the control circuit 10, generating an x-coordinate signal representing the x-coordinate. Likewise, the y-coordinate detection circuit 9 detects the y-coordinate of the position designated by the tip of the electronic pen 11 according to an input signal from the BPF(fy) 23 and a timing signal from the control circuit 10, generating a y-coordinate signal representing the y-coordinate.

Figure 14:
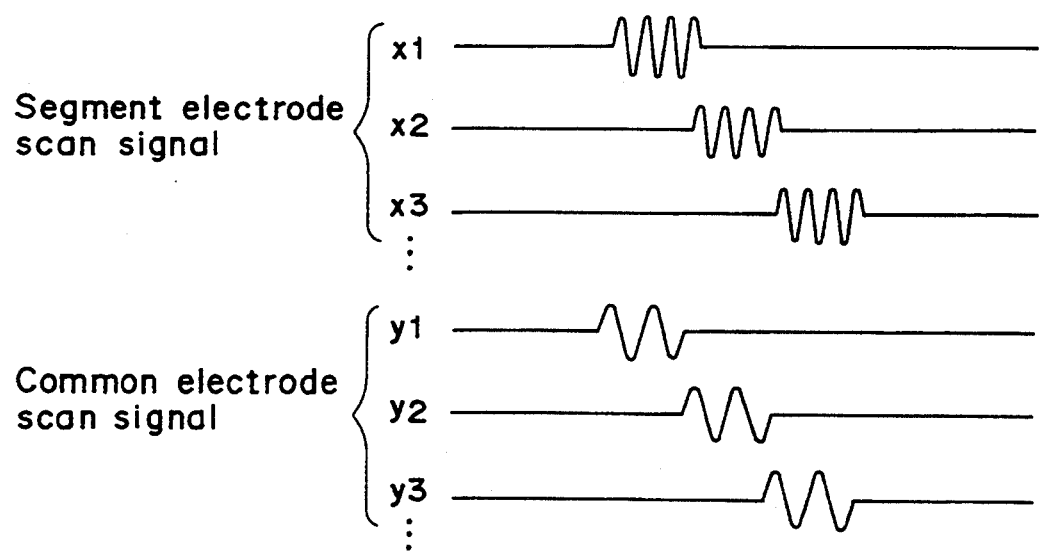
FIG. 14 is a timing chart of a segment electrode scan signal and a common electrode scan signal each different from that in FIG. 13 in the case where the detection of the x-coordinate and that of the y-coordinate are carried out simultaneously.

FIG. 14 is a timing chart of the coordinate detection period in the case where using the above-mentioned sine-wave signal as the high-frequency voltage signal Vfx or Vfy to be inserted into the scan period of the segment electrode scan signal x or the common electrode scan signal y.

Similarly to the above case, the segment electrodes X and the common electrodes Y can be scanned simultaneously by setting the frequencies of the scan periods of the two scan signals such that they are not any odd multiple of each other.

In addition, in FIGS. 13 and 14, the period of the pulse signal or the sine-wave signal is substantially extended for a better understanding.

As described above, in the present embodiment, the segment electrodes X and the common electrodes Y are simultaneously scanned with a segment electrode scan signal x, in which the high-frequency voltage signal Vfx having the frequency of "fx" is inserted into the scan period, and a common electrode scan signal y, in which the high-frequency voltage signal Vfy having the frequency of "fy" is inserted into the scan period. Then only the component of frequency "fx" of an induced voltage signal developed to the tip of the electronic pen 11 is selectively transmitted to the x-coordinate detection circuit 8 by the BPF(fx) 22 while only the component of frequency "fy" is selectively transmitted to the y-coordinate detection circuit 9 by the BPF(fy) 23.

In consequence, the x-coordinate detection circuit 8 and the y-coordinate detection circuit 9 simultaneously receive an induced voltage derived from a corresponding scan signal, thus enabling the x- and y-coordinates of the tip of the electronic pen 11 to be detected at the same time.

Hence, according to the present embodiment, as compared with embodiments in which the x-coordinate detection period and the y-coordinate detection period are independently effected during different periods, the coordinate detection period can be reduced to approximately ½, allowing the display period in a one-frame period to be lengthened.

EXAMPLE 3

As detailed in conjunction with the foregoing Example 1, to prevent the possibility that the liquid crystal filled in the liquid crystal panel 1 may undergo electrolysis, which leads to reduction in service life, it is devised that the direction in which a voltage is applied to the liquid crystal layer that forms the pixels is inverted depending on the level of the a.c. conversion signal fro.

Figure 15:
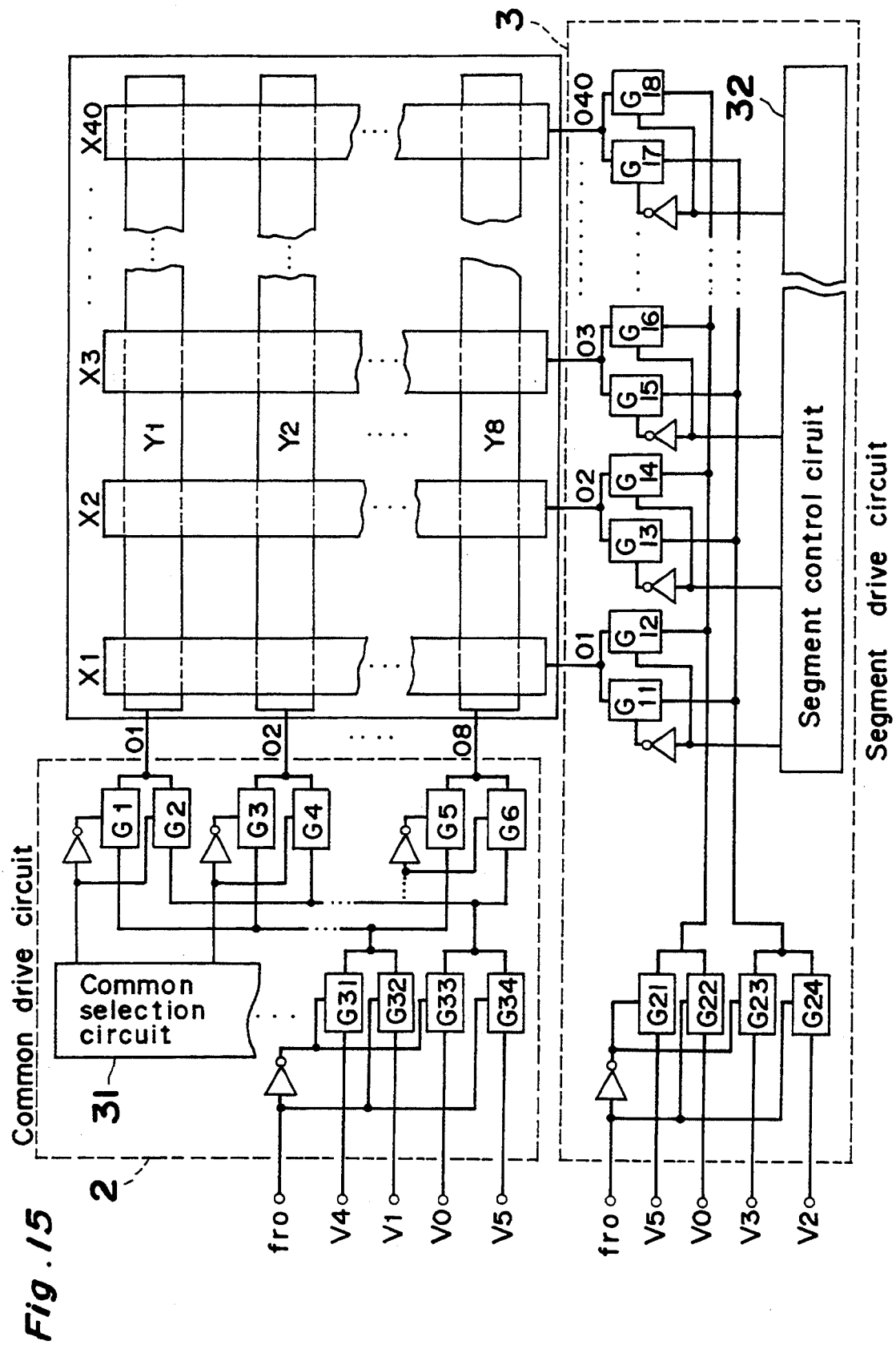
FIG. 15 is a view showing a practical example of an analog switch system of the common drive circuit and the segment drive circuit in the display-integrated type tablet device as shown in FIG. 1.

FIG. 15 is a view showing an example of the analog switch system in the common drive circuit 2 and the segment drive circuit 3 of the display-integrated type tablet device as shown in FIG. 1.

The analog switch system in the common drive circuit 2 is generally comprised of: transfer gate parallel pairs $G_1/G_2$, $G_3/G_4$, ..., $G_5/G_6$ connected to the common electrodes $Y_1$, $Y_2$, ..., $Y_8$, respectively; inverters connected between the gate terminals of transfer gates $G_1$, $G_3$, ..., $G_5$ and the corresponding output terminals of a common selection circuit 31; a transfer gate parallel pair $G_{31}/G_{32}$ connected to input terminals of the transfer gates $G_1$, $G_3$, ..., $G_5$; a transfer gate parallel pair $G_{33}/G_{34}$ connected to input terminals of the transfer gates $G_2$, $G_4$, ..., $G_6$; and an inverter connected between the gate terminals of the transfer gates $G_{31}$, $G_{33}$ and the a.c. conversion signal output terminal FRO of the switching circuit 7 (see FIG. 1).

Also, the analog switch system in the segment drive circuit 3 is generally comprised of: transfer gate parallel pairs $G_{11}/G_{12}$, $G_{13}/G_{14}$, $G_{15}/G_{16}$, ..., $G_{17}/G_{18}$ connected to the segment electrodes $X_1$, $X_2$, ..., $X_{40}$, respectively; inverters connected between the gate terminals of transfer gates $G_{11}$, $G_{13}$, $G_{15}$, ..., $G_{17}$ and the corresponding output terminals of a segment control circuit 32; a transfer gate parallel pair $G_{23}/G_{24}$ connected to input terminals of the transfer gates $G_{11}$, $G_{13}$, $G_{15}$, ..., $G_{17}$; a transfer gate parallel pair $G_{21}/G_{22}$ connected to input terminals of the transfer gates $G_{12}$, $G_{14}$, $G_{16}$, ..., $G_{18}$; and an inverter connected between the gate terminals of the transfer gates $G_{21}$, $G_{23}$ and the a.c. conversion signal output terminal FRO of the switching circuit 7.

In addition, each transfer gate mentioned above turns "ON" when a signal of "H" level is fed to its gate terminal while it turns "OFF" when a signal of "L" level is fed thereto.

Further, the common selection circuit 31 and the segment control circuit 32 generate a select signal of "H" level at the corresponding output terminal to select the common electrode Y or the segment electrode X while they generate a select signal of "L" level to select no electrodes.

With the above-described arrangement, the common drive circuit 2 and the segment drive circuit 3 will operate in the following way during the y-coordinate detection period, for example, when the a.c. conversion signal fro from the switching circuit 7 is at an "H" level.

When the a.c. conversion signal fro of "H" level is applied to the common drive circuit 2, the transfer gates $G_{32}$, $G_{34}$ turn "ON," and a bias power supply $V_1$ from the power supply circuit 5 is fed to the input terminals of the transfer gates $G_1$, $G_3$, ..., $G_5$. Meanwhile, a bias power supply $V_5$ is fed to the input terminals of the transfer gates $G_2$, $G_4$, ..., $G_6$.

At this point, in order that the common electrode $Y_1$ is selected for example, a select signal of "H" level is generated from the common selection circuit 31 to the gate terminal of the transfer gate pair $G_1/G_2$, and as a result the bias power supply $V_5$ is generated from the transfer gate $G_2$ to the common electrode $Y_1$. Meanwhile, a select signal of "L" level is generated to the gate terminals of the transfer gate pairs $G_3/G_4$, ..., $G_5/G_6$, and as a result the bias power supply $V_1$ is generated from the transfer gates $G_3$, ..., $G_5$ to the common electrodes $Y_2$, ..., $Y_8$.

Likewise, when the a.c. conversion signal fro of "H" level is applied to the segment drive circuit 3, the transfer gates $G_{22}$, $G_{24}$ turn "ON," and a bias power supply $V_0$ from the power supply circuit 5 is fed to the input terminals of the transfer gates $G_{12}$, $G_{14}$, $G_{16}$, ..., $G_{18}$. Meanwhile, a bias power supply $V_2$ is fed to the input terminals of the transfer gates $G_{11}$, $G_{13}$, $G_{15}$, ..., $G_{17}$.

At this point, since no segment electrodes X are selected during the y-coordinate detection period, a select signal of "L" level is generated from the segment control circuit 32 to the gate terminals of the transfer gate pairs $G_{11}/G_{12}$, $G_{13}/G_{14}$, ..., $G_{17}/G_{18}$, and as a result the bias power supply $V_2$ is generated from the transfer gates $G_{11}$, $G_{13}$, $G_{15}$, ..., $G_{17}$ to the segment electrodes $X_1$, $X_2$, $X_3$, ..., $X_{40}$.

As a result of this, between the selected common electrode $Y_1$ and the segment electrodes X there is applied a voltage $|V_5-V_2|$ while between the non-selected common electrodes $Y_2$, ..., $Y_8$ and the segment electrodes X there is applied a voltage $|V_1-V_2|$.

Figure 16:
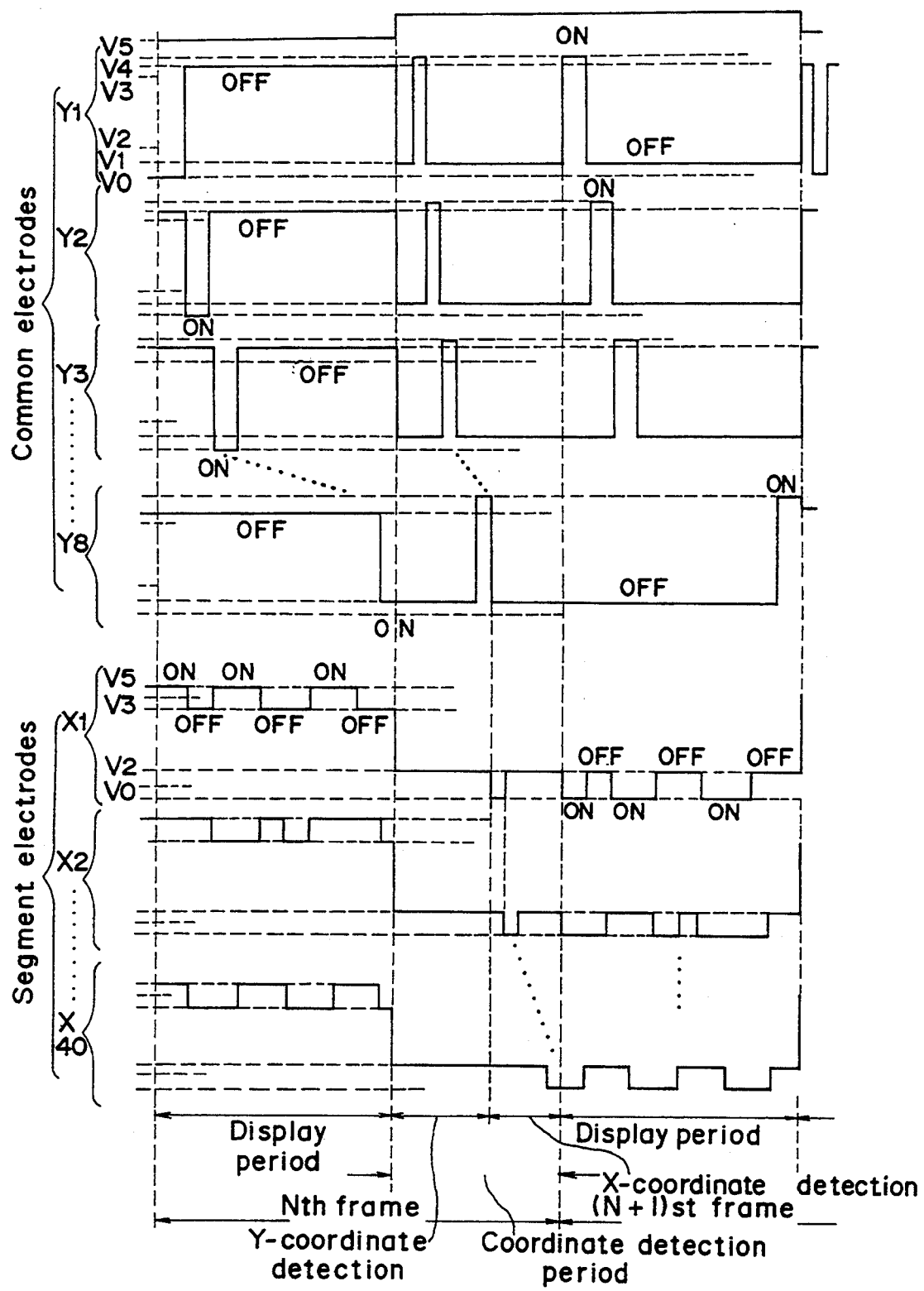
FIG. 16 is a timing chart of a drive signal and a scan signal generated by the display-integrated type tablet device having the analog switch system as shown in FIG. 15.

Subsequent to this on, the common electrode $Y_2$, $Y_3$, ..., $Y_8$ are selected in turn, there is applied a voltage $|V_5-V_2|$ between the selected common electrode Y and the segment electrodes X, as show in FIG. 16 (FIG. 3).

Next, the common drive circuit 2 and the segment drive circuit 3 operate in the following way during the y-coordinate detection period when the level of the a.c. conversion signal fro is inverted.

When an a.c. conversion signal fro of "L" level is applied to the common drive circuit 2 and the segment drive circuit 3, the transfer gates $G_{31}$, $G_{33}$ and the transfer gates $G_{21}$, $G_{23}$ turn "ON." As a result, in the same manner as in the above case, there is applied a voltage $|V_0-V_3|$ between the selected common electrode Y and the segment electrodes X.

In this way, in correspondence to inversion of the level of the a.c. conversion signal fro, the direction in which the a voltage is applied to the liquid crystal is inverted.

Such a technique as described above is an extremely effective, indispensable technique for display by liquid crystal. However, it will be a very troublesome technique when one liquid crystal panel 1 serves both for the image display function and for the tablet function. Thus, to avoid various possible problems, in Example 1, the inversion of the level of the a.c. conversion signal fro is independently controlled for each of the display period and the coordinate detection period, whereby the display-integrated type tablet device incorporating liquid crystal is realized.

Figure 17:
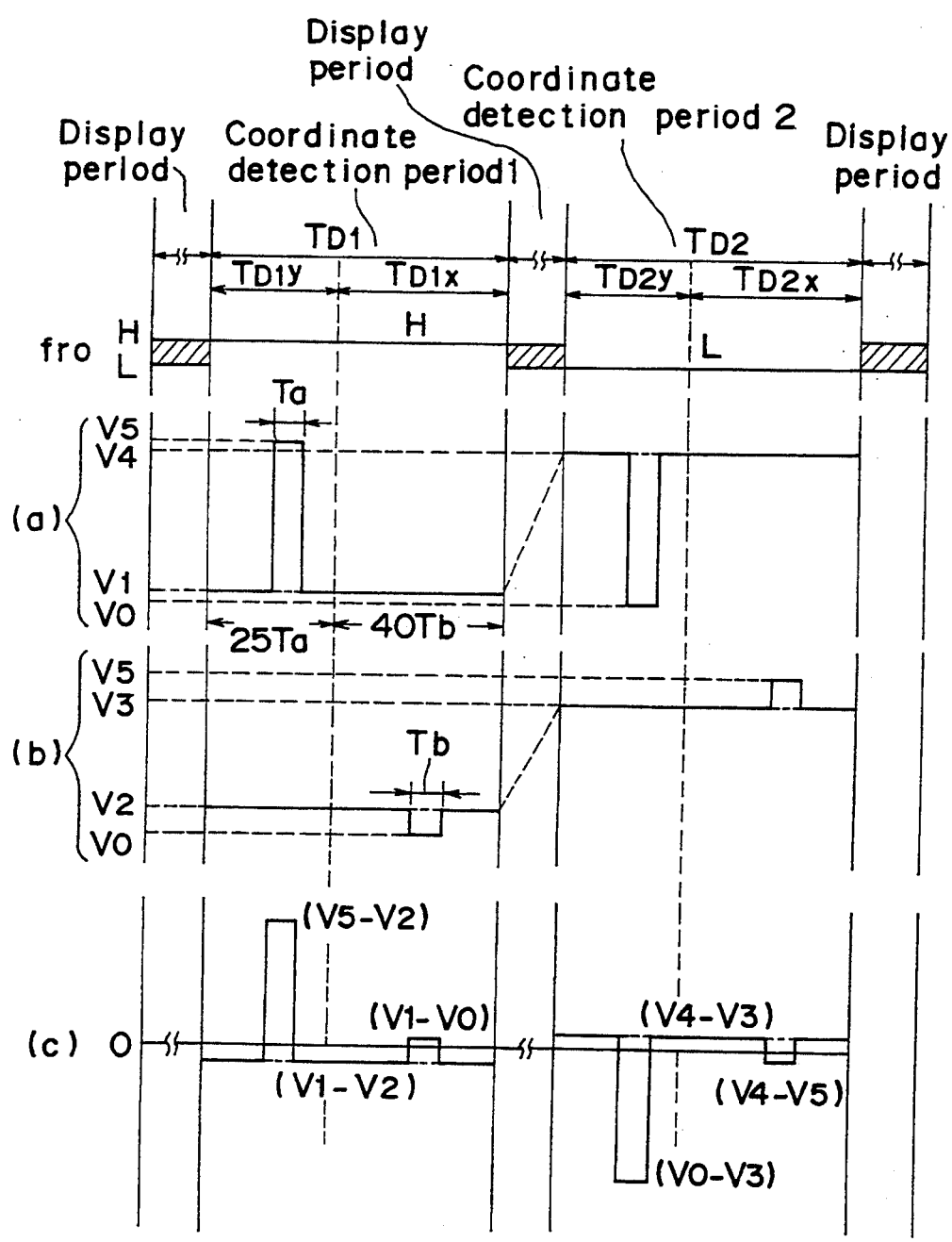
FIG. 17 is a view in which the display period in FIG. 16 is omitted.

FIG. 17 is a view in which only the coordinate detection period is enlarged while the display period as in FIG. 16 is omitted.

For example, as described in the foregoing Embodiment 2, if 400 strips of common electrodes Y and 640 strips of segment electrodes X are scanned by the 16 strips as one block, the resulting number of blocks of common electrodes Y is 25 and that of segment electrodes X is 40.

On this condition, a common electrode scan signal Y having scan pulses with a pulse width of "Ta" as shown in FIG. 17(a) is applied to each common electrode block. Meanwhile, a segment electrode scan signal x having scan pulses with a pulse width of "Tb" as shown in FIG. 17(b) is applied to each segment electrode block.

In addition, the position of each scan pulse differs among the common electrode blocks and the segment electrode blocks.

FIG. 17(c) shows the voltage of the common electrode Y with respect to the segment electrodes X in each pixel resulting when a common electrode scan signal y as shown in FIG. 17(a) is applied to the common electrodes Y while a segment electrode scan signal x as shown in FIG. 17(b) is applied to the segment electrodes X.

In this case, all of the common electrodes Y and the segment electrodes X are scanned each once during a one-time coordinate detection period. Accordingly, in FIG. 17, during the y-coordinate detection period and the x-coordinate detection period in coordinate detection period 1, a common electrode scan signal y or a segment electrode scan signal x as shown in FIG. 17(a) or FIG. 17(b) is applied to all of the common electrodes Y and the segment electrodes X with different timings of scan pulses.

Therefore, the individual average voltages of the common electrodes Y and the segment electrodes X in the coordinate detection period 1 result in the same value. As a result of this, the average value of the voltages of the common electrode Y with respect to the segment electrode X at each pixel as shown in FIG. 17(c) also results in the same one.

The average value of the voltages of the common electrodes Y with respect to the segment electrodes X at each pixel (hereinafter, referred to simply as interelectrode average voltage) is given by equation (1):

$$Vdc = \frac{1}{T_{D1}} \int_0^{T_{D1}} Vdt$$

Assuming that the display conditions are:
1) number of pixels = 400×640;
2) length of y-coordinate detection period = 25 Ta (1 common-electrode block: 16 strips, number of common-electrode blocks: 25);
3) length of x-coordinate detection period = 40 Tb (1 segment-electrode block: 16 strips, number of segment-electrode blocks: 40), and moreover
4) Ta = Tb
5) $V_0 = 0.0$ V, $V_1 = 1.7$ V, $V_2 = 3.4$ V $V_3 = 23.5$ V, $V_4 = 25.2$ V, $V_5 = 26.9$ V, then the interelectrode average voltage Vdc for the coordinate detection period 1 during which the a.c. conversion signal fro is at an "H" level is Vdc = −1.26 V.

Also, the interelectrode average voltage Vdc for the coordinate detection period 2 during which the a.c. conversion signal fro is at an "L" level is Vdc = +1.26 V.

As shown above, the level of the a.c. conversion signal fro is inverted for each frame (i.e. for each coordinate detection period), whereby not only the direction in which a voltage is applied to each pixel during the coordinate detection period is inverted but also polarity of the average voltage applied to each pixel is inverted (unchanged in absolute value).

As a result, the interelectrode average voltage Vdc with respect to each pixel reaches approximately "0 V" over repeated coordinate detection, thereby preventing the liquid crystal from undergoing electrolysis and deterioration accompanying thereto.

Figure 18:
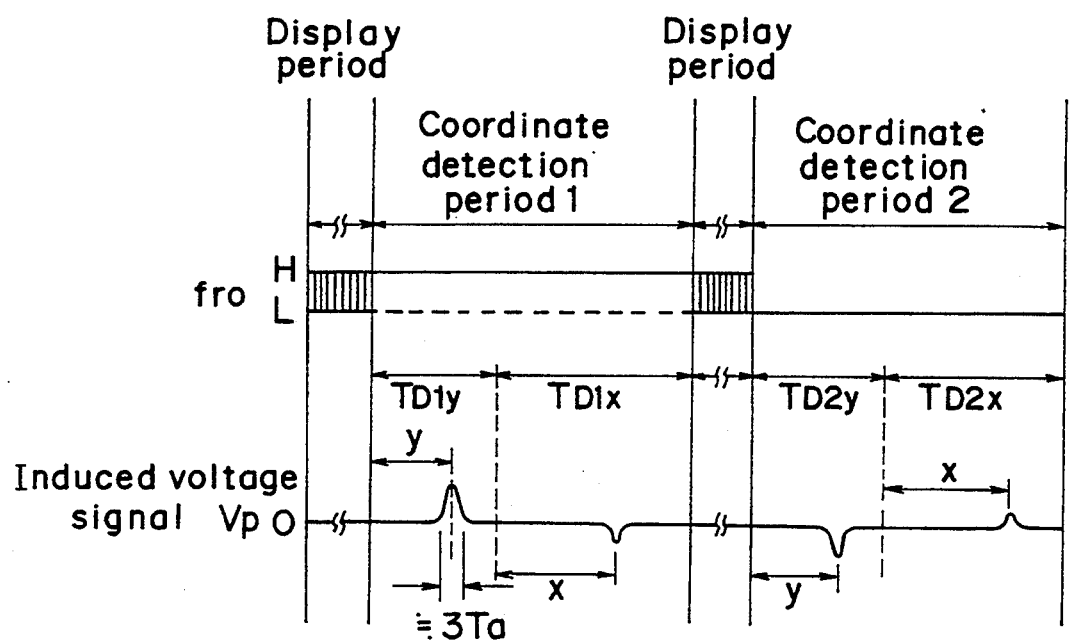
FIG. 18 is an explanatory view of an induced voltage developed from the electronic pen on the basis of the common electrode scan signal and the segment electrode scan signal as shown in FIG. 17.

However, as described above, when the direction in which a voltage is applied to the liquid crystal is inverted by making the level of the a.c. conversion signal fro inverted, the correlation whether the level of the scan pulse voltage is higher or lower than that of the non-scan voltage of the common electrode scan signal y and the segment electrode scan signal x is inverted for each coordinate detection period, as shown in FIGS. 17(a) and 17(b). This leads to a result, as shown in FIG. 18, that the polarity of an induced voltage signal Vp generated from the tip electrode of the electronic pen 11 is inverted even if the position of the tip of the electronic pen 11 is unchanged between the coordinate detection period 1 and the coordinate detection period 2.

The polarity inversion of the induced voltage signal Vp from the electronic pen 11 brings about the following problems.

As one of the problems, with the operational amplifier 12 built in the electronic pen 11 as shown in FIG. 1, a bipolar source voltage is required to equalize the bipolar amplification characteristics of the operational amplifier 12. This causes the leads for supplying a voltage to the electronic pen 11 to increase.

Also, even if the construction of the electronic pen 11 is simplified such an operational amplifier is installed to the x-coordinate detection circuit 8 and the y-coordinate detection circuit 9 on the tablet device side, yet there is a need for a power supply having different polarities.

Further, even if the voltage is amplified in the bipolar characteristic with an added bipolar power supply, the coordinates of the tip of the electronic pen 11 must be calculated from output voltages of different polarities, which raises complexity in the x-coordinate detection circuit 8 and y-coordinate detection circuit 9.

Yet further, as described in the foregoing Embodiment 1, even if it is intended that the polarity is unified by full-wave rectifying the induced voltage signal from the electronic pen 11 before amplifying it, the voltage of the induced voltage signal is no more than 30 mV or so, which will not allow the diode to accomplish the above-mentioned operation.

Furthermore, there may arise some cases in which the x- and y-coordinates of the tip of the electronic pen 11 differ depending on inversion of the level of the a.c. conversion signal fro owing to the characteristics of the operational amplifier 12 and other reasons, irrespectively of the unchanged position of the electronic pen 11.

Thus, the Example 3 is designed to solve the above-described various problems by preventing the inversion of the polarity of the induced voltage signal derived from the electronic pen 11. In other words, the display-integrated type tablet device in Example 3 is one to achieve the third object of the present invention as described previously.

Embodiment 9

As described above, to prevent inversion of the polarity of the induced voltage signal derived from the electronic pen 11, there is a need of preventing electrolysis in the liquid crystal without inverting the level of the a.c. conversion signal fro for each coordinate detection period. This can be achieved by setting the interelectrode average voltage Vdc for all the coordinate detection periods to "0 V."

In the present embodiment, therefore, the interelectrode average voltage Vdc for the coordinate detection period is set to "0 V" without any additional power supply circuit being provided.

Figure 19:
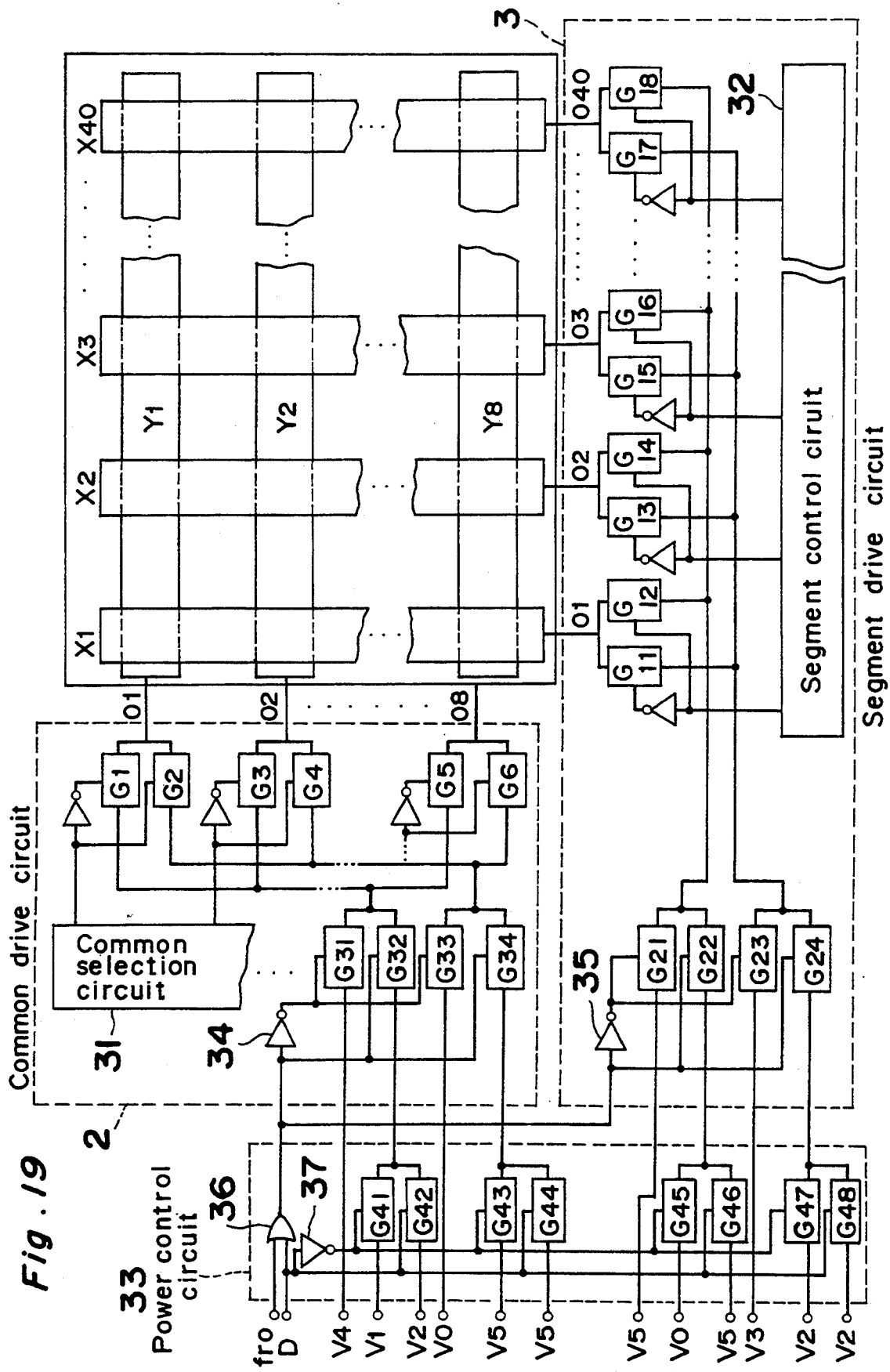
FIG. 19 is a view showing an example of the analog switch system of the common drive circuit and the segment drive circuit in the display-integrated type tablet device according to Example 3 of the present invention.

FIG. 19 is a block diagram of the analog switch system of the common drive circuit 2 and the segment drive circuit 3 in the display-integrated type tablet device according to the present embodiment. The common electrode scan signal y and the segment electrode scan signal x which are fed to the common electrodes Y and the segment electrodes X during the coordinate detection period in the present embodiment are explained just below before describing the display-integrated type tablet device of the present embodiment referring to FIG. 19.

The interelectrode average voltage Vdc for the coordinate detection period is given by the equation (1), as stated above.

It is assumed here in the present embodiment as in the foregoing ones that 400 strips of common electrodes Y and 640 strips of segment electrodes X are scanned in the devices of blocks each comprising 16 strips of electrodes. In this scanning operation, the common electrodes Y receive an input of a common electrode scan signal y which has a non-scan voltage "Vc1," and a pulse width "Ta" and a voltage "Vs1" of scan pulses while the segment electrodes X receive an input of a segment electrode scan signal x which has a non-scan voltage "Vs1," and a pulse width "Tb" and a voltage "Vs1" of scan pulses.

Then the interelectrode average voltage Vdc can be determined by equation (1) as follows:

$$Vds = [24Ta(Vc1 - Vs1) + Ta(Vc2 - Vs1) + \quad (2)$$
$$39Tb(Vc1 - Vs1) + Tb(Vc1 - Vs2)]/(25Ta + 40Tb)$$

Accordingly, it is possible to set the interelectrode average voltage Vdc to "0" by properly determining the values of Ta, Tb, Vc1, Vs1, Vc2, and Vs2 in equation (2).

In this case, however, there is a restriction that the voltage between the two groups of electrodes during the coordinate detection period should be selected within the range less than $|V_5-V_2|$ and $|V_3-V_0|$, where the values of bias voltages $V_0$, $V_2$, $V_3$, and $V_5$ are the same as in Embodiment 1.

In the above equation (2), the greatest factor that makes the absolute value of the interelectrode average voltage Vdc large is the value of the difference, (Vc1−Vs1) between the non-scan voltage Vc1 of the common electrode scan signal y and the non-scan voltage Vs1 of the segment electrode scan signal x. This can be confirmed from the fact that the factor of the term of (Vc1−Vs1) in equation (2) is large.

Accordingly, the most basic, effective method for minimizing the interelectrode average voltage Vdc is to equalize the non-scan voltage Vc1 (i.e. reference voltage) of the common electrode scan signal y and the non-scan voltage Vs1 (i.e. reference voltage) of the segment electrode scan signal x with each other.

For instance, in the above equation (2), if Ta=Tb, then the result will be equation (3):

$$Vdc=[64(Vc1-Vs1)+(Vc2-Vs2)]/65 \quad (3)$$

Further if Vc1=Vs1, then the result will be equation (4):

$$Vdc=(Vc2-Vs2)/65 \quad (4)$$

With this result, assume that the voltage Vc2 of scan pulses of the common electrode scan signal y (i.e. the above-noted scan voltage) is "23.5 V" and that the scan voltage Vs2 of the segment electrode scan signal x is "11.5 V." Then the interelectrode average voltage Vdc is, according to equation (4), $$Vdc=12/65=0.18$$

This is a value within a negligible range.

However, with the condition of Vc1≠Vs1, if (Vc1 Vs1)=2.0, Vc2=23.5 V, and Vs2=11.5 V, then the value of interelectrode average voltage Vdc results in "1.99," which is a value that cannot be neglected.

Figure 20:
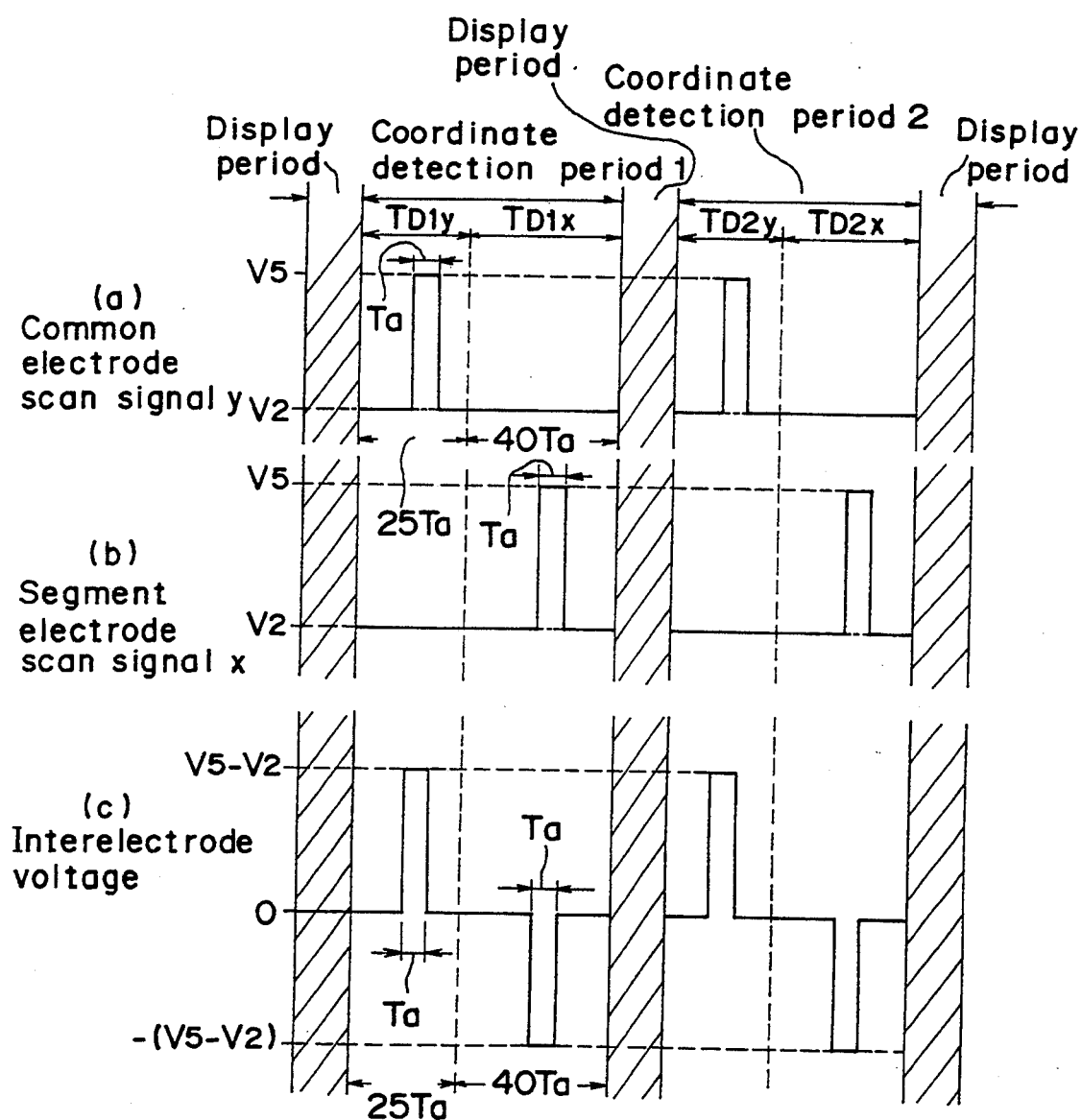
FIG. 20 is an explanatory view of the common electrode scan signal, segment electrode scan signal, and interelectrode voltage generated by the display-integrated type tablet device as shown in FIG. 19.

FIG. 20 shows waveforms of the common electrode scan signal y, segment electrode scan signal x, and interelectrode voltage between the two electrodes in the case where the value of the interelectrode average voltage Vdc is set to "0" by setting Ta=Tb, Vc1=Vs1=$V_2$ (=3.4 V), and Vc2=Vs2=$V_5$ (=26.9 V) using the bias power supply, as it is, derived from the power supply circuit 5 in the display-integrated type tablet device of Embodiment 1.

Referring to FIG. 20, the peak value of scan pulses of the common electrode scan signal y and the segment electrode scan signal x results in ($V_5-V_2$). In this case, the more the peak value of scan pulses, the higher the induced voltage from the electronic pen 11 can be obtained, advantageously. However, if the peak value of scan pulses was set to a maximum ($V_5-V_0$) that allows the use of the above-mentioned bias power supplies, the result would exceed the liquid crystal display voltage, leading to a screen lowered in contrast.

In view of these aspects, the above-described method is the simplest, most reliable method since it allows the interelectrode average voltage Vdc to be set to "0" and moreover a higher induced voltage to be obtained, without requiring a special power supply for the coordinate detection.

To embody the above-mentioned method, the analog switch system in the display-integrated type tablet device as show in FIG. 19 has the following modifications incorporated in the analog switch system of the common drive circuit 2 and the segment drive circuit 3 in the display-integrated type tablet device as shown in FIG. 1 (see FIG. 15).

That is, the analog switch system in the display-integrated type tablet device of the present embodiment comprises a power control circuit 33 in addition to the arrangement of the analog switch system of the display-integrated type tablet device as shown in FIG. 15. Incidentally, in FIG. 19, like component parts are designated by like numerals in connection to FIG. 15, with explain thereof omitted.

The power control circuit 33 is generally comprised of: a transfer gate parallel pair $G_{41}/G_{42}$ connected to the input terminal of a transfer gate $G_{32}$ of the common drive circuit 2; a transfer gate parallel pair $G_{43}/G_{44}$ connected to the input terminal of a transfer gate $G_{34}$; a transfer gate parallel pair $G_{45}/G_{46}$ connected to the input terminal of the transfer gate $G_{22}$ of the segment drive circuit 3; a transfer gate parallel pair $G_{47}/G_{48}$ connected to the input terminal of the transfer gate $G_{24}$; an OR gate 36 connected to both an inverter 34 of the common drive circuit 2 and an inverter 35 of the segment drive circuit 3; and an inverter 37 interposed between one input terminal of the OR gate 36 and the gate terminals of the transfer gate $G_{41}$, $G_{43}$, and $G_{47}$.

The input terminal of the OR gate 36 on the side to which the inverter 37 is connected in the above-mentioned power control circuit 33 is to receive a mode control signal D while the other input terminal is to receive the a.c. conversion signal fro. Also, the input terminals of the transfer gates $G_{42}$, $G_{48}$ are to receive a bias power supply $V_2$ while the input terminals of the transfer gates $G_{44}$, $G_{46}$ are to receive a bias power supply $V_5$.

In addition, in this case, the transfer gates $G_{44}$, $G_{48}$ are dispensable practically.

The mode control signal D, being generated from the control circuit 10 for example, is a signal which goes "H" level for the coordinate detection period and goes "L" level for the display period. As a result, the OR gate 36 outputs the a.c. conversion signal fro as it is during the display period while it outputs a signal of "H" level at all times during the coordinate detection period.

In the common drive circuit 2, segment drive circuit 3, and power control circuit 33 constructed as described above, the transfer gate parallel pair $G_{41}/G_{42}$ selects the bias power supply $V_I$ by the transfer gate $G_{41}$ for the display period and selects $V_2$ by the transfer gate $G_{42}$ for the coordinate detection period, transmitting it to the transfer gate $G_{32}$ of the common drive circuit 2.

Likewise, the transfer gate parallel pair $G_{43}/G_{44}$ selects the bias power supply $V_5$ for either of the display period or the coordinate detection period, transmitting it to the transfer gate $G_{34}$ of the common drive circuit 2. Also, the transfer gate parallel pairs $G_{45}/G_{46}$, $G_{47}/G_{48}$ select the bias power supplies $V_0$, $V_2$, respectively, for the display period and select the bias power supplies $V_5$, $V_2$, respectively, for the coordinate detection period, transmitting them to the transfer gates $G_{22}$, $G_{24}$ of the segment drive circuit 3.

As a result, during the display period, the common drive circuit 2 operates in the manner as described for FIG. 15 to generate common electrode drive signals a to h such as shown in FIG. 32 using the bias power supplies $V_0$, $V_1$, $V_4$, and $V_5$. Meanwhile, the segment drive circuit 3 operates in the manner as described for FIG. 15 to generate segment electrode drive signals A and B such as shown in FIG. 32 using the bias power supplies $V_0$, $V_2$, $V_3$, and $V_5$.

During the coordinate detection period, on the other hand, since there are generated only "H" level outputs from the OR gate 36 as described above, the common drive circuit 2 closes the transfer gates $G_{31}$, $G_{33}$ to generate such a common electrode scan signal y as shown in FIG. 20 (a) using the bias power supplies $V_2$ and $V_5$ only. Meanwhile, the segment drive circuit 3 closes the transfer gates $G_{21}$, $G_{23}$ to generate such a segment electrode scan signal x as shown in FIG. 20(b) using the bias power supplies $V_2$ and $V_5$ only.

As result, during the coordinate detection period, there are generated a common electrode scan signal y and a segment electrode scan signal x both of which have scan pulses of the same reference voltage "$V_2$" and the same peak value "$(V_5-V_2)$."

FIG. 20(c) shows an interelectrode voltage in the case where a common electrode scan signal y as shown in FIG. 20(a) is applied to the common electrodes Y while a segment electrode scan signal x as shown in FIG. 20(b) is applied to the segment electrodes X.

The waveform of the interelectrode voltage in this case is symmetrical with respect to the reference voltage "0 V," so that the interelectrode average voltage Vdc is "0 V," which prevents electrolysis of the liquid crystal and deterioration thereof due to the electrolysis.

Figure 21:
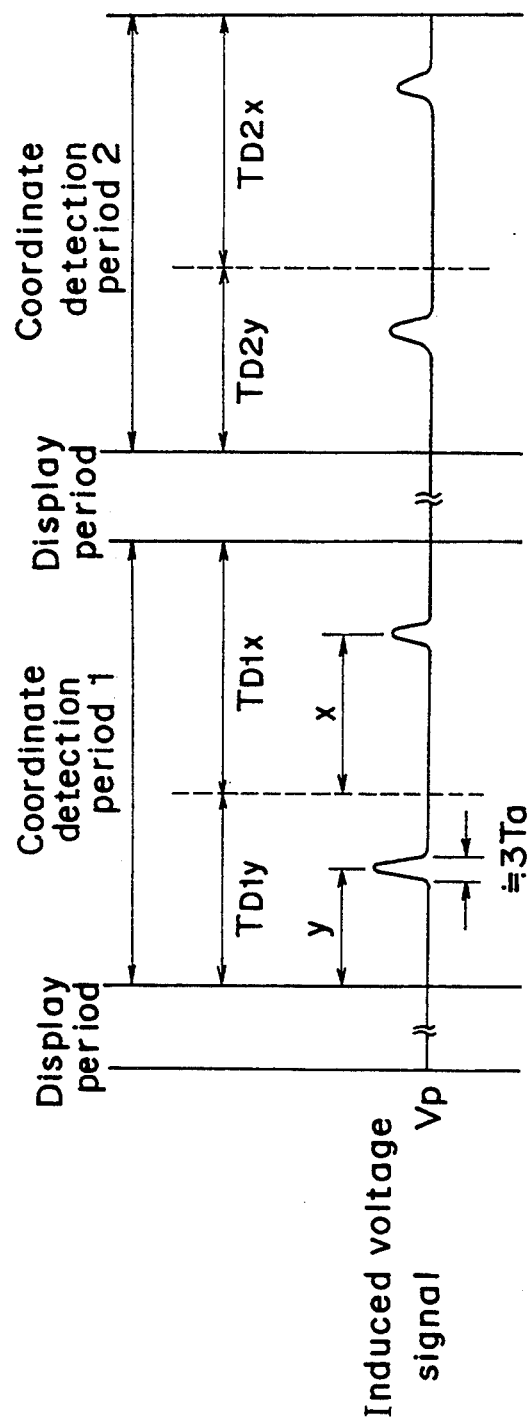
FIG. 21 is an explanatory view of the induced voltage developed from the electronic pen on the basis of the common electrode scan signal and the segment electrode scan signal as shown in FIG. 20.

Further, as seen from FIGS. 20(a) and 20(b), during the coordinate detection period in the present embodiment, the relation whether the scan voltage level is higher or lower than that of the reference voltage level in the common electrode scan signal y and the segment electrode scan signal x is not inverted. As a result of this, as shown in FIG. 21, the polarity of the induced voltage signal Vp from the electronic pen 11 also will not be inverted between coordinate detection period 1 and coordinate detection period 2.

As shown above, the display-integrated type tablet device of the present embodiment can be adapted so that the polarity of the induced voltage signal Vp from the electronic pen 11 will not be inverted, by providing the power control circuit 33 to the display-integrated type tablet device as shown in FIG. 1. Thus, the above-mentioned problems involved in polarity inversion of the induced voltage signal Vp can all be solved.

Although in the above embodiment the power control circuit 33 is provided separately from the common drive circuit 2 and the segment drive circuit 3, it may be mounted on the same chip as they are.

Furthermore, the power control circuit 33 may be given as part of the power supply circuit 5. In such a case, the network which couples the common drive circuit 2 and the segment drive circuit 3 with the power supply circuit 5 can be given by the display-integrated type tablet device as shown in FIG. 1 just as it is.

In addition, the construction of the analog switch system in the present embodiment is not limited to that of FIG. 19.

Embodiment 10

This embodiment is still another one in which the bias power supplies from the power supply circuit 5 of the display-integrated type tablet device in Embodiment 1 are utilized as they are and yet which allows the settings of Ta=Tb, Vc1=Vs1=$V_2$ (=3.4 V), and Vc2=Vs2=$V_5$ (=26.9 V) without the power control circuit 33 (see FIG. 19), which involves a complicated network, or any additional power supply circuit.

Figure 22:
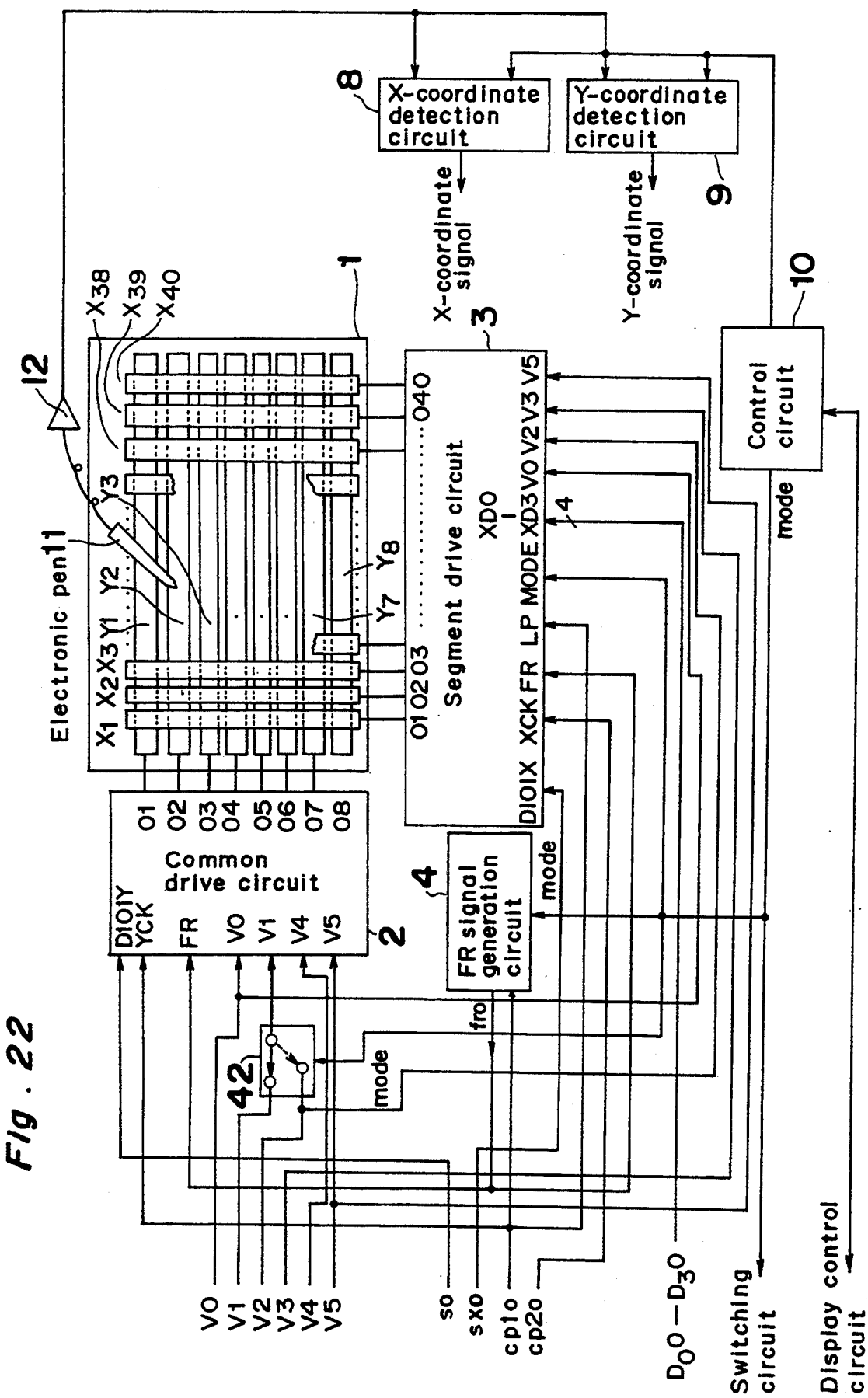
FIG. 22 is a block diagram of the display-integrated type tablet device different from that of FIG. 19 in the range of the devices according to Example 3.
Figure 23:
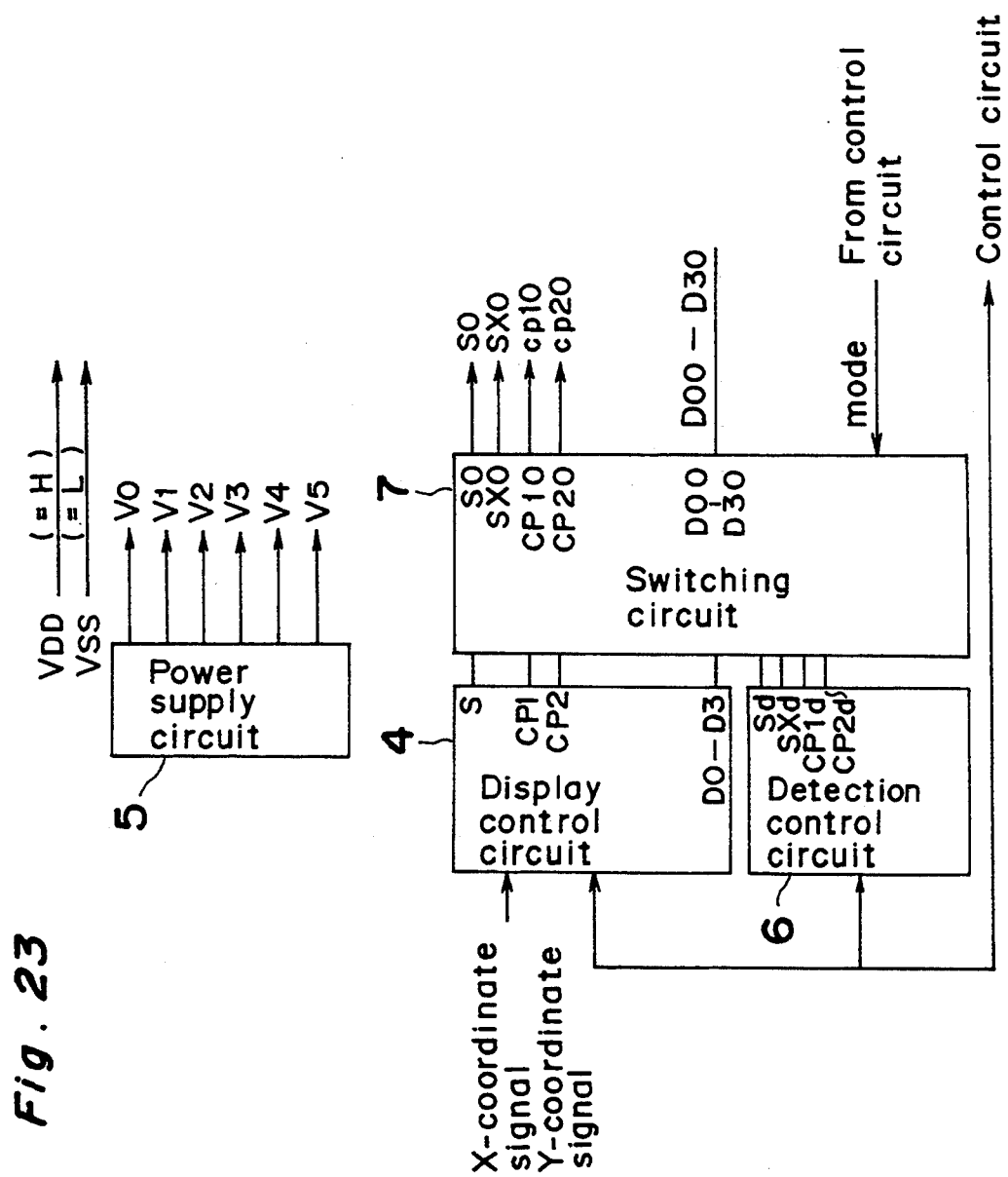
FIG. 23 is a block diagram of the display-integrated type tablet device that accompanies FIG. 22.

FIGS. 22 and 23 are block diagrams of the display-integrated type tablet device of the present embodiment, where the display control circuit 4, power supply circuit 5, detection control circuit 6, and switching circuit 7 are presented in FIG. 23 separately. This display-integrated type tablet device differs in construction from that shown in FIG. 1 in terms of the following two points.

First, the a.c. conversion signal fro for inverting the direction in which a voltage is applied to the liquid crystal of the liquid crystal panel 1 is generated by an FR signal generation circuit 41.

Second, there is provided a switch 42 which switchedly selects a bias power supply to be fed to the common drive circuit 2.

The case is the same with the other in the rest of the construction, and therefore like numerals are used here also with detailed explanation thereof being omitted.

The FR signal generation circuit 41 is controlled for switching with a mode switching signal mode derived from the control circuit 10. During the display period, a first mode, there is generated an a.c. conversion signal fro which is adapted to be inverted between "H" level and "L" level through frequency division with a clock signal cp1o derived from the switching circuit 7. During the coordinate detection period, a second mode, the level of the a.c. conversion signal fro is fixed at an "H" level, for example.

In this way, by inhibiting the a.c. conversion signal fro from being inverted in level during the coordinate detection period, polarity of the voltage induced to the tip of the electronic pen 11 is prevented from being inverted. In addition, the level of the a.c. conversion signal fro during the coordinate detection period may be fixed at an "L" level, also.

The switch 42 is controlled for switching with a mode switching signal mode derived from the control circuit 10. During the display period, the first mode, the bias power supply $V_1$ from the power supply circuit 5 is applied to the input terminal $V_1$ of the common drive circuit 2, as in the display-integrated type tablet device in the FIG. 1. During the coordinate detection period, the second mode, on the other hand, the bias power supply $V_2$ instead of the above bias power supply $V_1$ is applied to the input terminal $V_1$ of the common drive circuit 2.

In this way, the reference voltage of the common electrode scan signal y for the coordinate detection period is changed to the same voltage "$V_2$" as the reference voltage of the segment electrode scan signal x.

As described above, although the rest of construction is the same with the display-integrated type tablet device as shown in FIG. 1, there exists a little difference in operation of the common drive circuit 2, segment drive circuit 3, detection control circuit 6, and switching circuit 7 during the coordinate detection period from that in the case of FIG. 1, owing to the adaptation that the a.c. conversion signal fro is generated by the FR signal generation circuit 41.

More specifically, the detection control circuit 6 is unburdened of the need for generating the a.c. conversion signal fro in this case, and accordingly does not generate the a.c. conversion signal frd, either. Neither does it generate the data signals $D_0d$ to $D_3d$. Alternatively, it generates shift data sxd for adapting the segment drive circuit 3 to operate in the same serial manner coordinate detection period as the common drive circuit 2.

Receiving the data, the switching circuit 7 generates shift data sxo instead of the a.c. conversion signal fro.

The segment drive circuit 3 is provided with a shift data input terminal DIO1X and a mode switching signal input terminal MODE. The shift data input terminal DIO1X is to receive the shift data sxo from the switching circuit 7 while the mode switching signal input terminal MODE is to receive the mode switching signal mode from the control circuit 10.

The display-integrated type tablet device constructed as described above will operate in the following manner to carry out the coordinate detection.

First, according to the mode switching signal mode from the control circuit 10, the FR signal generation circuit 41, the switch 42, and the segment drive circuit 3 are switched to the second mode. Then the FR signal generation circuit 41 renders the a.c. conversion signal fro fixed at an "H" level. Further the switch 42 selects the side of the bias power supply "$V_2$" derived from the power supply circuit 5.

Thereafter, the common drive circuit 2 operates in the manner as described in FIG. 15 to select among the common electrodes Y one by one, applying a common electrode scan signal y thereto. In this operation, as described above, the bias power supply applied to the transfer gate $G_{32}$ is "$V_2$" while the level of the a.c. conversion signal fro is "H." As a result, the scan voltage of the common electrode scan signal y applied to the common electrodes Y is "$V_5$," and the reference voltage is "$V_2$."

The segment drive circuit 3, on the other hand, having been switched to the second mode, is switched to serial output operation according to the shift data sxo similar to that of the common drive circuit 2.

More specifically, when the clock signal cp1o derived from the output terminal CP1O of the switching circuit 7 is applied to the input terminal LP, a pulse of the shift data sxo derived from the output terminal SXO of the switching circuit 7 is fetched into a shift register (not shown) through the input terminal DIO1X in synchronization with the received clock signal cp1o. Then through output terminals 01 to 040 corresponding to the positions of the pulses of the shift data sxo having been shifted by the shift register in synchronization with the clock signal cp1o, scan pulses of the corresponding segment electrode scan signals $x_1$ to $x_{40}$ are generated in series.

In the above step, the voltage (scan voltage) of the scan pulses of the segment electrode scan signals x is generated according to the bias power supply $V_5$ while the reference voltage is generated according to the bias power supply $V_2$.

The voltage applied to the switch 42 is no more than the bias power supply $V_2$ (=3.4 V) and its current is also so small that any device of quite a withstanding voltage will do for that; for example, the arrangement may be like the transfer gates $G_{41}$, $G_{42}$ in FIG. 19. Alternatively, the switch 42 may be mounted on the same chip as the common drive circuit 2 or the power supply circuit 5 is.

There are various modifications of the Embodiment 10, some typical ones of which are described below.

Embodiment 10-1

Figure 24B:
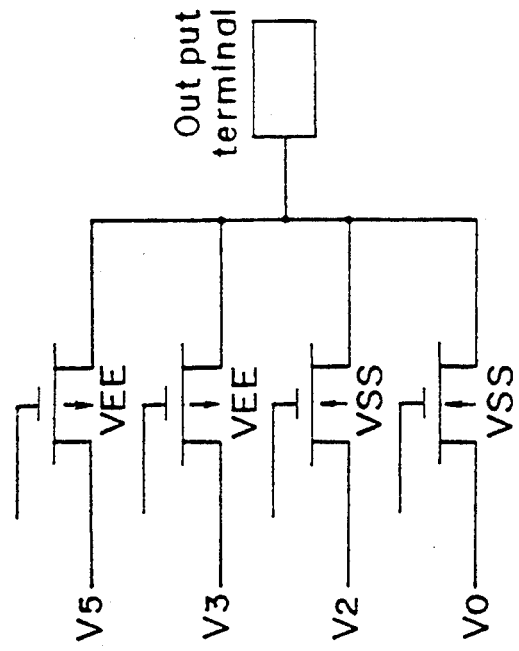
FIG. 24 is a construction view of the analog switch system of the common drive circuit and the segment drive circuit in an embodiment other than that in FIGS. 22 and 23.
Figure 24A:
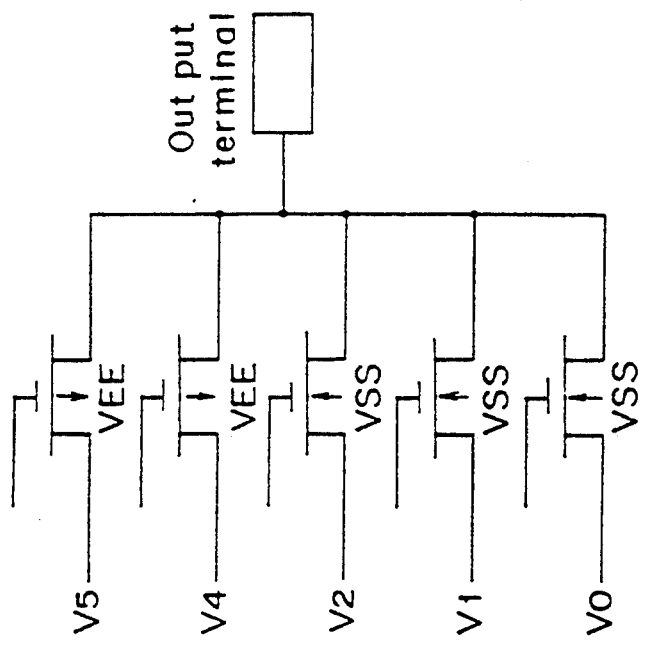

In this embodiment, output drivers for the common drive circuit 2 and the segment drive circuit 3 are provided by such an analog switch system comprised of transistors as shown in FIG. 24 not by an analog switch system comprised of transfer gates as shown in FIG. 15.

In this arrangement, the output driver on the common drive circuit 2 side is adapted to be able to generate five kinds of voltages including the bias power supply $V_2$.

Embodiment 10-2

Figure 25:
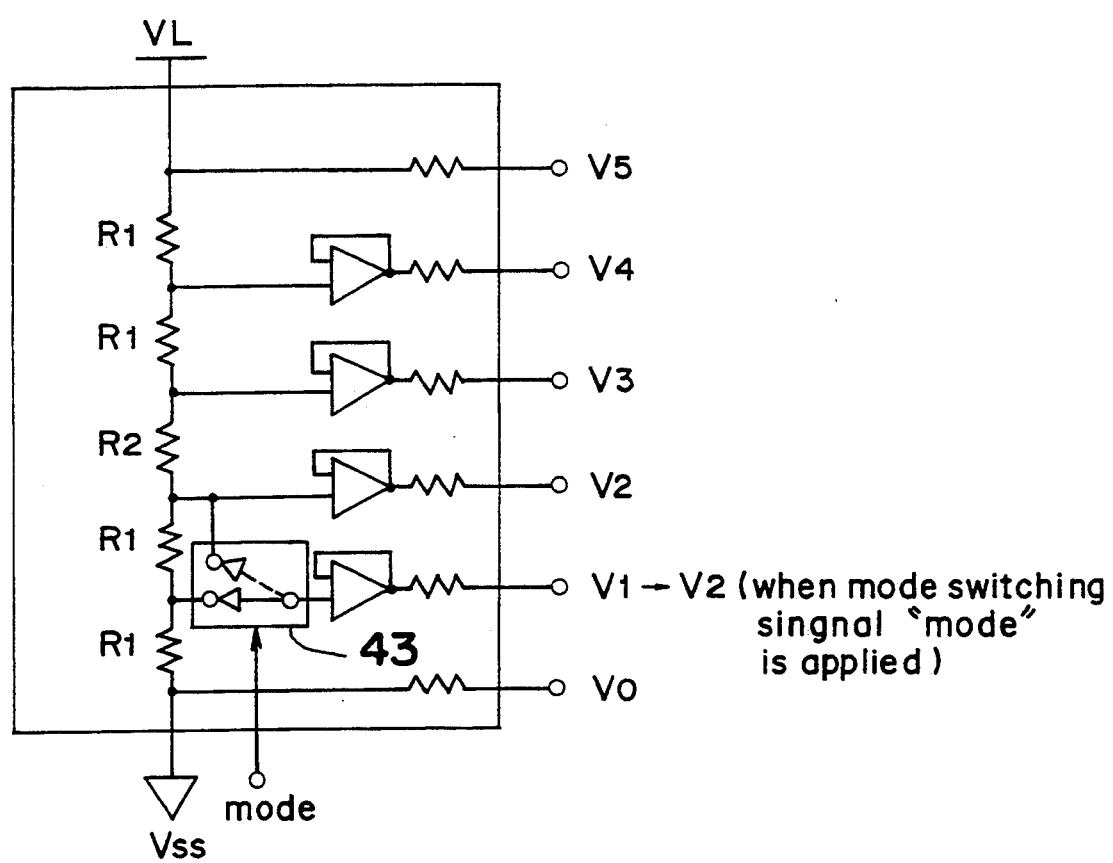
FIG. 25 is a construction view of a power supply circuit in an embodiment other than those in FIGS. 22, 23, and 24.

In this embodiment, the power supply circuit 5 for supplying bias power supplies to the common drive circuit 2 and the segment drive circuit 3 is constructed as shown in FIG. 25.

That is, a switch 43 (equivalent to the above-mentioned switch 42) is provided to the output system of the bias power supply $V_1$. By switching over the switch 43 with the mode signal mode derived from the control circuit 10, the bias power supply V₂ is generated at the bias power supply V₁ in the second mode (for coordinate detection).

In this case, the segment drive circuit 3 generates a segment electrode scan signal x using the bias power supplies V₀, V₂, V₃, and V₅, and therefore even if the voltage from the output terminal of the bias power supply V₁ is changed, the segment drive circuit 3 will not be thereby affected at all in its operation.

Embodiment 11

In the above Embodiments 9 and 10, there are held settings Ta=Tb, Vc1=Vs1=V₂ (=3.4 V), and Vc2=Vs2=V₅(=26.9 V) so as to set the interelectrode average voltage Vdc to "0." However, depending on various other conditions, there may arise a need of generating the common electrode scan signal y and the segment electrode scan signal x in different combinations of bias power supplies from the ones in the foregoing embodiments.

For example, when the electronic pen 11 is placed on the liquid crystal panel 1, the peak value of the voltage induced to the tip electrode of the electronic pen 11 during the scanning of the electrodes on the side of contact, or on the upper side (in each case of the foregoing embodiments, segment electrodes X) results in a value considerably higher than that of the voltage induced thereto during the scanning of the electrodes on the opposite side (in each case of the foregoing embodiments). Accordingly, there arises a need of providing an amplifier and a comparator independently for scanning the common electrodes and for scanning the segment electrodes.

To avoid such a problem, in Embodiment 5, the peak value Vd of scan pulses applied to the electrodes disposed on the lower side (common electrodes Y in the case of Embodiment 5) is set to a high one.

However, in such a case, the symmetry with respect to the reference voltage "0 V" of the waveform of the interelectrode voltage as shown in FIG. 20(c) is broken, with the result that the interelectrode average voltage Vdc is deviated from "0 V."

In view of the above fact, the present embodiment, in brief, is adapted so that the values of the non-scan voltages Vc1 and Vs1 are properly selected out of the bias power supplies V₀ to V₅, meeting the conditions that Vc1≠Vs1 and that the interelectrode average voltage Vdc is "0."

To achieve the above arrangement, when no voltage of the bias power supplies V₀ to V₅ meets the conditions, an appropriate voltage is additionally provided other than the power supply circuit 5. Then the non-scan voltage Vc1 and Vs1 are applied to the transfer gates G₄₂ and G₄₈ while the scan voltages Vc2 and Vs2 are applied to the transfer gates G₄₄ and V₄₆.

Thus, the peak value of the voltage induced to the tip electrode of the electronic pen 11 can be made identical between the period of scanning the common electrodes and that of scanning the segment electrodes, and moreover the interelectrode average voltage Vdc can be set to "0."

Embodiment 12

In this embodiment, in order that the interelectrode average voltage Vdc is set to "0" while the peak value Vd of scan pulses applied to the lower-side electrodes is set higher, the pulse width Ta of the scan pulses of the common electrode scan signal y and the pulse width Tb of the scan pulses of the segment electrode scan signal x are changed.

In the foregoing equation (2), if Vc1=Vs1 and Vdc=0, then following equation (5) results:

$$Ta = Tb(Vs2-Vc1)/(Vc2-Vs1) \tag{5}$$

In this case, if Vc1=Vs1=0 V, then equation (5) will be $$Ta = Tb \cdot Vs2/Vc2 \tag{6}$$

Figure 26:
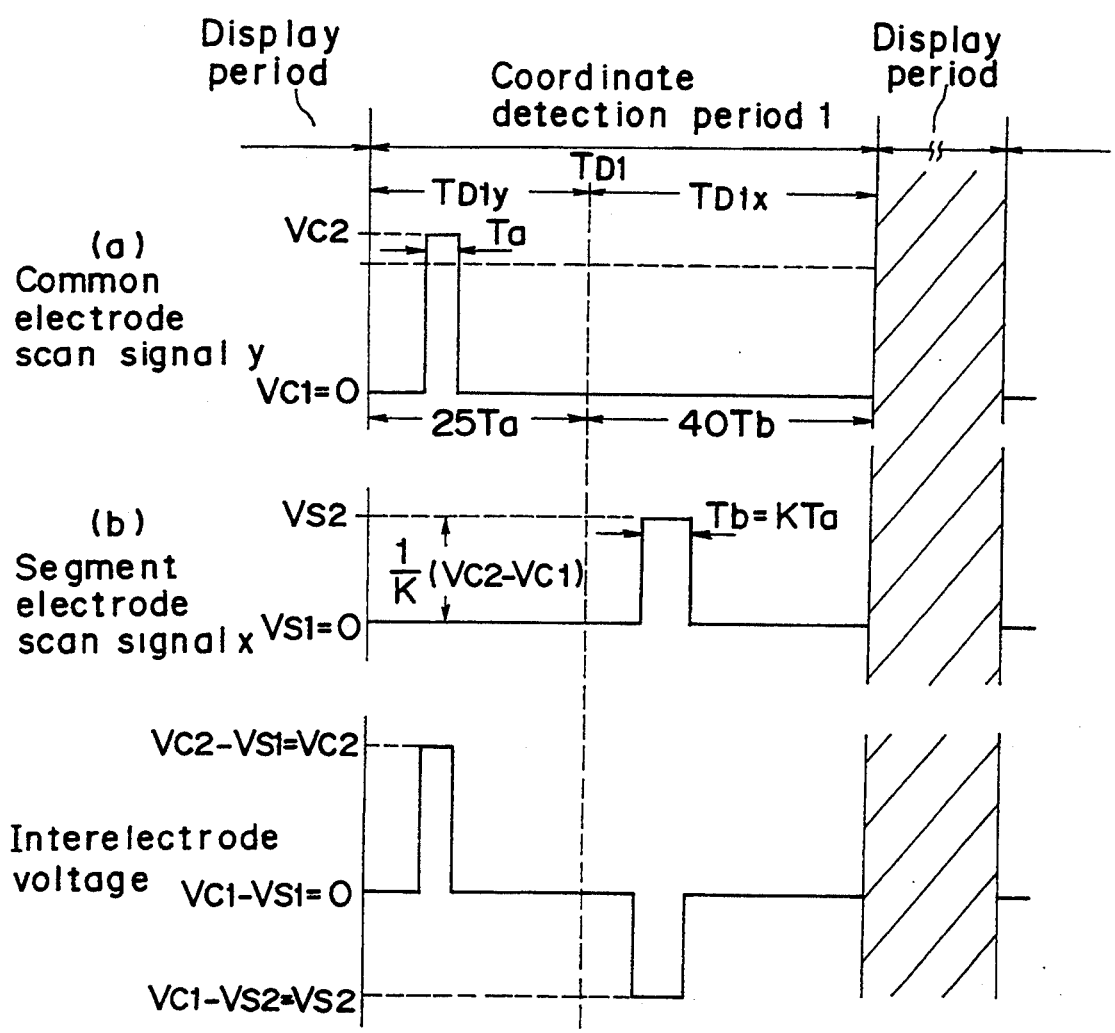
FIG. 26 is an explanatory view of such a common electrode scan signal, segment electrode scan signal, and interelectrode voltage in the case where the peak value and pulse width of scan pulses are modified to thereby set the interelectrode average voltage Vdc to "0"

Accordingly, as shown in FIG. 26, assuming that the peak value "Vs2" of scan pulses of the segment electrode scan signal x for the segment electrodes X disposed on the upper side is 1/K of the peak value "Vc2" of scan pulses of the common electrode scan signal y for the common electrodes Y disposed on the lower side, then it is possible to set the interelectrode average voltage Vdc to "0" by setting the pulse width "Tb" of scan pulses of the segment electrode scan signal x to K times the pulse width "Ta" of scan pulses of the common electrode scan signal y.

In addition, although in the above embodiment it is set that Vc1=Vs1=0 V, yet the same effect can be obtained merely if the condition Vc1=Vs1 is satisfied.

Embodiment 13

In this embodiment, in order that the interelectrode average voltage Vdc is set to "0" while the peak value Vd of scan pulses applied to the lower-side electrodes is set higher, a pulse having a peak value (Vc3−Vc1) and a pulse width Tf is inserted into a portion at the end of the coordinate detection period, which does not contribute to coordinate detection, of either one of the common electrode scan signal y or the segment electrode scan signal x.

Thus, the interelectrode average voltage Vdc is modified to "0" by inserting the aforenoted pulse into the common electrode scan signal y when the interelectrode average voltage Vdc is not "0" but a negative value, and that by inserting the same into the segment electrode scan signal x when the interelectrode average voltage Vdc is not "0" but a positive value.

Figure 27:
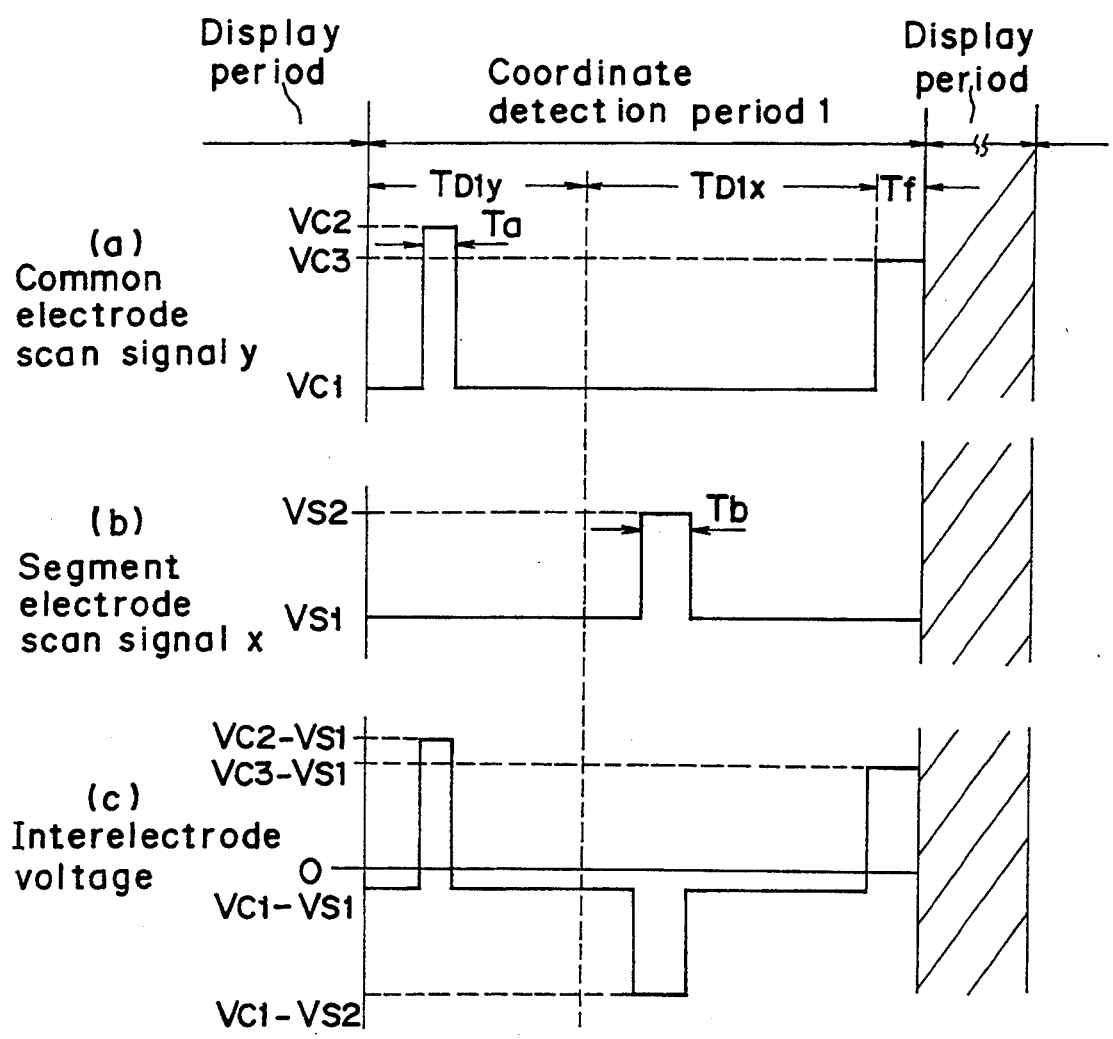
FIG. 27 is an explanatory view of such a common electrode scan signal, segment electrode scan signal, and interelectrode voltage in the case where a pulse is inserted into an interval that does not contribute to coordinate detection concerning the scan signal and the interelectrode average voltage Vdc is set to "0"

FIG. 27 illustrates an example in which the pulse is inserted into the common electrode scan signal y.

Although in FIG. 27 the pulse is inserted into an end portion of the coordinate detection period, any other portion in the coordinate detection period that does not contribute to coordinate detection will do; it may be inserted into a leading portion of the coordinate detection period or into the boundary between a y-coordinate detection period $T_{D1y}$ and an x-coordinate detection period $T_{D1x}$.

In the above process, since the pulse is inserted into a portion that does not contribute to coordinate detection, the interelectrode average voltage Vdc can be set correctly to "0" by freely setting the pulse width Tf and the peak value (Vc3−Vc1).

Embodiment 14

In this embodiment, Example 3 is adopted to the case where high-frequency video signals Vfy and Vfx are inserted into the scan period of the electrode scan signals in the foregoing Embodiment 3 or Embodiment 8.

Figure 28:
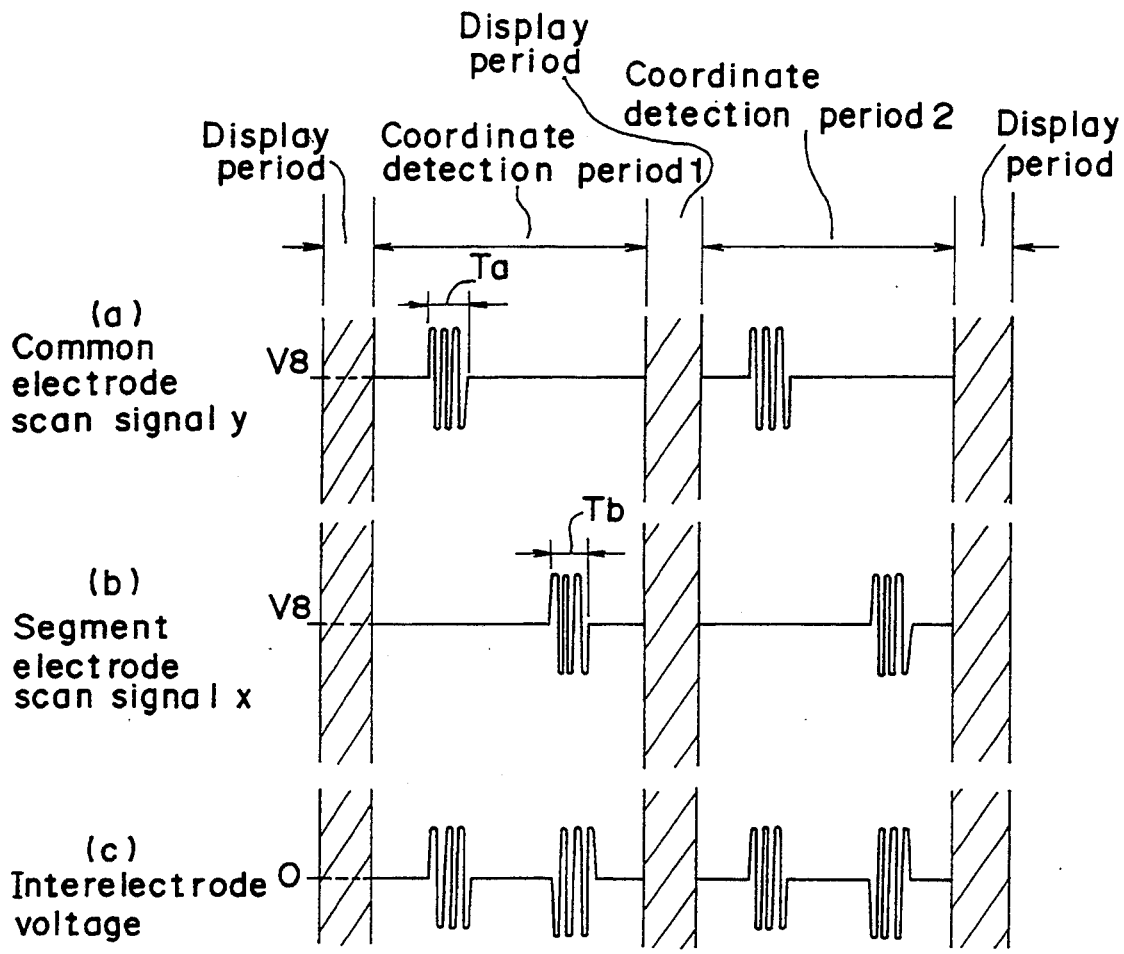
FIG. 28 is an explanatory view of such a common electrode scan signal, segment electrode scan signal, and interelectrode voltage in the case where a high-frequency voltage signal is inserted into the display period and the interelectrode average voltage Vdc is set to "0"

FIG. 28 shows an example in which sine-wave signals are used as the high-frequency voltage signal Vfy and Vfx. As shown in FIG. 28(a) and FIG. 28(b), the period of the sine wave to be inserted into the scan period is shorter than the scan period "Ta" of the common electrode scan signal y and the scan period "Tb" of the segment electrode scan signal x. Also, the reference voltage of the common electrode scan signal y and that of the segment electrode scan signal x are both set to the same voltage "$V_8$."

As a result, as shown in FIG. 28(c), the value of the d.c. component of the interelectrode average voltage becomes "0," and thus the interelectrode average voltage Vdc can be set to approximately "0."

The actual construction of the present embodiment is one in which the power control circuit 33 (see FIG. 19) and the high-frequency power supply circuit 21 (see FIG. 12) mentioned before are added to the construction of the display-integrated type tablet device as shown in FIG. 1. With this arrangement, the sine-wave signal Vfy derived from the high-frequency power supply circuit 21 is fed to the transfer gate $G_{44}$ of the power control circuit 33 while the sine-wave signal Vfx is fed to the transfer gate $G_{46}$. Moreover, the transfer gates $G_{42}$, $G_{48}$ are to receive a d.c. voltage signal of the same voltage "$V_8$."

In this way, through the transfer gates $G_{41}$ to $G_{48}$ which are controlled for opening and closing with the mode control signal D, the sine-wave signal Vfy, Vfx and the d.c. voltage signal are applied to the common electrodes Y or segment electrodes X during the coordinate detection period.

In addition, although d.c. voltage is preferable for the reference voltage, yet it is not limited thereto. In any case, it is required only that the reference voltage of the common electrode scan signal x and that of the segment electrode scan signal y are approximately equal with each other.

Although in the above embodiment the a sine-wave signal is used as the high-frequency voltage signals Vfy and Vfx to be inserted into the display period of the electrode scan signals x and y, yet a rectangular wave signal may be substituted therefor. In such a case, there is no need of providing a special high-frequency power supply, which is required for use of the sine-wave signal, but all that is required is to add a gate circuit to the analog switch system.

Figure 29:
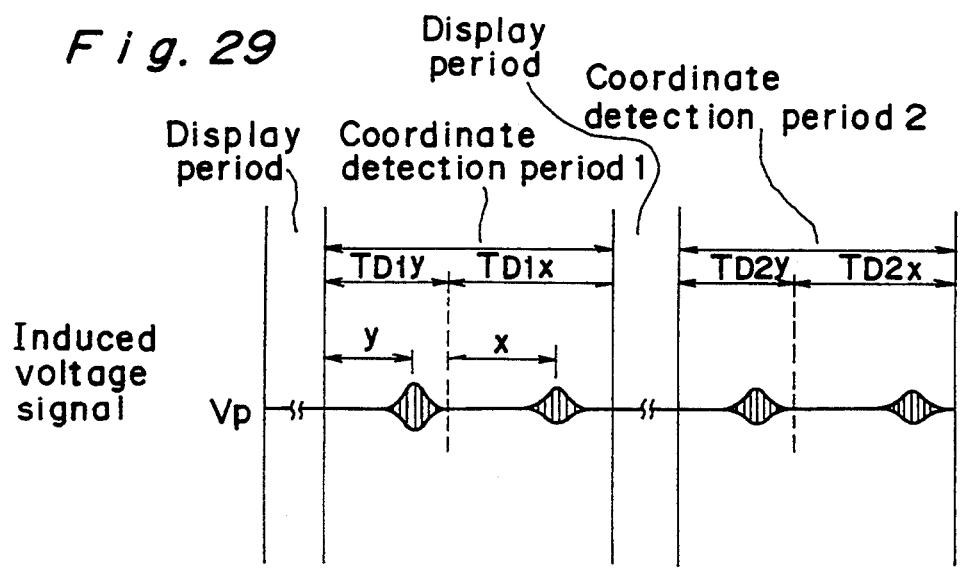
FIG. 29 is an explanatory view of an induced voltage developed from the electronic pen on the basis of the common electrode scan signal and the segment electrode scan signal as shown in FIG. 28.

As described above, in the present embodiment, the high-frequency voltage signals Vfy and Vfx are inserted into the scan period of the electrode scan signals x and y, accompanied by no inversion of the direction in which the d.c. voltage is applied to the liquid crystal. Accordingly, it is possible to obtain an induced voltage signal Vp that involves no polarity inversion such as shown in FIG. 29 by passing the voltage induced to the tip electrode of the electronic pen 11 through a filter that allows only the components having frequencies "fy" or "fx" to pass therethrough. FIG. 29 shows, however, an induced voltage signal Vp resulting when a rectangular wave signal is used as the high-frequency voltage signals Vfy and Vfx.

The resulting induced voltage signal Vp is then rectified to convert it into such a signal as shown in FIG. 21, whereby the coordinates of the tip of the electronic pen 11 are determined.

As is the case with the present embodiment, when the high-frequency voltage signals Vfy and Vfx are inserted into the scan period of the electrode scan signals, the impedance between the common electrodes Y or the segment electrodes X and the electronic pen 11 is of low level, with the result of a high-level induced voltage, as described in Embodiment 3. Also, since it is possible to detect only the frequency components of the high-frequency voltage signal inserted into the scan period of the electrode scan signals, some further effects can be obtained, for example, that noise components due to friction of the electronic pen 11 or that derived from external can be removed.

The accompanying drawings just referred to for the above description of Example 3 are modified so that the display period is immediately succeeded by the coordinate detection period for an easy understanding. However, in actual cases, there is inserted a preparation period between the display period and the coordinate detection period in accordance with the control timing of the control circuit 10. If the length of this preparation period is short, the period would be negligible, whereas, if long, the voltage of the preparation period must be taken into consideration to determine the interelectrode average voltage Vdc.

As apparent from the above description, according to the first display-integrated type tablet device of the present invention, during the display period for which the side of the display control circuit is selected by the switching circuit in compliance with control of the control circuit, the common drive circuit generates a common electrode drive signal while the segment drive circuit generates a segment electrode drive signal, according to a display control signal and display data from the display control circuit. Then pixels relevant to the common electrodes selected with the generated common electrode drive signal are displayed in accordance with the display data.

Meanwhile, during the coordinate detection period for which the side of the detection control circuit is selected by the switching circuit, the segment drive circuit generates a segment electrode scan signal according to a detection control signal transferred from the detection control circuit, to scan the segment electrodes. Then on the basis of an induced voltage caused to the electrode of the electronic pen by the segment electrode scan signal, the x-coordinate of the tip of the electronic pen is detected by the coordinate detection circuit. The common drive circuit, on the other hand, generates a common electrode scan signal to scan the common electrodes. Then on the basis of the induced voltage caused to the electrode of the electronic pen by the common electrode scan signal, the y-coordinate of the tip of the electronic pen is detected by the coordinate detection circuit.

In brief, the liquid crystal panel functions both as a display section during the display period and as a tablet during the coordinate detection period. This means that the display function is integrated into the tablet.

In consequence, according to the present invention, it is unnecessary to stack the tablet on the display section, the display screen is easy to view in inputting positions on the display screen with a pen, and moreover the device can be easily made more compact and less costly.

Furthermore, since the common electrodes and the segment electrodes in the display-integrated type tablet device of the present invention are free from effects of any external magnetic field, it is allowed to install a PCB on the rear side of liquid crystal panel in the form of layers. Therefore, according to the present invention, it becomes feasible to offer extremely-thin, small-sized computers by mounting processing circuits including arithmetic, recognition, and judgment on the PCB closely adjoining to the liquid crystal panel.

Yet further, it becomes feasible to offer notebook-type computers having a flexible, sheet-like tablet, by incorporating polymer-dispersed type liquid crystal as the liquid crystal of the liquid crystal panel.

According to the second display-integrated type tablet device of the present invention, during the coordinate detection period, the common drive circuit or the segment drive circuit generates such a common electrode drive signal or a segment electrode drive signal that the voltage applied to the liquid crystal of each pixel becomes lower than the threshold value of the liquid crystal display voltage, thus prohibiting any image from being displayed onto the pixel matrix of the liquid crystal panel during the coordinate detection period.

Thus, according to the present invention, there can be produced images satisfactory in contrast.

According to the third display-integrated type tablet device of the present invention, during the coordinate detection period, at least one drive circuit of the common drive circuit and the segment drive circuit generates such a scan signal that scan pulses are simultaneously fed to a specified number of electrodes in the liquid crystal panel. Then on the basis of the induced voltage developed to the electronic pen as a result of simultaneously scanning the specified number of electrodes, the coordinates of the tip of the electronic pen are detected by the coordinate detection circuit.

Thus, even when the coordinates of the tip of the electronic pen are detected using a high-density liquid crystal panel in which a low induced voltage is developed to the electrode of the electronic pen, the coordinates of the tip of the electronic pen can be correctly detected on the basis of a high induced voltage due to the specified number of electrodes.

According to the fourth display-integrated type tablet device of the present invention, during the coordinate detection period, either one drive circuit of the common drive circuit or the segment drive circuit, whichever feeds a scan signal to one group of electrodes farther from the electronic pen, generates a scan signal having a peak value higher than that of a scan signal generated by the other drive circuit. As a result, the peak value of the induced voltage caused to the electrode of the electronic pen by the scan signal fed to the group of electrodes farther from the electronic pen is heightened.

Therefore, during the coordinate detection period, the induced voltage can be prevented from lowering in scanning the group of electrodes farther from the electronic pen, whereby the x- and y-coordinates of the tip of the electronic pen can be detected with stable reliability.

According to the fifth display-integrated type tablet device of the present invention, during the coordinate detection period, either one drive circuit of the common drive circuit or the segment drive circuit as in the foregoing third device, whichever feeds a scan signal to one group of electrodes farther from the electronic pen, generates such a scan signal that scan pulses are simultaneously fed to a specified number of electrodes more than the number of electrodes to which scan pulses are simultaneously fed by the other drive circuit. As a result, the peak value of the induced voltage caused to the electrode of the electronic pen by the scan signal fed to the group of electrodes farther from the electronic pen is heighten.

Therefore, during the coordinate detection period, the induced voltage can be prevented from lowering in scanning the group of electrodes farther from the electronic pen, whereby the x- and y-coordinates of the tip of the electronic pen can be detected with stable reliability.

According to the sixth display-integrated type tablet device of the present invention, there is provided an amplifier in the coordinate detection circuit, wherein for scanning the group of electrodes farther from the electronic pen, the coordinates of the tip of the electronic pen are detected on the basis of the induced voltage amplified by the coordinate detection circuit with a first amplification factor while for scanning the other group of electrodes, the coordinates of the tip of the electronic pen are detected by the coordinate detection circuit with a second amplification factor smaller than the first one. As a result, the induced voltage caused to the electrode of the electronic pen by the scan signal fed to the group of electrodes farther from the electronic pen is amplified to a even larger extent.

Therefore, during the coordinate detection period, the accuracy of coordinate detection in scanning the group of electrodes farther from the electronic pen can be prevented from lowering, whereby the x- and y-coordinates of the tip of the electronic pen can be detected with the same accuracy for each coordinate.

According to the seventh display-integrated type tablet device of the present invention, the display a.c. conversion signal generating section generates an a.c. conversion signal during the display period while the detection a.c. conversion signal generating section generates a detection a.c. conversion signal during the coordinate detection period. Then on the basis of the generated display a.c. conversion signal and detection a.c. conversion signal, the common drive circuit generates such a common electrode drive signal and a common electrode scan signal that the direction in which a voltage is applied to the liquid crystal of each pixel is inverted. Likewise, the segment drive circuit generates such a segment electrode drive signal and a segment electrode scan signal that the direction in which a voltage is applied to the liquid crystal of each pixel is inverted.

Therefore, according to the present invention, in addition to the effects of the first device of the invention, the direction in which a voltage is applied to the liquid crystal is inverted also during the coordinate detection period independently of during the display period with the generated segment electrode scan signal and the common electrode scan signal, whereby the liquid crystal can be prevented from reduction in service life due to electrolysis.

According to the eighth display-integrated type tablet device of the present invention, during the display period, the common drive circuit and the segment drive circuit generate such a common electrode drive signal and a common electrode scan signal that the direction in which a voltage is applied to the liquid crystal of each pixel is inverted, on the basis of a display a.c. conversion signal generated by the display a.c. conversion signal generating section.

Meanwhile, during the coordinate detection period, the common drive circuit and the segment drive circuit generate such a common electrode scan signal and a segment electrode drive signal that the average value of the voltage applied to the liquid crystal of each pixel is made "0," without inverting the relation whether the scan voltage level is higher or lower than the relevant reference voltage level.

Therefore, according to the present invention, there is no need of inverting the relation whether the scan voltage level is higher or lower than the reference voltage level of the scan signal in either of the two scan signals, where the polarity of the induced voltage developed to the electrode of the electronic pen is not inverted. As a result, the coordinates of the tip of the electronic pen can be detected on the basis of the induced voltage quite easily.

According to the ninth display-integrated type tablet device of the present invention, during the coordinate detection period, the common drive circuit and the segment drive circuit generate the common electrode drive signal and the segment electrode drive signal, respectively, such that their reference voltages are equal, whereby the average value of voltage applied to the liquid crystal of each pixel is made zero.

Therefore, according to the present invention, in addition to the effects of the eighth device of the invention, the average value of voltage applied to the liquid crystal of each pixel can be easily made zero.

According to the tenth display-integrated type tablet device of the present invention, during the coordinate detection period, the common drive circuit and the segment drive circuit generate the common electrode drive signal and the segment electrode drive signal, respectively, such that their reference voltages and peak values of scan pulses are both equal, whereby the average value of voltage applied to the liquid crystal of each pixel is made zero.

Therefore, according to the present invention, in addition to the effects of the eighth device of the invention, the average value of voltage applied to the liquid crystal of each pixel can be made zero easily and accurately.

According to the eleventh display-integrated type tablet device of the present invention, during the coordinate detection period, at least one drive circuit of the common drive circuit and the segment drive circuit generates such a scan signal that the average value of voltage applied to the liquid crystal of each pixel is made zero without inverting the relation whether the scan voltage level is higher or lower than the reference voltage level of the scan signal, by inserting a signal having a specified waveform into an interval, provided in the scan signal, that does not contribute to coordinate detection.

Therefore, according to the present invention, any deviation from zero of the average value of voltage applied to the liquid crystal of each pixel can be corrected easily and correctly.

According to the twelfth display-integrated type tablet device of the present invention, during the coordinate detection period, either one drive circuit of the common drive circuit or the segment drive circuit generates such a scan signal that the average value of voltage applied to the liquid crystal of each pixel is made zero without inverting the relation whether the scan voltage level is higher or lower than the reference voltage level of the scan signal, by setting either one value of the pulse width or peak value of scan pulses inserted into the scan signal to a value different from the counterpart of the scan signal generated by the other drive circuit.

Therefore, according to the present invention, any deviation from zero of the average value of voltage applied to the liquid crystal of each pixel can be corrected easily and correctly.

According to the thirteenth display-integrated type tablet device of the present invention, during the coordinate detection period, one of the common drive circuit and the segment drive circuit, whichever feeds a scan signal to one group of electrodes farther from the electronic pen, generates such a scan signal having scan pulses with a peak value higher than that of scan pulses in a scan signal generated by the other drive circuit while the other drive circuit generates the scan signal having scan pulses with a pulse width greater than that of the scan signal generated by the one drive circuit.

Therefore, according to the present invention, any deviation from zero of the average value of voltage applied to the liquid crystal of each pixel due to the heightened peak value of scan pulses of the scan signal fed to the group of electrodes farther from the electronic pen can be corrected easily and correctly by enlarging the pulse width of scan pulses of the scan signal fed to the group of electrodes closer to the electronic pen.

According to the fourteenth display-integrated type tablet device of the present invention, during the coordinate detection period, at least one drive circuit of the common drive circuit and the segment drive circuit generates a signal in which a high-frequency wave has been inserted into the display period of the scan signal. Then the coordinate detection circuit, separates a high-frequency component from the induced voltage caused to the electrode of the electronic pen by the scan signal in which a high-frequency wave has been inserted into the display period, and detects the coordinates of the tip of the electronic pen according to the separated high-frequency component.

Therefore, even when external noise is superimposed on the induced voltage from the electronic pen, the external noise can positively be removed by the coordinate detection circuit, whereby the tip coordinates can be detected correctly.

According to the fifteenth display-integrated type tablet device of the present invention, during the coordinate detection period, the common drive circuit generates a common electrode scan signal in which a first high-frequency wave having a specified frequency has been inserted into the scan period while the segment drive circuit generates a segment electrode scan signal in which a second high-frequency wave having a specified frequency different from the first high-frequency wave has been inserted into the scan period.

Then the first high-frequency component is separated from the induced voltage caused to the electrode of the electronic pen by the two scan signals through a first filter in the coordinate detection circuit while the second high-frequency component is separated through a second filter. Subsequently the y-coordinate of the tip of the electronic pen is detected on the basis of the separated first high-frequency component while the x-coordinate thereof is detected on the basis of the second high-frequency component.

Therefore, according to the present invention, even if the first and second high-frequency components are superimposed on the induced voltage from the electronic pen, the first and second high-frequency waves can positively be separated through the first and second filters, whereby the detection of the y-coordinate of tip of the electronic pen by the first high-frequency wave and that of x-coordinate by the second high-frequency wave can be carried out simultaneously. This means that the display period in the high-density liquid crystal panel can be allowed to a sufficient length.

According to the sixteenth display-integrated type tablet device of the present invention, it is arranged that the frequencies of the first and second high-frequency waves in the fifteenth device of the invention are not any odd multiple of each other.

Therefore, according to the present invention, even if a high harmonic wave which is an odd multiple of the above frequency is involved in the induced voltage from the electronic pen as a result of some distortion of the first or second high-frequency wave that has been inserted into the two scan signals, the first and second high-frequency waves can positively be separated through the first and second filters.

According to the seventeenth display-integrated type tablet device of the present invention, during the display period, the common drive circuit generates a common electrode drive signal in which a high-frequency wave has been superimposed on select pulses in the drive signal. Then the coordinate detection circuit separates the high-frequency component from the induced voltage caused to the electrode of the electronic pen by the common electrode scan signal in which the high-frequency wave has been superimposed, and on the basis of the separated high-frequency component, the y-coordinate of the tip of the electronic pen is detected.

Therefore, the y-coordinate of the tip of the electronic pen can be detected during the display period, whereby the coordinate detection period can be shortened while the display period can be ensured to a sufficient length.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device, comprising:
   a liquid crystal panel having a plurality of first electrodes arrayed in parallel to one another and a plurality of second electrodes arrayed in parallel to one another in a direction other than the direction in which the first electrodes are arrayed;
   an electronic pen having at its tip an electrode coupled with the first electrodes and the second electrodes of the liquid crystal panel by floating capacity;
   a display control circuit for producing a display control signal and display data for displaying an image to the plurality of first electrodes and the plurality of second electrodes of the liquid crystal panel;
   a detection control circuit for producing a detection-scanning control signal for scanning the first electrodes and the second electrodes to detect coordinates of the tip of the electronic pen on the liquid crystal panel;
   a switching circuit for switchedly selecting a side of the display control circuit for a display period to produce the display control signal and display data from the display control circuit and for switchedly selecting a side of the detection control circuit for a coordinate detection period to produce the detection-scanning control signal from the detection control circuit, under control of a control circuit;
   a second-electrode drive circuit for generating a second-electrode drive signal during the display period to select in turn among the second electrodes according to the display control signal and for generating a second-electrode scan signal during the coordinate detection period to feed a scan voltage to the second electrodes in turn according to the detection-scanning control signal from the switching circuit;
   a first-electrode drive circuit for generating a first-electrode drive signal during the display period to display pixels relative to the second electrodes selected by the second-electrode drive signal according to the display control signal and display data and for generating a first-electrode scan signal during the coordinate detection period to feed a scan voltage to the first electrodes in turn according to the detection-scanning control signal from the switching circuit; and
   a coordinate detection circuit for receiving an input of induced voltage developed to the electrode of the electronic pen according to the second-electrode scan signal and the first-electrode scan signal fed from the second-electrode drive circuit and the first-electrode drive circuit to the second electrodes and the first electrodes, respectively, and then detecting coordinates of the tip of the electronic pen by a predetermined procedure on the basis of the induced voltage derived from the electronic pen to produce an x-coordinate signal and a y-coordinate signal, wherein
   the control circuit sets the display period and the coordinate detection period, and controls the switching circuit in such a way that after the first-electrode drive signal and the second-electrode drive signal for effecting display have been applied to the last first electrode and the last second electrode in the display period, respectively, for a specified time period, the scanning of the first electrodes and the second electrodes for coordinate detection is not immediately started, but a specified idle time is allowed until the display period is succeeded by the coordinate detection period;
   wherein the idle time is so set that when a voltage applied to the first electrodes and the second electrodes and set by a first signal for setting the state in which a voltage is applied to the first electrodes and the second electrodes during the display period is switched to a voltage applied to the first electrodes and the second electrodes and set by a second signal for setting the state in which a voltage is applied to the first electrodes and the second electrodes during the coordinate detection period, the idle time is approximately equal to a period over which an induced voltage developed to the tip electrode of the electronic pen reaches a reference level for the coordinate detection period.

2. A display-integrated type tablet device as claimed in claim 1, wherein
   one of the first-electrode drive circuit and the second-electrode drive circuit that feeds a scan signal to one of the first electrodes and the second electrodes, whichever are farther from the electronic pen and sized on the rear side of the liquid crystal panel on which the electronic pen is not present, generates during the coordinate detection period a scan signal having a peak value higher than that of a scan signal generated by the other of the first-electrode drive circuit and the second-electrode drive circuit that feeds a scan signal to the other of the first electrodes and the second electrodes, which are the closer to the electronic pen and sited on the front side of the liquid crystal panel on which the electronic pen is present.

3. A display-integrated type tablet device as claimed in claim 1, wherein
one of the first-electrode drive circuit and the second-electrode drive circuit that feeds a scan signal to one of the first electrodes and the second electrodes, whichever are farther from the electronic pen and sited on the rear side of the liquid crystal panel on which the electronic pen is not present, feeds during the coordinate detection period a scan signal simultaneously to a specified number of electrodes of the one of the first electrodes and the second electrodes, the number being greater than that of electrodes of the other of the first electrodes and the second electrodes, which are the closer to the electronic pen and sited on the front side of the liquid crystal panel on which the electronic pen is present and to which a scan signal is simultaneously fed by other of the first-electrode drive circuit and the second-electrode drive circuit.

4. A display-integrated type tablet device as claimed in claim 1, wherein
the first electrodes are segment electrodes, the second electrodes are common electrodes, the liquid crystal panel is one which is driven by a duty-type drive method, the first-electrode drive circuit is a segment drive circuit, and the second-electrode drive circuit is a common drive circuit, and further comprising:
a first-signal generating section for generating a first signal for setting during the display period a time point at which voltages applied to the segment electrodes and the common electrodes are inverted in polarity; and
a second-signal generating section for generating a second signal for maintaining the polarity of voltages applied to the common electrodes and the segment electrodes in their respective specified state during a common-electrode scan period and a segment-electrode scan period during the coordinate detection period, respectively;
wherein the common drive circuit and the segment drive circuit invert during the display period the polarity of voltages applied to the common electrodes and the segment electrodes according to the first signal, and keep during the coordinate detection period the polarity of voltages applied to the common electrodes and the segment electrodes according to the second signal constant with respect to an x-coordinate detection period and a y-coordinate detection period, respectively.

5. A display-integrated type tablet device as claimed in claim 4, wherein
the common drive circuit and the segment drive circuit generate during the coordinate detection period such a common-electrode scan signal and a segment-electrode scan signal, respectively, that the average value of voltages applied to liquid crystals of the pixels is made zero, without inverting the polarity of the voltages with respect to their reference voltage levels.

6. A display-integrated type tablet device as claimed in claim 5, wherein
during the coordinate detection period, a reference voltage value of the common-electrode scan signal and a reference voltage value of the segment-electrode scan signal are equal to each other.

7. A display-integrated type tablet device as claimed in claim 6, wherein
during the coordinate detection period, a peak value of the common-electrode scan signal and a peak value of the segment-electrode scan signal are equal to each other.

8. A display-integrated type tablet device as claimed in claim 4, wherein
at least one of the common drive circuit and the segment drive circuit generates during the coordinate detection period such a common-electrode drive signal or a segment-electrode drive signal that the average value of voltages applied to liquid crystals of the pixels is made zero by providing an interval which does not contribute to coordinate detection and inserting a signal having a specified waveform into the interval.

9. A display-integrated type tablet device as claimed in claim 4, wherein
during the coordinate detection period, a pulse width of the scan signal applied to the common electrodes is equal to a pulse width of the scan signal applied to the segment electrodes.

10. A display-integrated type tablet device as claimed in claim 5, wherein
one of the common drive circuit and the segment drive circuit that applies a scan signal to one of the common electrodes and the segment electrodes, whichever are farther from the electronic pen and sited on the rear side of the liquid crystal panel on which the electronic pen is not present, generates during the coordinate detection period a scan signal having a peak value higher than that of a scan signal generated by the other drive circuit for the electrodes on the front side of the liquid crystal panel on which the electronic pen is present; and
the other drive circuit generates during the coordinate detection period a scan signal having a pulse width greater than that of a scan signal generated by the one drive circuit.

11. A display-integrated type tablet device as claimed in claim 4, wherein
the first signal for setting the state in which voltages are applied to the first electrodes and the second electrodes during the display period has a duty ratio of 1 and is alternately inverted at specified intervals, and the first signal for a display period succeeding the coordinate detection period is unrelated to the second signal during the coordinate detection period, a pulse width of the last pulse portion of the first signal for a display period preceding the coordinate detection period being complementary to a pulse width of the first pulse portion of the first signal for the display period succeeding the coordinate detection period, and the last pulse portion has the same polarity as that of the first pulse portion.

12. A display-integrated type tablet device as claimed in claim 11, wherein
the first signal for setting the state in which voltages are applied to the first electrodes and the second electrodes during the display period is generated during the display period every time a transfer clock for the second-electrode drive circuit for selecting in turn the second electrodes is counted by a specified number.

13. A display-integrated type tablet device as claimed in claim 1, wherein in displaying onto the liquid crystal panel an x-coordinate and a y-coordinate detected by the electronic pen, an x-coordinate signal and a y-coordinate signal produced by the coordinate detection circuit are transferred during a display period succeeding the coordinate detection period during which those coordinates have been detected, and the x-coordinate and the y-coordinate represented by the x-coordinate signal and the y-coordinate signal, respectively, are displayed during a display period succeeding the display period.

14. A display-integrated type tablet device as claimed in claim 1, wherein the coordinate detection period is inserted halfway during a scan period for display of one frame without completing scanning for display of one frame.

15. A display-integrated type tablet device as claimed in claim 1, wherein the number of coordinates of positions of the tip of the electronic pen detected every second is not lower than the number of frames displayed every second.

16. A display-integrated type tablet device as claimed in claim 1, wherein a further idle time is provided during a time interval from when completing the scanning for a coordinate detection period for one of the first electrodes and the second electrodes to when starting the scanning for a coordinate detection period for the other of the first electrodes and the second electrodes, the idle time being set longer than a time that continues after a signal voltage detected by the electronic pen by scanning of the first electrodes and the second electrodes shows a peak value-until the signal voltage reaches an average induced voltage level for the coordinate detection period.

17. A display-integrated type tablet device, comprising:

a liquid crystal panel having a plurality of first electrodes arrayed in parallel to one another and a plurality of second electrodes arrayed in parallel to one another in a direction other than the direction in which the first electrodes are arrayed;

an electronic pen having at its tip an electrode coupled with the first electrodes and the second electrodes of the liquid crystal panel by floating capacity;

a display control circuit for producing a display control signal and display data for displaying an image to the plurality of first electrodes and the plurality of second electrodes of the liquid crystal panel;

a detection control circuit for producing a detection-scanning control signal for scanning the first electrodes and the second electrodes to detect coordinates of the tip of the electronic pen on the liquid crystal panel;

a switching circuit for switchedly selecting a side of the display control circuit for a display period to produce the display control signal and display data from the display control circuit and for switchedly selecting a side of the detection control circuit for a coordinate detection period to produce the detection-scanning control signal from the detection control circuit, under control of a control circuit;

a second-electrode drive circuit for generating a second-electrode drive signal during the display period to select in turn among the second electrodes according to the display control signal and for generating a second-electrode scan signal during the coordinate detection period to feed a scan voltage to the second electrodes in turn according to the detection-scanning control signal from the switching circuit;

a first-electrode drive circuit for generating a first-electrode drive signal during the display period to display pixels relative to the second electrodes selected by the second-electrode drive signal according to the display control signal and display data and for generating a first-electrode scan signal during the coordinate detection period to feed a scan voltage to the first electrodes in turn according to the detection-scanning control signal from the switching circuit; and a coordinate detection circuit for receiving an input of induced voltage developed to the electrode of the electronic pen according to the second-electrode scan signal and the first-electrode scan signal fed from the second-electrode drive circuit and the first-electrode drive circuit to the second electrodes and the first electrodes, respectively, and then detecting coordinates of the tip of the electronic pen by a predetermined procedure on the basis of the induced voltage derived from the electronic pen to produce an x-coordinate signal and a y-coordinate signal, wherein the coordinate detection circuit has an amplifier, and, when detecting a coordinate of the tip of the electronic pen on the basis of an induced voltage caused to the electrode of the electronic pen by a scan signal fed to one of the first electrodes and the second electrodes, whichever are greater in distance from the electronic pen and sited on the rear side of the liquid crystal panel on which the electronic pen is not present, the coordinate of the tip of the electronic pen is determined after the induced voltage has been amplified at a first amplification factor, and on the other hand, when detecting a coordinate of the tip of the electronic pen on the basis of an induced voltage caused to the electrode of the electronic pen by a scan signal fed to the other electrodes which are smaller in distance from the electronic pen and sited on the front side of the liquid crystal panel on which the electronic pen is present, the coordinate of the tip of the electronic pen is determined after the induced voltage has been amplified at a second amplification factor smaller than the first amplification factor.

18. A display-integrated type tablet device, comprising:

a liquid crystal panel having a plurality of first electrodes arrayed in parallel to one another and a plurality of second electrodes arrayed in parallel to one another in a direction other than the direction in which the first electrodes are arrayed;

an electronic pen having at its tip an electrode coupled with the first electrodes and the second electrodes of the liquid crystal panel by floating capacity;

a display control circuit for producing a display control signal and display data for displaying an image to the plurality of first electrodes and the plurality of second electrodes of the liquid crystal panel;

a detection control circuit for producing a detection-scanning control signal for scanning the first electrodes and the second electrodes to detect coordinates of the tip of the electronic pen on the liquid crystal panel;

a switching circuit for switchedly selecting a side of the display control circuit for a display period to produce the display control signal and display data from the display control circuit and for switchedly selecting a side of the detection control circuit for a coordinate detection period to produce the detection-scanning control signal from the detection control circuit, under control of a control circuit;

a second-electrode drive circuit for generating a second-electrode drive signal during the display period to select in turn among the second electrodes according to the display control signal and for generating a second-electrode scan signal during the coordinate detection period to feed a scan voltage to the second electrodes in turn according to the detection-scanning control signal from the switching circuit;

a first-electrode drive circuit for generating a first-electrode drive signal during the display period to display pixels relative to the second electrodes selected by the second-electrode drive signal according to the display control signal and display data and for generating a first-electrode scan signal during the coordinate detection period to feed a scan voltage to the first electrodes in turn according to the detection-scanning control signal from the switching circuit; and a coordinate detection circuit for receiving an input of induced voltage developed to the electrode of the electronic pen according to the second-electrode scan signal and the first-electrode scan signal fed from the second-electrode drive circuit and the first-electrode drive circuit to the second electrodes and the first electrodes, respectively, and then detecting coordinates of the tip of the electronic pen by a predetermined procedure on the basis of the induced voltage derived from the electronic pen to produce an x-coordinate signal and a y-coordinate signal, wherein the control circuit sets the display period and the coordinate detection period, and controls the switching circuit in such a way that after the first-electrode drive signal and the second-electrode drive signal for effecting display have been applied to the last first electrode and the last second electrode in the display period, respectively, for a specified time period, the scanning of the first electrodes and the second electrodes for coordinate detection is not immediately started, but a specified idle time is allowed until the display period is succeeded by the coordinate detection period;

wherein the idle time is set longer than a period that continues after the display period is completed until the display state of the first-electrode drive circuit and the second-electrode drive circuit during the display period is cleared, with the mode switched to detection mode, and besides detection-scanning during the coordinate detection period is made ready for start.

\* \* \* \* \*

UNITED STATES PATENT AND TRADEMARK OFFICE
CERTIFICATE OF CORRECTION

PATENT NO. : 5,357,266
DATED : October 18, 1994
INVENTOR(S) : Takao Tagawa It is certified that error appears in the above-identified patent and that said Letters Patent is hereby corrected as shown below:

On the cover sheet, add "[73] Assignee: Sharp Kabushiki Kaisha, Osaka, Japan".

Signed and Sealed this

Twenty-seventh Day of June, 1995

Attest:

BRUCE LEHMAN

Attesting Officer    *Commissioner of Patents and Trademarks*